(12) United States Patent
Heo et al.

(10) Patent No.: US 10,927,946 B2
(45) Date of Patent: Feb. 23, 2021

(54) VEHICLE TRANSMISSION

(71) Applicant: SL Corporation, Daegu (KR)

(72) Inventors: Chun Nyung Heo, Daegu (KR); Hong Jun Cha, Daegu (KR); Dae Hyung Kim, Daegu (KR)

(73) Assignee: SL Corporation, Daegu (KR)

( * ) Notice: Subject to any disclaimer, the term of this patent is extended or adjusted under 35 U.S.C. 154(b) by 420 days.

(21) Appl. No.: 16/039,617

(22) Filed: Jul. 19, 2018

(65) Prior Publication Data

US 2018/0320780 A1 Nov. 8, 2018

Related U.S. Application Data

(63) Continuation-in-part of application No. 15/094,196, filed on Apr. 8, 2016, now Pat. No. 10,309,525.

(30) Foreign Application Priority Data

| Apr. 22, 2015 | (KR) | 10-2015-0056664 |
| Apr. 29, 2015 | (KR) | 10-2015-0060810 |
| Apr. 29, 2015 | (KR) | 10-2015-0060897 |

(51) Int. Cl.
*F16H 61/22* (2006.01)
*F16H 59/02* (2006.01)
(Continued)

(52) U.S. Cl.
CPC ......... *F16H 59/02* (2013.01); *F16H 57/0006* (2013.01); *F16H 59/08* (2013.01);
(Continued)

(58) Field of Classification Search
CPC ....... F16H 2059/081; F16H 2059/0295; F16H 61/22
See application file for complete search history.

(56) References Cited

U.S. PATENT DOCUMENTS 2,183,485 A * 12/1939 Butzbach ............ F16H 61/0293
  33/297
3,901,097 A * 8/1975 Williams ................. G05G 5/06
  74/473.3
(Continued)

FOREIGN PATENT DOCUMENTS

EP 3098484 A1 * 11/2016 ............. H02K 7/116

*Primary Examiner* — William Kelleher
*Assistant Examiner* — Gregory T Prather
(74) *Attorney, Agent, or Firm* — Nelson Mullins Riley & Scarborough LLP; Kongsik Kim, Esq.

(57) ABSTRACT

Provided is a vehicle transmission for a gear shift operation. The vehicle transmission includes: a shift lever which is at least partially displaced toward front or rear directions by a driver to select shift stages; a movable plate which includes an input shaft rotated according to the displacement of the shift lever and an internal gear; an eccentric gear unit which has a first external gear eccentrically engaged with the internal gear and a second external gear moved simultaneously with the first external gear; a rotation unit having a ring gear with which the second external gear is eccentrically engaged; and an insertion unit which includes an eccentric shaft inserted into an aperture formed at a center of the eccentric gear unit and a central shaft formed with the eccentric shaft and inserted into an aperture formed at a center of the rotation unit.

20 Claims, 47 Drawing Sheets

(51) Int. Cl.
  *F16H 59/10* (2006.01)
  *F16H 57/00* (2012.01)
  *F16H 59/08* (2006.01)
  *F16H 61/24* (2006.01)
(52) U.S. Cl.
  CPC ........... *F16H 59/105* (2013.01); *F16H 61/22* (2013.01); *F16H 2059/0295* (2013.01); *F16H 2059/081* (2013.01); *F16H 2061/247* (2013.01)

(56) References Cited

U.S. PATENT DOCUMENTS

| | | | | |
|---|---|---|---|---|
| 5,094,115 A * | 3/1992 | Michihira | ............... | B60K 37/06 74/335 |
| 7,009,479 B1 * | 3/2006 | Chung | ................. | B60R 25/021 335/229 |
| 7,834,865 B2 * | 11/2010 | Jannasch | ................. | G05G 5/03 345/184 |
| 2006/0037424 A1 * | 2/2006 | Pickering | ................ | F16H 59/08 74/473.3 |
| 2009/0000407 A1 * | 1/2009 | Meyer | .................... | F16H 59/08 74/10.1 |
| 2013/0313086 A1 * | 11/2013 | Redwood | ................ | F16H 59/08 200/61.88 |
| 2015/0152958 A1 * | 6/2015 | Watanabe | ............... | F16H 61/22 74/473.12 |
| 2015/0167827 A1 * | 6/2015 | Fett | ..................... | F16H 59/0278 74/473.3 |
| 2015/0369358 A1 * | 12/2015 | Lee | .......................... | G05G 5/05 74/507 |
| 2016/0017983 A1 * | 1/2016 | Levesque | ................ | F16H 61/24 74/473.25 |
| 2016/0138704 A1 * | 5/2016 | Watanabe | ................ | G05G 5/08 74/473.23 |
| 2016/0245396 A1 * | 8/2016 | Behounek | ............... | F16H 61/24 |
| 2017/0175883 A1 * | 6/2017 | Watanabe | ............... | F16H 61/22 |
| 2017/0175884 A1 * | 6/2017 | Watanabe | ............... | F16H 59/08 |
| 2017/0175888 A1 * | 6/2017 | Jeon | ....................... | F16H 61/32 |
| 2018/0038478 A1 * | 2/2018 | Arakawa | ............... | B60K 20/08 |
| 2018/0355972 A1 * | 12/2018 | Kim | .......................... | F16H 9/26 |
| 2019/0145514 A1 * | 5/2019 | Cha | ......................... | F16H 61/24 74/473.23 |
| 2019/0219166 A1 * | 7/2019 | Krishnam E.N.V | ... | B60K 20/00 |
| 2020/0003300 A1 * | 1/2020 | Yang | ....................... | F16H 61/22 |
| 2020/0096100 A1 * | 3/2020 | Cha | ......................... | F16H 59/10 |

* cited by examiner

FIG. 14

| POSITION | POWER SUPPLY | OPERATING STATUS OF DRIVE UNIT |
|---|---|---|
| INITIAL POSITION | 0 | 171a—◧▯ |
| POSITION SWITCHING | +V | ▯▭—171a |
| MAINTENANCE OF SWITCHED POSITION | 0 | ▯▭—171a |
| RESTORATION TO INITIAL POSITION | -V | 171a—◧▯ |

VEHICLE TRANSMISSION

CROSS REFERENCES TO RELATED APPLICATIONS

This application is a continuation in part of U.S. patent application Ser. No. 15/094,196 filed on Apr. 8, 2016, which claims priority to Korean Patent Application No. 10-2015-0056664 filed on Apr. 22, 2015, Korean Patent Application No. 10-2015-0060810 filed on Apr. 29, 2015, and Korean Patent Application No. 10-2015-0060897 filed on Apr. 29, 2015, which applications are incorporated herein by reference.

TECHNICAL FIELD

The present invention relates to a vehicle transmission, and more particularly, to a vehicle transmission that enables a gear shift operation.

BACKGROUND ART

Generally, transmissions may change a gear ratio to maintain the constant turning of an engine based on the speed of the vehicle, and a driver may operate a shift lever to change the gear ratio of the transmission. A gear shift mode of the transmission includes a manual gear shift mode in which the driver may change a shift stage, and an automatic gear shift mode in which the shift stage automatically changes based on the speed of the vehicle when the driver selects a driving stage (D).

Further, sports mode type transmissions capable of performing the manual gear shift and the automatic gear shift in a single transmission are used. In the sports mode type transmission, a transmission capable of performing the manual gear shift may be disposed proximate to a transmission that performs the automatic gear shift to allow the driver to perform the manual gear shift by increasing or decreasing the gear stages, while performing the automatic gear shift.

The shift lever is exposed to the interior of the vehicle to be operated by the driver, and many shift levers in the related art are disposed between a center fascia and a console box of the vehicle. In general, since the driver selects the shift stage by moving the shift lever, a space is formed along a locus of movement of the shift lever. Thus, a design is required to prevent an occurrence of interference with the surrounding. Thus, recently, methods for allowing the dial type gear shift operation to reduce the space required for the gear shift operation, increase the spatial utilization of the vehicle and improve the gear shift operability have been researched.

As for types of such transmissions, there have been many mechanical transmissions that change a gear transmission ratio of a transmission system using a mechanical transmission method. In recent years, however, many electronic transmissions have been developed in consideration of compact structure and convenience of operation.

An electronic transmission is referred to, for example, a shift-by-wire or e-shifter in which a conventional mechanical connection is replaced by an electronic connection. In the case of the electronic transmission, an electronic connection is provided between a shift lever and a transmission of the vehicle.

In the electronic transmission, the driver instructs a gear shift using the shift lever, and a sensing unit transmits the required gear shift to a control unit. This instruction is processed by the control unit, and the control unit transmits a command signal to operate a clutch and a gear train as required by the driver. In addition, the electronic transmission may further include a detent unit for providing a feeling of operation to the driver as in a conventional mechanical transmission.

When the driver turns off the engine at a shift stage other than a park (P) stage, the electronic transmission may inconveniently require the driver to manually change the shift stage to the P stage when restarting the vehicle later. In this regard, the transmission provides a so-called return to park (RTP) function in which the shift lever automatically returns to the P stage when the engine is turned off at a shift stage other than the P stage.

However, when an actuator is driven to perform the RTP function, the detent unit may generate detent noise, providing an unpleasant experience to the driver. In addition, the output of the actuator must be increased to overcome the resistance of the detent unit.

Further, various accessory components such as the detent unit, the actuator, a deceleration unit, a shift lock mechanism, and a shift position sensing unit must be accommodated together in the electronic transmission, and any interference must be avoided along a movement trajectory during operation of the shift lever. Therefore, it is difficult to reduce the size of the transmission.

In this regard, it is necessary to develop a transmission having a compact structure without generating noise during automatic return to the P stage.

SUMMARY

Aspects of the present invention provide a vehicle transmission that may improve the use of the interior space of the vehicle by applying a dial type gear shift, while achieving a high gear ratio, by allowing a gear unit that rotates about the same axis as a rotational axis of a knob and a gear unit that rotates about an axis different from the rotational axis of the knob to turn when meshing with each other. Aspects of the present invention also provide a vehicle transmission which minimizes detent noise during automatic return to a park (P) stage after a driver turns off an engine.

However, aspects of the present invention are not limited to the one set forth herein. The above and other aspects of the present invention that have not been mentioned will become more apparent to one of ordinary skill in the art to which the present invention pertains by referencing the detailed description of the present invention given below.

According to an aspect of the present invention, a vehicle transmission may include a shift lever which is configured to be at least partially displaced toward a front or a rear direction of a vehicle by operation of a driver to select one of a plurality of shift stages; a movable plate which includes an input shaft rotated according to the displacement of the shift lever and an internal gear; an eccentric gear unit which has a first external gear eccentrically engaged with the internal gear and a second external gear rotating with the first external gear; a rotation unit having a ring gear with which the second external gear is eccentrically engaged; and an insertion unit which includes an eccentric shaft inserted into a first aperture formed at a center of the eccentric gear unit and a central shaft formed integrally with the eccentric shaft and inserted into a second aperture formed at a center of the rotation unit.

According to the vehicle transmission of the present invention as described above, there are one or more of following effects.

The spatial utilization of the interior of the vehicle may be enhanced, by using the dial type gear shift operation, and a high gear ratio may be achieved even without using a gear unit having a substantial diameter difference, thereby obtaining a sufficient reduction effect, while allowing the decreased overall size, since the gear unit configured to rotate about the same axis as a rotational axis of a knob and the gear unit configured to rotate about an axis different from the rotational axis of the knob may rotate when meshing with each other.

In addition, since a gear transmission path at the time of operation of a shift lever and a gear transmission path at the time of automatic return to the P stage may be different, a detent unit may be activated during operation of the shift lever to provide a feeling of operation to a driver, but may not be activated during automatic return to the P stage to remove detent noise.

Effects of the present invention are not limited to the aforementioned effects, and other effects that have not been mentioned will be clearly understood by those skilled in the art from the scope of the claims.

BRIEF DESCRIPTION OF THE DRAWINGS

The above and other aspects and features of the present invention will become more apparent by describing in detail exemplary embodiments thereof with reference to the attached drawings, in which:

FIG. 14 is a table illustrating an operating state of the drive unit of the locking unit according to an exemplary embodiment of the present invention;

DETAILED DESCRIPTION

Figure 1:
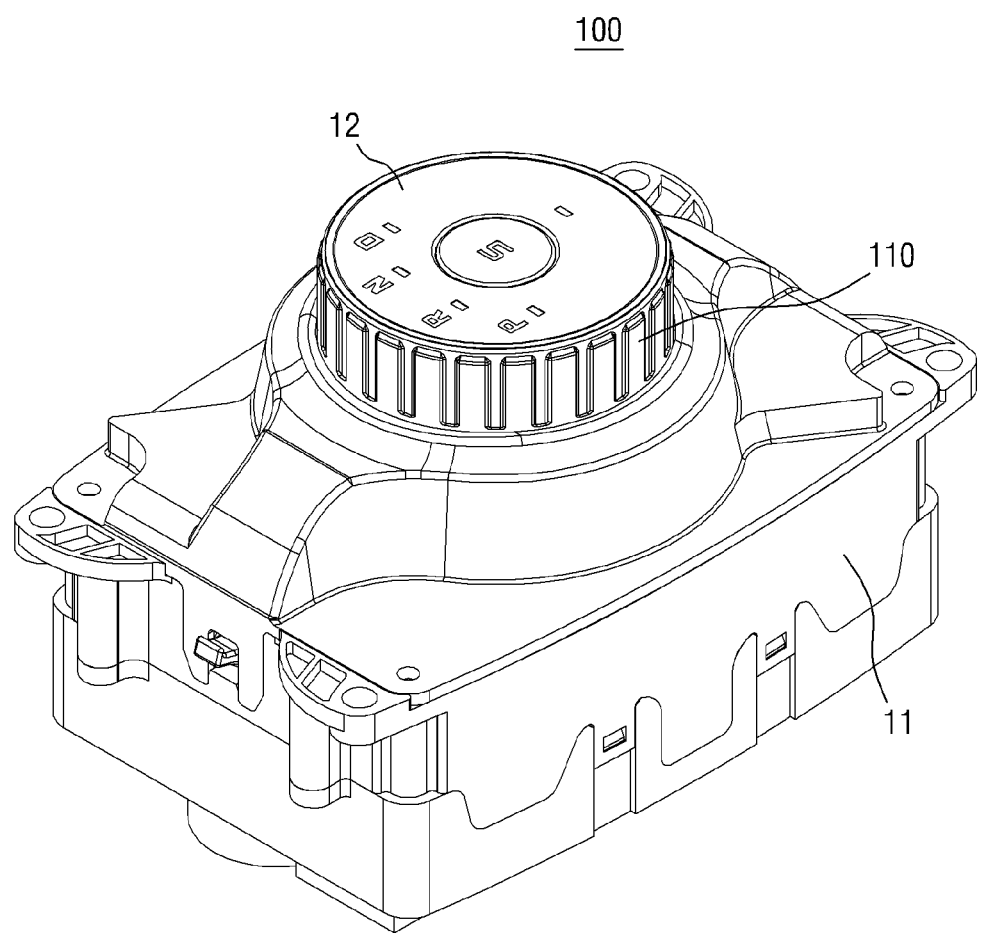
FIG. 1 is a perspective view illustrating an external appearance of a vehicle transmission according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present invention and methods of accomplishing the same will become more apparent with reference to exemplary embodiments to be described in detail in conjunction with the accompanying drawings. However, the present invention may be embodied in many different forms rather than being limited to the exemplary embodiments set forth herein, the present exemplary embodiments are simply provided to make the disclosure of the present invention complete and to fully convey the concept of the present invention to those skilled in the art, and the present invention are only defined by the categories of claims. The same reference numerals throughout the specification refer to the same components. Thus, in some exemplary embodiments, well-known processing steps, well-known structures and well-known techniques will not be specifically explained in order to avoid ambiguous interpretation of the present invention.

Further, the exemplary embodiments described herein will be described with reference to the cross-sectional views and/or the schematic views that are ideal exemplary views of the present invention. Accordingly, the forms of the exemplary views may be modified by manufacturing techniques and/or tolerances. Accordingly, the exemplary embodiments of the present invention also include changes in forms generated according to the manufacturing process rather than being limited to the illustrated specific forms. Moreover, each component in the respective drawings illustrated in the present invention may be illustrated in a slightly enlarged or reduced manner in consideration of convenience of explanation. The same reference numerals throughout the specification refer to the same components.

Hereinafter, the present invention will be described with reference to the drawings for explaining a vehicle transmission by the embodiments of the present invention.

FIG. 1 is a perspective view illustrating an external appearance of the vehicle transmission according to an exemplary embodiment of the present invention. Referring to FIG. 1, a vehicle transmission 100 according to the exemplary embodiment of the present invention may include a knob 110 exposed to one side of a case 11 to allow a driver to rotate the knob 110 and select a desired shift stage.

Although many vehicle transmissions 100 are disposed between a center facia and a console box of the vehicle to allow a gear shift operation by the driver, the vehicle transmission 100 may be installed at various locations within the vehicle to which the accessibility of the driver is high, without being limited thereto. Further, in the exemplary embodiment of the present invention, the knob 110 of the vehicle transmission 100 may be exposed to the interior of the vehicle, and the case 11 that houses or accommodates various components necessary for the gear shift function and the shift lock function may be mounted within the vehicle body to decrease the space occupied by the vehicle transmission 100 inside the vehicle, thereby improving the spatial utilization of the vehicle interior.

Further, the knob 110 may include a display device 12 configured to display a plurality of selectable shift stages, the currently selected shift stage and the like. Although the exemplary embodiment of the present invention illustrates the position of the display device 12 fixed and an outer surface of the knob 110 capable of rotating to select the shift stage as an example, the knob 110 and the display device 12 may be rotated together without being limited thereto.

Figure 2:
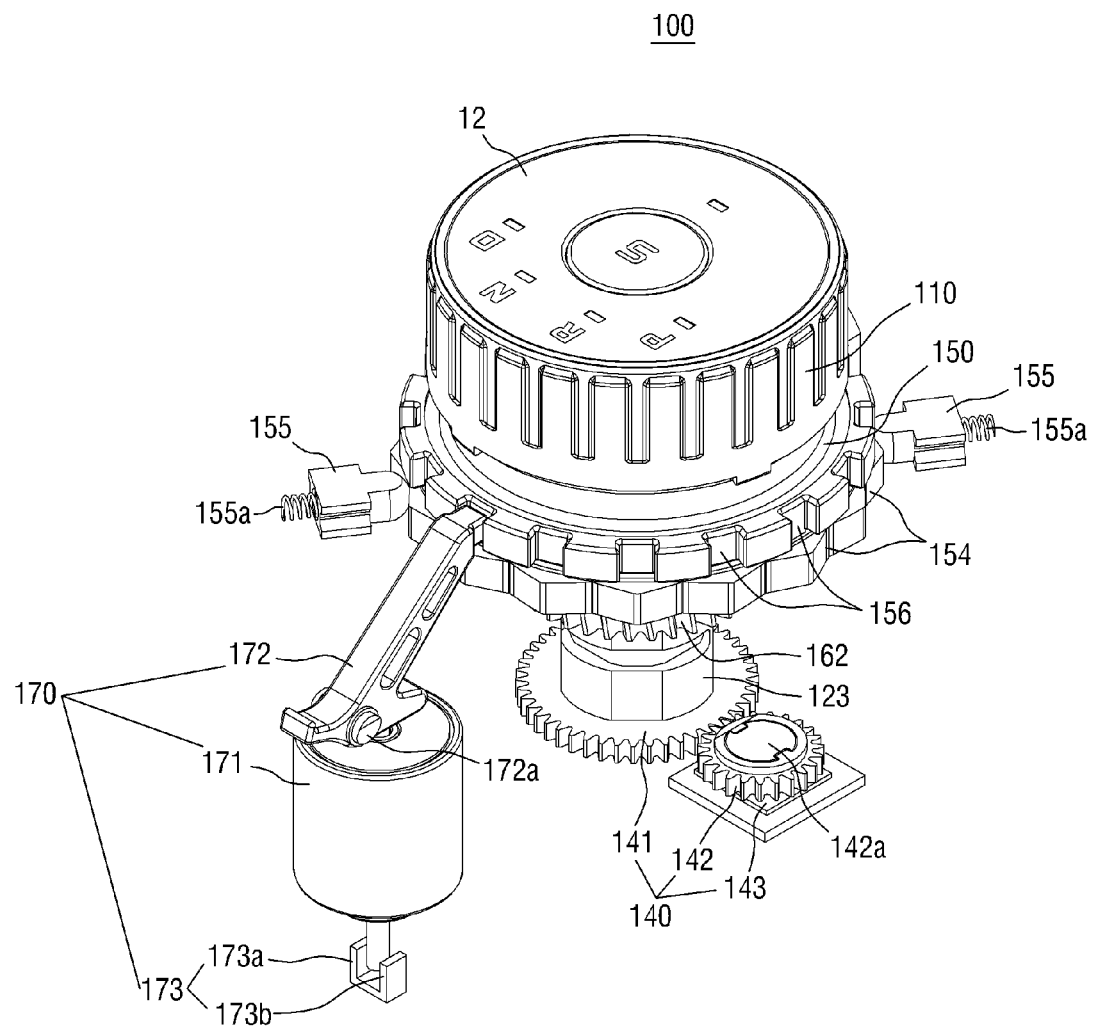
FIGS. 2 and 3 are perspective views illustrating the vehicle transmission according to an exemplary embodiment of the present invention.
Figure 3:
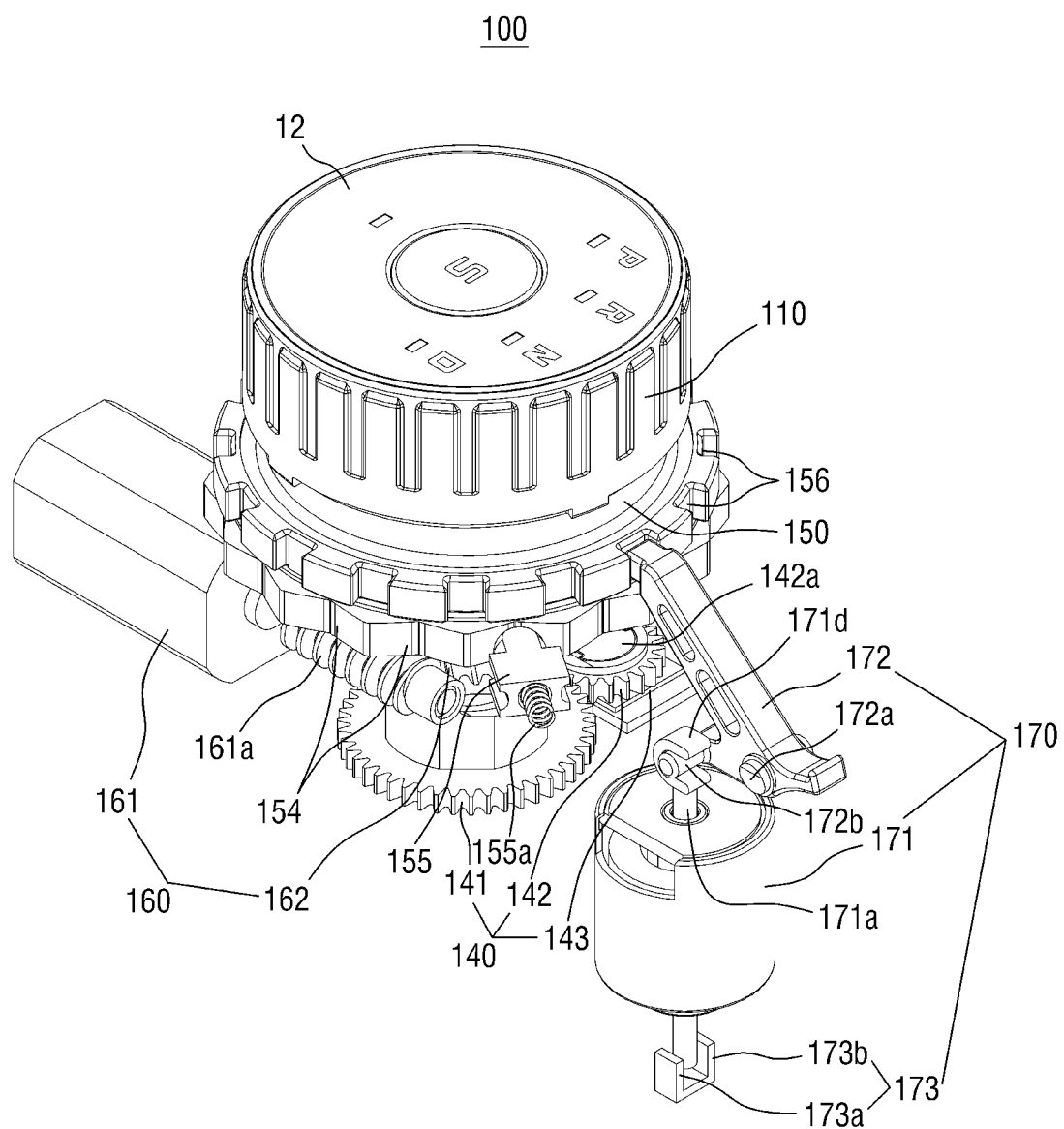
Figure 4:
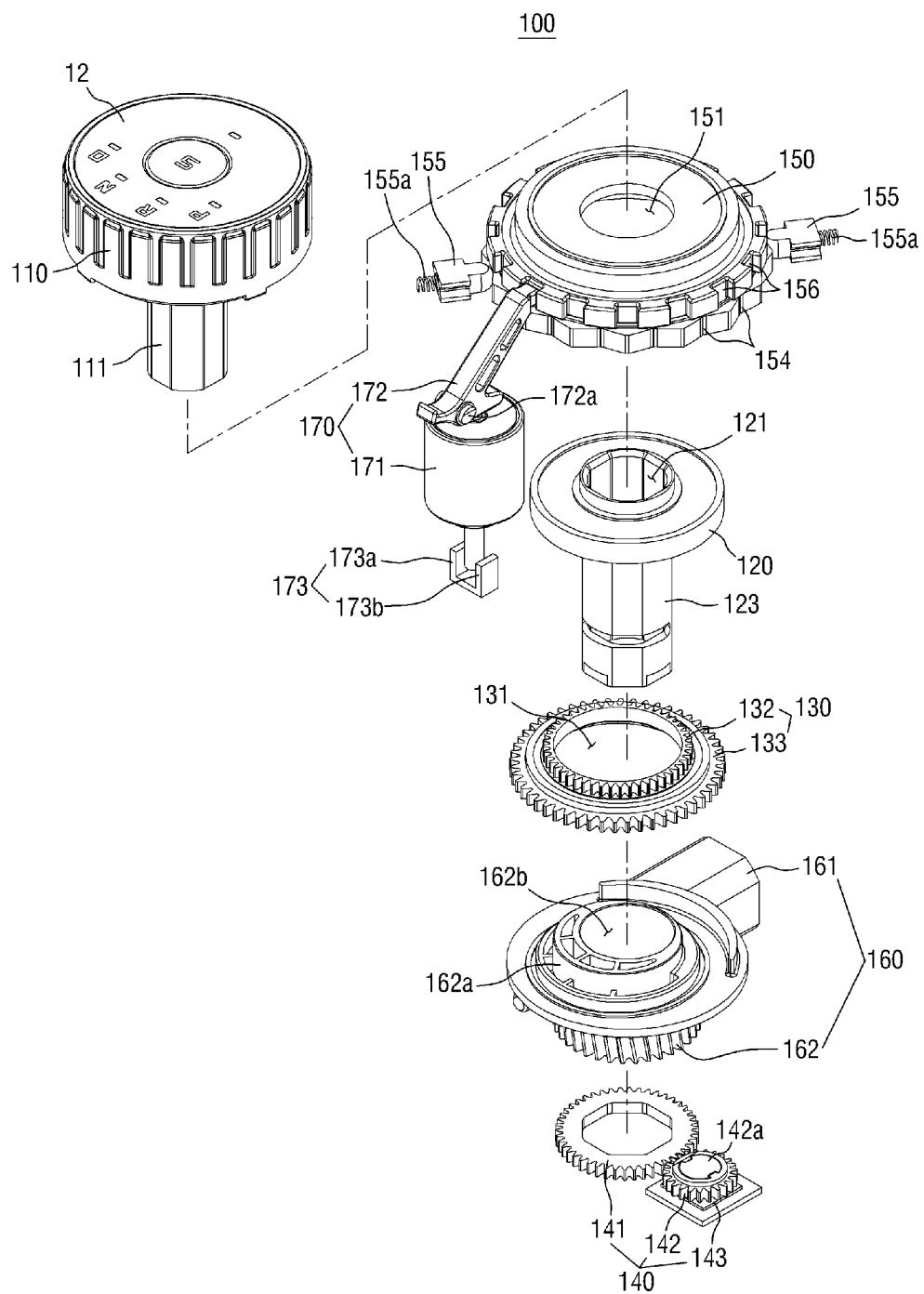
FIG. 4 is a detailed view illustrating the vehicle transmission according to the exemplary embodiment of the present invention.
Figure 5:
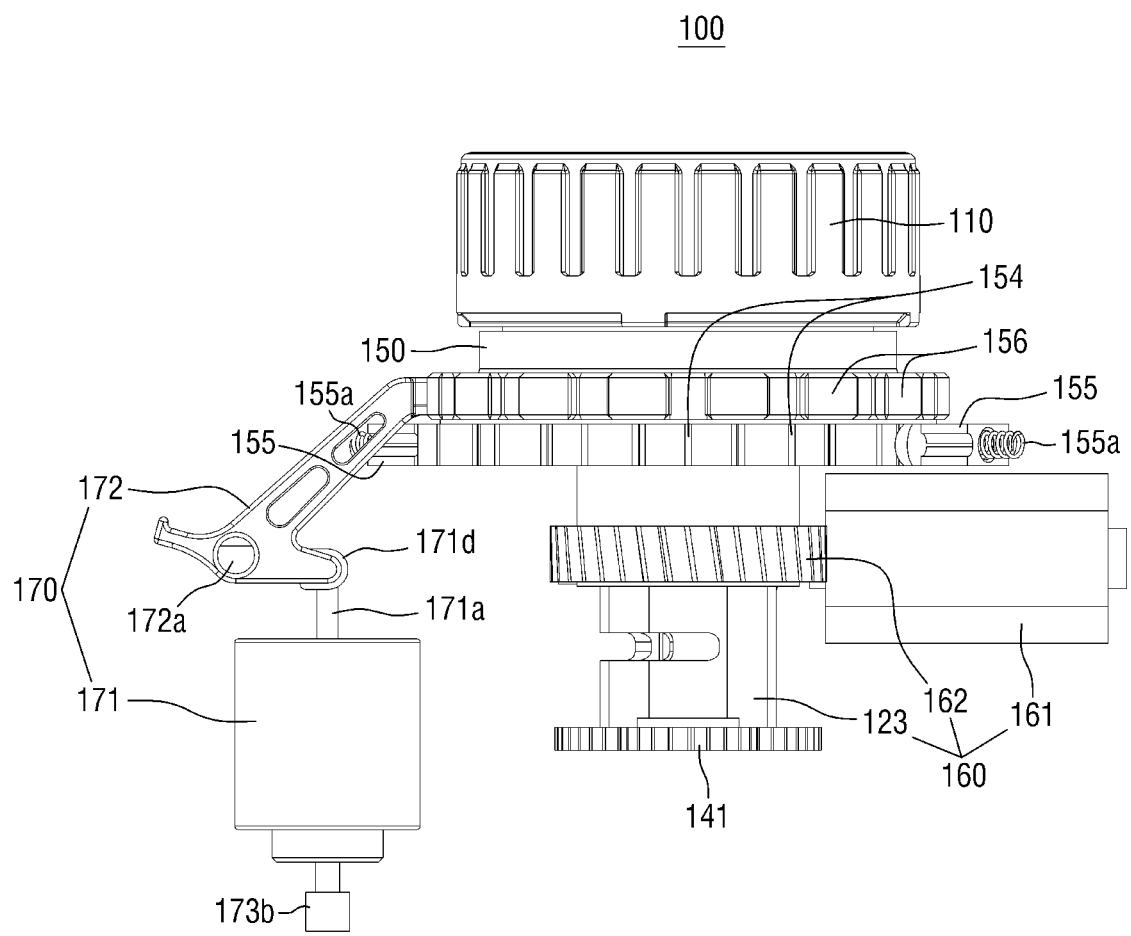
FIG. 5 is a side view illustrating the vehicle transmission according to the exemplary embodiment of the present invention.
Figure 6:
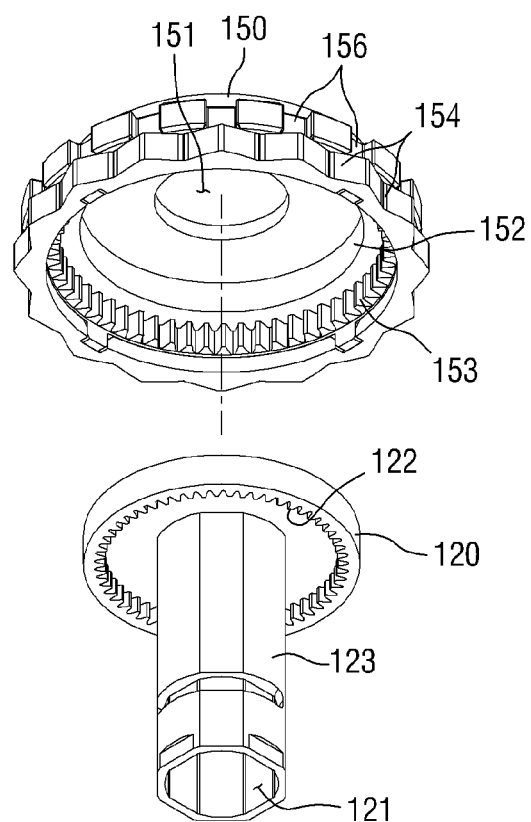
FIG. 6 is a detailed view illustrating an operation unit and a first gear unit according to the exemplary embodiment of the present invention.
Figure 7:
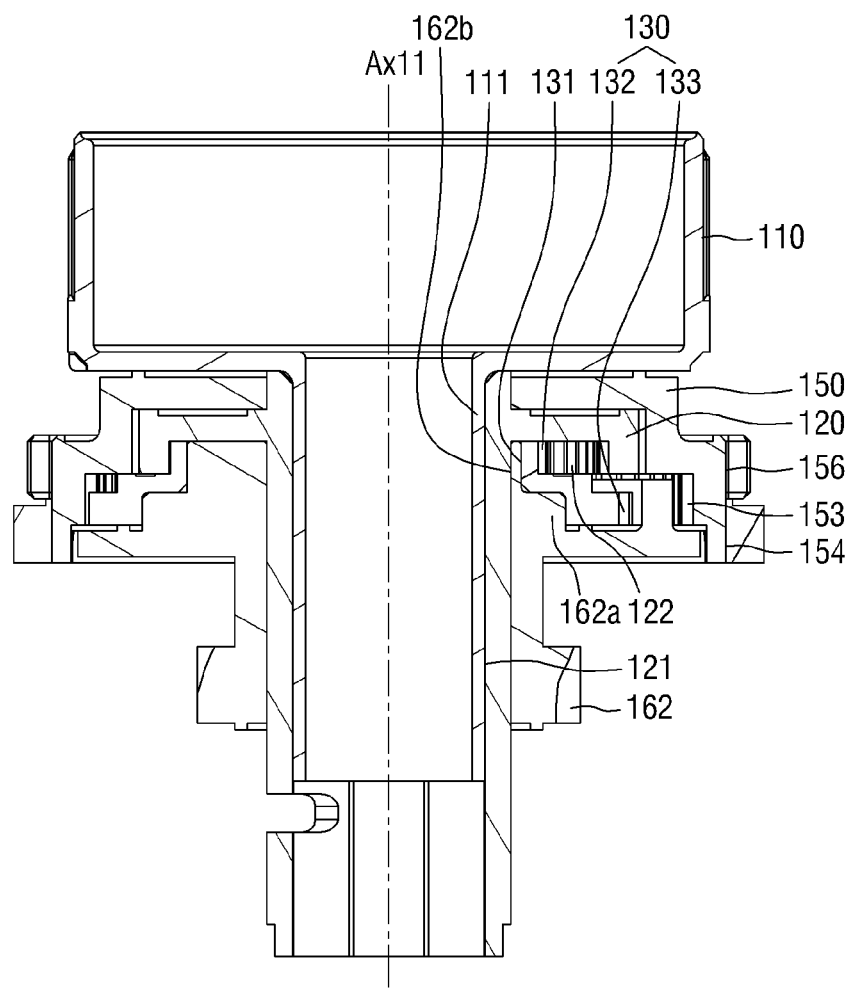
FIGS. 7 to 10 are cross-sectional views illustrating the vehicle transmission according to the exemplary embodiment of the present invention.
Figure 8:
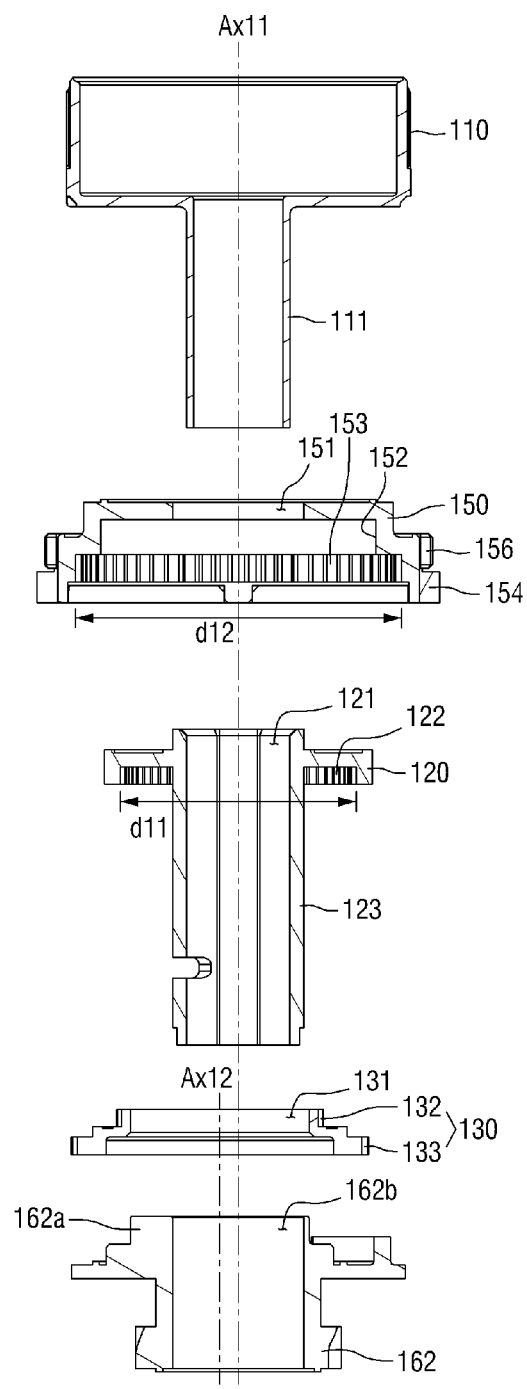

FIGS. 2 and 3 are perspective views illustrating the vehicle transmission according to an exemplary embodiment of the present invention, FIG. 4 is a detailed view illustrating the vehicle transmission according to the exemplary embodiment of the present invention, FIG. 5 is a side view illustrating the vehicle transmission according to the exemplary embodiment of the present invention, FIG. 6 is an exploded perspective view illustrating an operation unit and a first gear unit according to the exemplary embodiment of the present invention, and FIGS. 7 to 10 are cross-sectional views illustrating the vehicle transmission according to the exemplary embodiment of the present invention.

Referring to FIGS. 2 through 8, the vehicle transmission 100 according to the exemplary embodiment of the present invention may include a knob 110, a plurality of the gear units 120 and 130, a detection unit 140 (e.g., a sensor), an operation unit 150, a restoring unit 160 and a locking unit 170. The various units of the vehicle transmission 100 may be operated by a controller having a processor and a memory. The knob 110 may allow the shift stage to be selected by rotating in at least one direction when the external force is applied by the driver, and in the exemplary embodiment of the present invention, the knob 110 may be disposed on one side (e.g., an upper side) of the operation unit 150 to allow a shaft 111 to be inserted into a cavity 151 of the operation unit 150 configured to rotate to generate an operation feeling during rotation of the knob 110.

In particular, the location of the knob 110 may also include being proximate to one side (e.g., a first side) of the operation unit 150 as well as adjacent to the one side of the operation unit 150. The plurality of gear units 120 and 130 may be configured to transmit the rotational force in both directions, such as transmitting the rotational force caused by the rotation of the knob 110 to the operation unit 150 to allow the operation unit 150 to rotate, or transmitting the rotational force generated from a restoring unit 160 to be described later to the knob 110 to allow the knob 110 to rotate.

Additionally, the plurality of gears units 120 and 130 will be referred to as a first gear unit 120 and a second gear unit 130, respectively. The first gear unit 120 may be formed with a cavity 121 into which the shaft 111 of the knob 110 may be inserted through the cavity 151 of the operation unit 150, and the first gear unit 120 may be formed with a first internal gear 122 along an outer end thereof. The first gear unit 120 may be inserted into an insertion groove 152 formed on the other side (e.g., a lower side) of the operation unit 150 and may be disposed on the lower side of the operation unit 150, and the operation unit 150 and the first gear unit 120 may be configured to rotate about a rotational axis Ax11 of the knob 110.

In particular, the location of the first gear unit 120 may include being disposed proximate to the other side of the operation unit 150 as well as adjacent to the other side (e.g., a second side) of the operation unit 150, similarly to the aforementioned knob 110.

The positions of each of the cavity 151 of the operation unit 150 and the cavity 121 of the first gear unit 120 may be aligned to allow the shaft 111 of the knob 110 to be inserted there through. Thus, the first gear unit 120 may be configured to rotate when the knob 110 rotates. Additionally, the knob 110 may be configured to rotate when the first gear unit 120 rotates, and thus, the mutual rotation force may be transmitted. The second gear unit 130 may be disposed on the lower side of the first gear unit 120 and may be formed with a cavity 131 into which a shaft 123 that extends in one direction from the cavity 121 of the first gear unit 120 may be inserted. The second gear unit 130 may include a first external gear 132 meshing with the a first side of the first internal gear 122, and a second external gear 133 that meshes with the a first side of the second internal gear 153 formed on the outer peripheral surface of the insertion groove 152 of the operation unit 150 to have a diameter d12 greater than a diameter d11 of the first internal gear 122.

Figure 9:
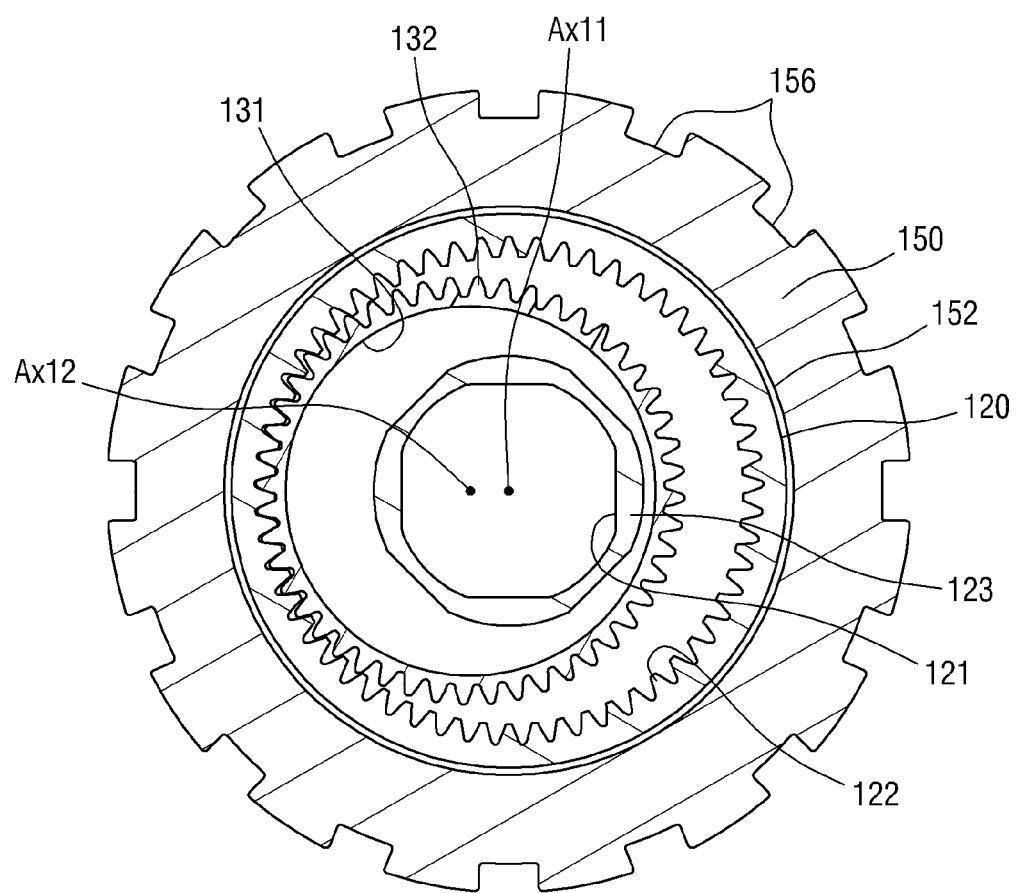
Figure 10:
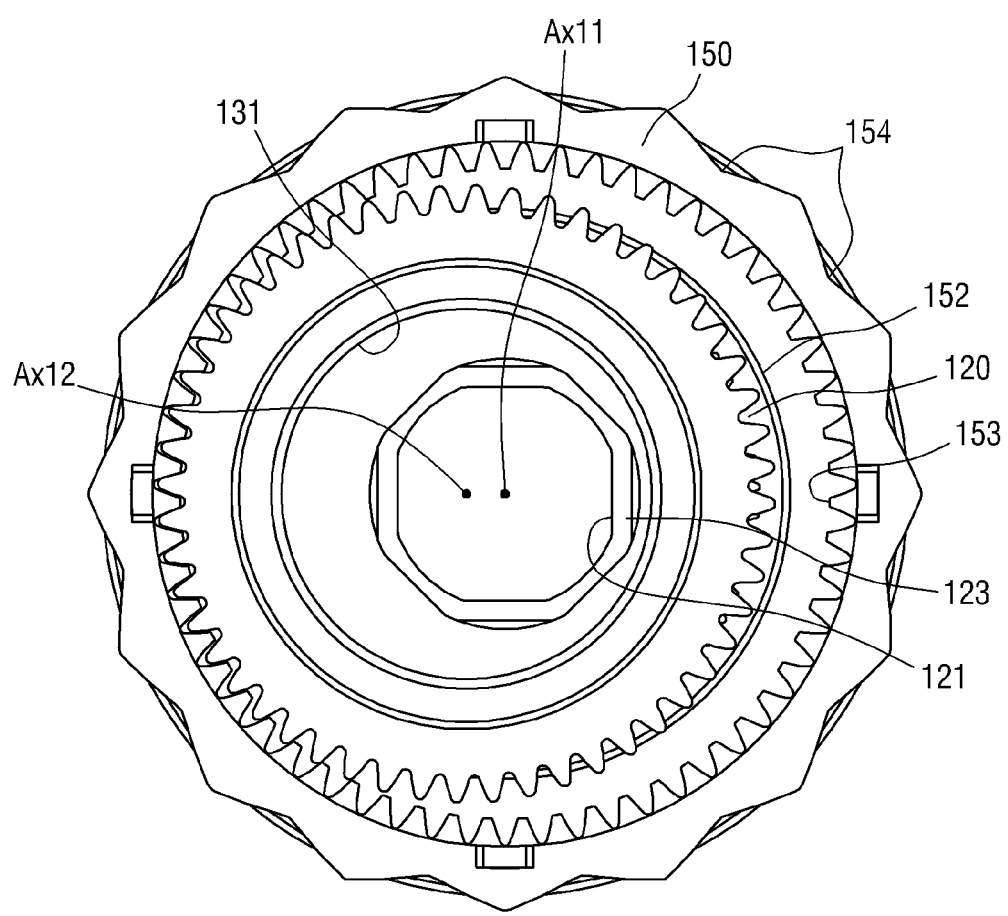

In the exemplary embodiment of the present invention, the description will be given of when the first external gear 132 and the second external gear 133 are formed to have the diameters less than the diameter d11 of the first internal gear 122 and the diameter d12 of the second internal gear 153, as illustrated in FIG. 9, when a first side of the first external gear 132 meshes with the first internal gear 122, a second side of the first external gear 132 is spaced apart from the first internal gear 122, and as illustrated in FIG. 10, when a first side of the second external gear 133 meshes with the second internal gear 153, a second side of the second external gear 133 may be spaced apart from the second internal gear 153.

Thus, the first external gear 132 and the second external gear 133 have a central axis Ax12 different from the rotational axis Ax11 of the knob 110 to be advantageous for the downsizing, while obtaining a sufficient reduction effect, by allowing the first external gear 132 and the second external gear 133 to rotate about the rotational axis Ax11 of the knob 110 and to rotate about the central axis Ax12, thereby achieving a high gear ratio even without increasing a difference in diameters of the gears meshing with each other.

Hereinafter, both of the "rotational axis" and the "central axis" of the terms used in exemplary embodiments of the present invention indicates the axis that is a center of turning (e.g., rotation or revolution), and although the different terms are used for the convenience of explanation, their meanings should be understood as being identical to each other.

In the exemplary embodiment of the present invention, although the description has been given of the plurality of the gear units 120 and 130 including two gear units, this is merely an example for aiding understanding of the present invention, and the number of the gear units may be variously modified based on the gear ratio and the reasons of design, without being limited thereto.

Moreover, since the second external gear 133 of the second gear unit 130 meshes with the second internal gear 153, the rotational force of the knob 110 may be transmitted to the first external gear 132 by the first gear unit 120 and simultaneously may be transmitted to the operation unit 150 meshing with the second external gear 133, the operation unit 150 may be configured to rotate when the knob 110 rotates, and thus, the operation feeling may be generated when operating the knob 110.

The operation unit 150 may include a plurality of detent grooves 154 formed along the outer circumference, and the operation feeling may be generated by at least one bullet 155 caught by the plurality of detent grooves 154 when the operation unit 150 rotates. Particularly, at least one bullet 155 may be elastically supported by an elastic member 155a such as a spring, at least one bullet 155 may be maintained in contact with the plurality of detent grooves 154, and thus, the operation feeling may be generated when the operation unit 150 rotates. The operation feeling may be a response or a tactile feedback that a driver receives in response to rotating the operation unit 150. For example, the driver may feel a click or catch of the bullet in the detent grooves 154.

In the exemplary embodiment of the present invention, although the description has been given of the bullets 155 disposed on each side of the operation unit 150 as an example, the positions, the numbers or the like of the bullets 155 may be modified without being limited thereto. Further, the operation unit 150 may be formed with a plurality of fixing grooves 156 formed along the outer circumference as in the plurality of detent grooves 154. The plurality of fixing grooves 156 may be used to restrain the rotation of the operation unit 150 or release the restraint, and the detailed description thereof will be described later. Although the description will be given of the plurality of detent grooves 154 and the plurality of fixing grooves 156 coupled to each other after being formed in each of the different members to form the operation unit 150 as an example, the plurality of detent grooves 154 and the plurality of fixing grooves 156 may be integrally formed without being limited thereto.

Furthermore, the detection unit 140 may be configured to detect the shift stage selected by rotation of the knob 110. The detection unit 140 may include a plurality of gears 141 and 142 and a sensor 143 disposed to mesh with each other. Particularly, one 141 (e.g., a first gear 141) of the plurality of gears 141 and 142 may be connected to an extension member 123 of the first gear unit 120, and the other 142 (e.g., a second gear 142) thereof may include a magnet 142a. The sensor 143 may include a Hall sensor configured to detect a change of the magnetic force caused by the magnet 142a which changes in position when the plurality of gears 141 and 142 rotate. Thus, the sensor 143 may be configured to detect the shift stage selected by rotation of the knob 110.

In the exemplary embodiment of the present invention, the description will be given of the plurality of gears 141 and 142 having different diameters as an example, which is to allow the easier detection of the shift stage by relatively converting the rotational angle of the knob 110, and the type and number of gears included in the detection unit 140 may be variously modified. In other words, in the exemplary embodiment of the present invention, the diameter of the gear 142 provided with the magnet 142a may be set to be less than the diameter of the gear 141 connected to the shaft 123 of the first gear unit 120 to relatively convert the rotational angle of the knob 110.

Additionally, in the exemplary embodiment of the present invention, although a case of detecting the changes in the magnetic force based on the positions of the magnet 142a to detect the shift stage will be described as an example, the detection unit 140 may be configured to detect the shift stage through various methods, such as detecting the shift stage by including a light-emitting element and a light-receiving element and by detecting the number of slits passing between the light-emitting element and the light-receiving element based on the rotation of the knob 110, without being limited thereto. The restoring unit 160 may be configured to restore the knob 110 to a preset shift stage when the ignition of the vehicle is turned off or there is another operation command, thereby making it possible to automatically restore the knob 110 to the preset shift stage when the preset restoring conditions are satisfied to prevent a problem when operating the vehicle even when a driver does not separately (e.g., intentionally) restore the shift stage.

The restoring unit 160 in the exemplary embodiment of the present invention will be described as being configured to restore the knob 110 to a parking stage when a restoring condition from the non-parking stage to a parking stage is satisfied. As an example, the restoring unit 160 may be configured to rotate the knob 110 to be automatically restored to the park stage (P), when there are stages P, reverse (R), neutral (N) and drive (D) as shift stages selectable through the rotation of the knob 110, and when the driver turns off the ignition at the stage D as one of the restoring conditions or a separate operation is input from the driver. The description will be provided of when the non-parking stage is the stages R, N and D at which the vehicle may travel and the parking stage is the stage P at which the traveling of the vehicle is restrained (e.g., the vehicle is parked or stopped and blocked from moving).

In the exemplary embodiment of the present invention, although the description will be given of the restoring unit 160 configured to restore the knob 110 to the parking stage when the restoring condition from the non-parking condition to the parking condition is satisfied as an example, the restoring unit 160 may be configured to restore the knob 110 to the preset shift stage, based on various restoring conditions, without being limited thereto. For example, the restoring unit 160 may be configured to restore the knob 110 to the previous shift stage when the erroneous operation of the knob 110 occurs in the traveling state of the vehicle. Specifically, the restoring unit 160 may be configured to restore the knob 100 to the stage D as the previous shift stage when the knob 110 is rotated by the erroneous operation of the driver to prevent the selection of other shift stages during traveling of the vehicle at the stage D.

Particularly, the restoring unit 160 may include a drive unit 161 and a third gear unit 162. The third gear unit 162 may be rotate by the drive unit 161, and as an example, the third gear unit 162 may include a worm wheel configured to rotate in the state of meshing with a worm gear 161a disposed on the rotational shaft of the drive unit 161. An insertion protrusion 162a may be formed on one side of the third gear unit 162, and the insertion protrusion 162a may be inserted into the cavity 131 of the second gear unit 130 to seat the second gear unit 130 thereon. A central axis Ax12 of the insertion protrusion 162a may be spaced apart from the rotational axis Ax11 of the knob 110 in one side direction, similarly to the center axis Ax12 of the second gear unit 130.

Therefore, when the third gear unit 162 is rotated by the drive unit 161, the third gear unit 162 may be configured to rotate about the rotational axis Ax11 of the knob 110, and meanwhile, the second gear unit 130 may be configured to receive a force in an outward direction with respect to the rotational axis Ax11 of the knob 110 by the insertion protrusion 162a. Thus, the revolution and the rotation may be performed about the rotational axis Ax11 of the knob 110. Accordingly, when the second gear unit 130 rotates, the rotational force of the drive unit 161 may be transmitted to the first gear unit 120 and the knob 110 may be configured to rotate. In the exemplary embodiment of the present invention, since the second gear unit 130 may be configured to revolve around the rotational axis Ax11 of the knob 110 and simultaneously rotate about the center axis Ax12 of the second gear unit 130, the reduction effect may be obtained, advantageous for miniaturization compared to using the diameter of relatively substantial differences to obtain a high gear ratio.

Further, since the extension member 123 of the first gear unit 120 may be connected to the detection unit 140 through the cavity 131 of the second gear unit 130 and the cavity 162b of the third gear unit 162, even when the drive unit 161 is not operated, when the knob 110 is rotated, the shaft 123 of the first gear unit 120 may be configured to rotate. When the knob 110 is restored to the preset shift stage by the restoring unit 160, the ignition of the vehicle may be turned off or another operation command operation may be executed, and since an occurrence of operation feeling is not required, in this case, the locking unit 170 may be configured to restrain the rotation of the operation unit 150 to prevent the occurrence of the unnecessary operation feeling and reduce the noise.

The locking unit 170 may include a drive unit 171 and a locking member 172. In particular, the drive unit 171 of the locking unit 170 may include a moving rod 171a configured to move linearly as a solenoid. The locking member 172 may be connected to one end (e.g., a first end) of the moving rod 171a, and may be configured to restrain the turning of the operation unit 150 when locking member 172 is rotated about the rotational axis 172a during movement of the moving rod 171a and one side (e.g., a first side) of the locking member 172 may be inserted into one of a plurality of fixing grooves 156. In addition, the locking member 172 may be configured to release the restraint of the rotation of the operation unit 150 when the first side of the locking member 172 is disengaged from the plurality of fixing grooves 156.

Additionally, the connection groove 171d may be formed at a first end of the moving rod 171a, a connection protrusion 172b formed in the locking member 172 may be inserted into the connection groove 171d. When the connection protrusion 172b flows inside the connection groove 171d with the movement of the moving rod 171a, and the linear movement of the moving rod 171a may be converted into the rotational movement of the locking member 172.

Figure 11:
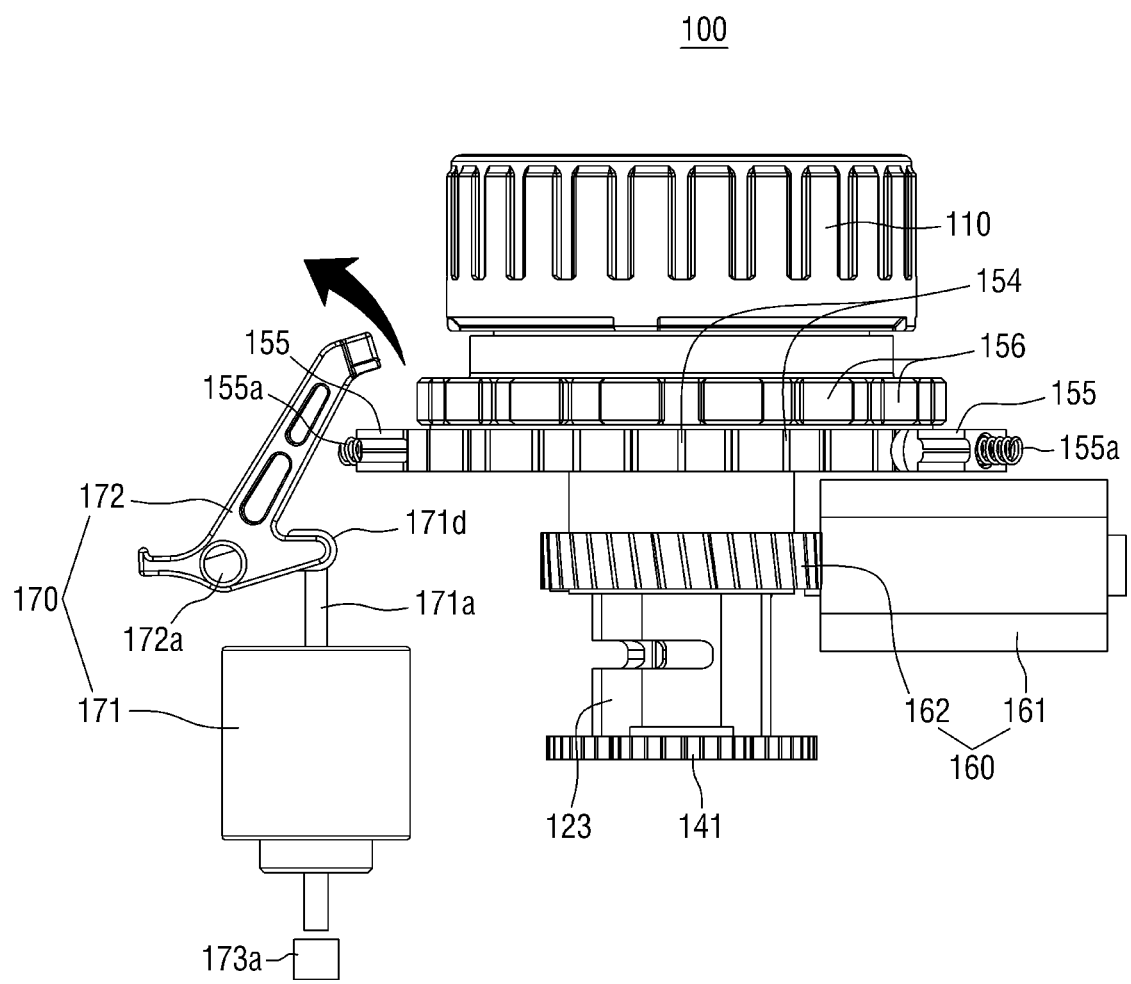
FIG. 11 is a side view illustrating the vehicle transmission in which the restraint of the rotation of the operation unit according to the exemplary embodiment of the present invention is released.

In other words, when attempting to restrain the rotation of the operation unit 150, as illustrated in FIG. 5 described above, the locking unit 170 may be disposed to allow the first side of the locking member 172 to be inserted into one of the plurality of fixing grooves 156. However, when releasing the restraint of the rotation of the operation unit 150, while the locking member 172 is rotated in the opposite direction, as illustrated in FIG. 11, the position of the locking unit 170 may be changed in which the first side of the locking member 172 is disengaged from the plurality of fixing grooves 156, to thus release the restraint of the rotation of the operation unit 150.

Further, in the exemplary embodiment of the present invention, the description will be given of the drive unit 171 being a bidirectional solenoid in which the power may be supplied during movement of the moving rod 171a, and after the movement of the moving rod 171a is completed, the current position may be maintained without the restoration of the moving rod 171a to the previous position even when the power supply is stopped. In other words, the typical solenoid may be a unidirectional solenoid configured to convert the electrical signal into the linear movement, and when moving the plunger in one side direction, the power may be continuously supplied, and when moving the plunger in the other direction (e.g., an opposite direction) as an original position, the power supply may be stopped.

Figure 12:
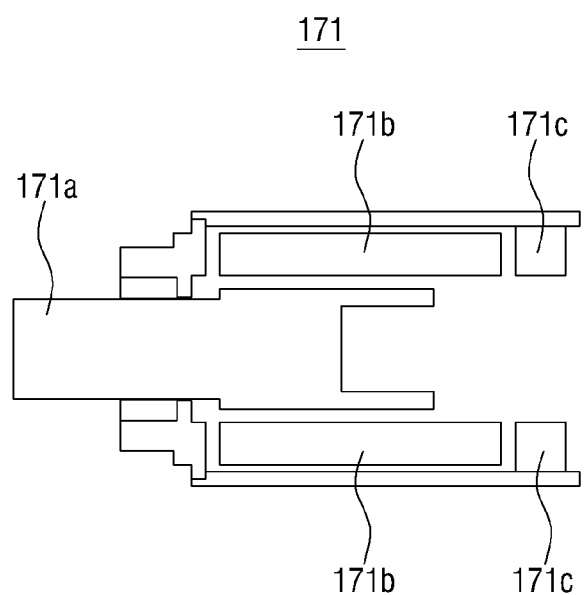
FIGS. 12 and 13 are schematic views illustrating a drive unit of a locking unit according to the exemplary embodiment of the present invention.
Figure 13:
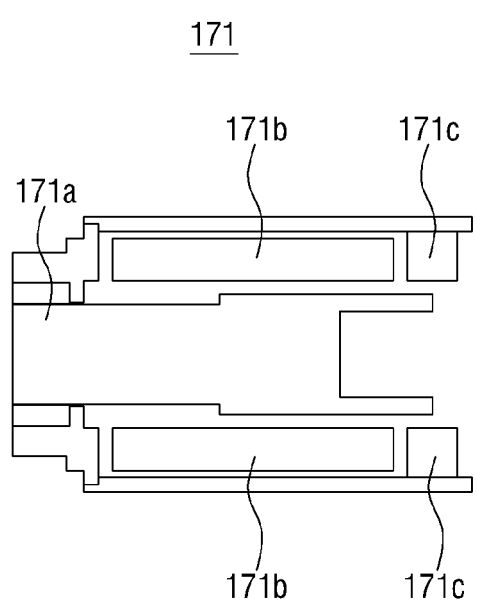

Therefore, to maintain the plunger being moved in one direction, the continuous supplying of the power supply is required. However, since the drive unit 171 according to an exemplary embodiment of the present invention may be supplied with the power supply when the moving rod 171a is moved, the power consumption may be reduced, and the heat generation may be reduced. Specifically, the drive unit 171 according to an exemplary embodiment of the present invention may include a coil 171b wound along the outer circumference of the moving rod 171a and the magnet 171c disposed on one side of the coil 171b as illustrated in FIGS. 12 and 13. The coil 171b may be configured to move the moving rod 171a in a direction approaching the magnet 171c or a direction away from the magnet 171c when the power supply is supplied. The magnet 171c may be configured to maintain the position of the moving rod 171a even when the power supply to the coil 171b is stopped. Further, although it is not illustrated in FIGS. 12 and 13, a spring (not illustrated) may be disposed between the moving rod 171a and the magnet 171c to elastically support the moving rod 171a.

Referring to FIG. 12, the moving rod 171a may be in a state of being moved in the direction away from the magnet 171c. In particular, after the power supply (e.g., +V) is supplied to the coil 171b and the moving rod 171a may be moved, even when the power supply to the coil 171b is stopped, and the position of the moving rod 171a may be maintained by a spring that elastically supports the moving rod 171a. As shown in FIG. 12, the distance between the moving rod 171a and the magnet 171c may increase, the attractive force of the magnet 321b may become less than the elastic force of the spring, and the position of the moving rod 171a may be maintained.

Referring to FIG. 13, the moving rod 171a may move in a direction approaching the magnet 171c. In particular, the voltage (e.g., −V) with a polarity opposite of FIG. 12 described above may be supplied to the coil 171b, and the moving rod 171a may be moved in the direction approaching the magnet 171c. As shown in FIG. 13, although the moving rod 171a may be moved in the direction approaching the magnet 171c and the spring configured to support the moving rod 171a may be in the compressed state, since the distance between the moving rod 171a and the magnet 171c decreases, the attractive force of the magnet 171c becomes greater than the elastic force of the spring, and the position of the moving rod 171a may be maintained.

In an exemplary embodiment of the present invention, since the description has been given of the moving rod 171a coupled to the locking member 172 as an example, it may be possible to understand that one of FIG. 12 or 13 described above may correspond to a state in which the locking member 172 restrains the rotation of the operation unit 150, and in the other may correspond to a state in which the locking member 172 releases the restraint of the rotation of the operation unit 500. Further, the polarity of the voltage applied to the coil 171b in FIGS. 12 and 13 described above is merely an example for aiding understanding of the present invention, and the polarity of the voltage supplied may vary, based on the winding direction of the coil 171b or the like.

The operating state of the drive unit 171 according to FIGS. 12 and 13 will be described referring to FIG. 14. Referring to FIG. 14, at the initial position, when the moving rod 171a is disposed, as illustrated in FIG. 12 described above, since the elastic force of the spring becomes greater than the attractive force of the magnet 171c, even when the power is not supplied to the coil 171b, the moving rod 171a may be maintained at the initial position.

When attempting to switch the position of the moving rod 171a, a positive voltage may be supplied to the coil 171b, and the moving rod 171a may be moved in the direction approaching the magnet 171c. In particular, the sum of the magnetic force caused by the coil 171b and the attractive force of the magnet 171c may become larger than the elastic force of the spring, and the moving rod 171a may be moved. When the moving rod 171a is maintained at the switched position, after the switching of the position of the moving rod 171a is completed, even when the distance between the moving rod 171a and the magnet 171c decreases and the power is not supplied to the coil 171b, the attractive force of the magnet 171c becomes greater than the elastic force of the spring, and the position of the moving rod 171a may be maintained.

Additionally, when attempting to restore the moving rod 171a to the initial position, the negative voltage may be supplied to the coil 171b. Particularly, the magnetic force caused by the coil 171b and the attractive force caused by the magnet 171c may be offset from each other, and the moving rod 171a may be restored to the initial position by the elastic force of the spring. Accordingly, as illustrated in FIGS. 12 through 14 described above, in the drive unit 171 according to the exemplary embodiment of the present invention, the current may be supplied while the moving rod 171a is moved to switch the position of the locking member 172 when restraining the rotation of the operation unit 150 or releasing the restraint thereof by moving the moving rod 171a to shift the position of the locking member 172, and the position of the locking member 172 may be maintained even when the current is not supplied in other cases. Thus, the power consumption may be reduced, and the heat generation may be reduced.

Further, the drive unit 171 of FIGS. 12 to 14 described above is merely an example for aiding understanding of the present invention, and it may be possible to have various configurations in which the power is applied when the position of the locking member 172 is switched, without being limited thereto. Meanwhile, the locking unit 170 may include a position detection unit 173 configured to detect the position of the locking member 172 to determine the restrained state of rotation of the locking member operation unit 150 or the released state of the restraint by the locking member 172.

In the exemplary embodiment of the present invention, the description will be given of the position detection unit 173 including a photo-sensor configured to adjust the light-emitting element 173a and the light-receiving element 173b to face each other and may be configured to detect the transmitted light therebetween as an example. However, this is merely an example for aiding understanding of the present invention, and various sensors (e.g., a non-contact sensor or contact sensor) configured to detect the switching of the position of the locking member 172 may be used, without being limited thereto.

Further, in the exemplary embodiment of the present invention, the description will be given of the position detection unit 173 configured to detect the position of the locking member 172 using the position detection of the moving rod 171a of the drive unit 171 coupled to the locking member 172 as an example. However, it may also be possible to detect the position of the locking member 172 itself and the position and type of the position detection unit 173 may vary based on the shape of the locking member 172, without being limited thereto.

In addition, although the description will be given of an example in which the locking unit 170 restrains the rotation of the operation unit 150 or releases the restraint thereof when the knob 110 is restored to the pre-set shift stage as an example, the locking unit 170 may also be configured to perform the shift-lock function in a particular shift stage, when the shift stage is changed by the rotation of the knob 110, without being limited thereto. For example, when attempting to change from the stage P to the stage R, the locking unit 170 may be configured to restrain the rotation of the operation unit 150, and release the restraint of the rotation of the operation unit 150 to allow the knob 110 to rotate, when the brake pedal is operated or engaged.

In the vehicle transmission 100 according to the exemplary embodiment of the present invention as described above, when the driver attempts to change the shift stage by rotating the knob 110, since the drive unit 161 of the restoring unit 160 is not operated and the third gear unit 162 is in the stopped state, when the knob 110 rotates, the rotational force of the knob 110 may be transmitted to the first gear unit 120, the second gear unit 130 and the operation unit 150, and the operation feeling may be generated while the operation unit 150 is rotated.

Meanwhile, when the restoring unit 160 restores the knob 110 to the reset shift stage, the drive unit 161 of the restoring unit 160 may be driven, the rotational force of the drive unit 161 may be transmitted to the third gear unit 162, the second gear unit 130, the first gear unit 120 and the knob 110, the knob 110 may be configured to rotate, and in this case, the rotation of the operation unit 150 may be restrained by the locking unit 170. This is advantageous from the viewpoint of allowing the driver to more easily recognize the selection of the shift stage by providing the operation feeling to the driver when the knob 110 is turned by the driver to select the shift stage. However, since the restoration of the knob 110 to the preset shift stage may be understood as a situation in which driver exits the vehicle or the vehicle is not actually operated, the restraint may also prevent generation of noises or the like caused by the generation of the unnecessary operation feeling.

Furthermore, in the above-described exemplary embodiment, although the description has been provided of the rotational axis 172a of the locking member 172 of the locking unit 170 being in a direction perpendicular to the rotational axis Ax11 of the knob 110 as an example, the locking unit 170 may have various configurations, without being limited thereto.

Figure 15:
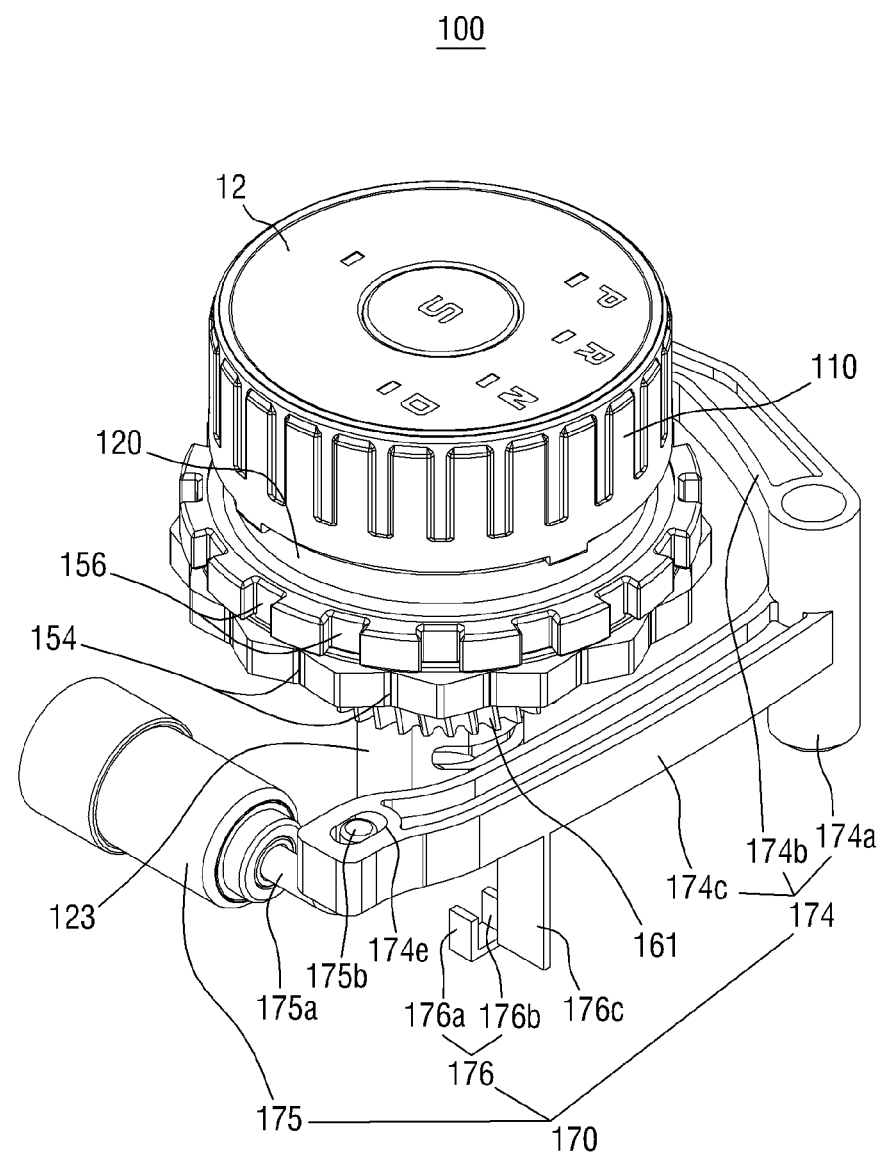
FIG. 15 is a perspective view illustrating the locking unit that restrains the rotation of an operation unit according to another exemplary embodiment of the present invention.
Figure 16:
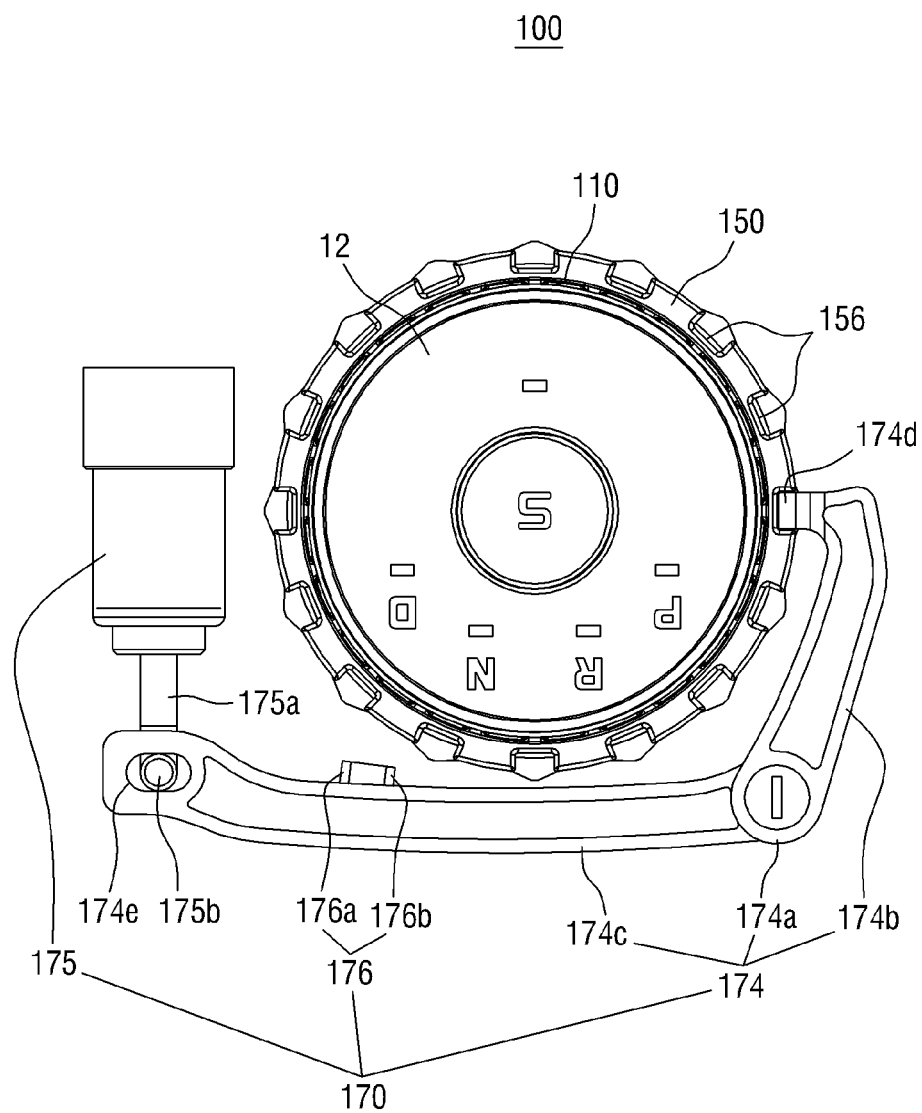
FIG. 16 is a plan view illustrating the locking unit that restrains the rotation of the operation unit according to another exemplary embodiment of the present invention.
Figure 17:
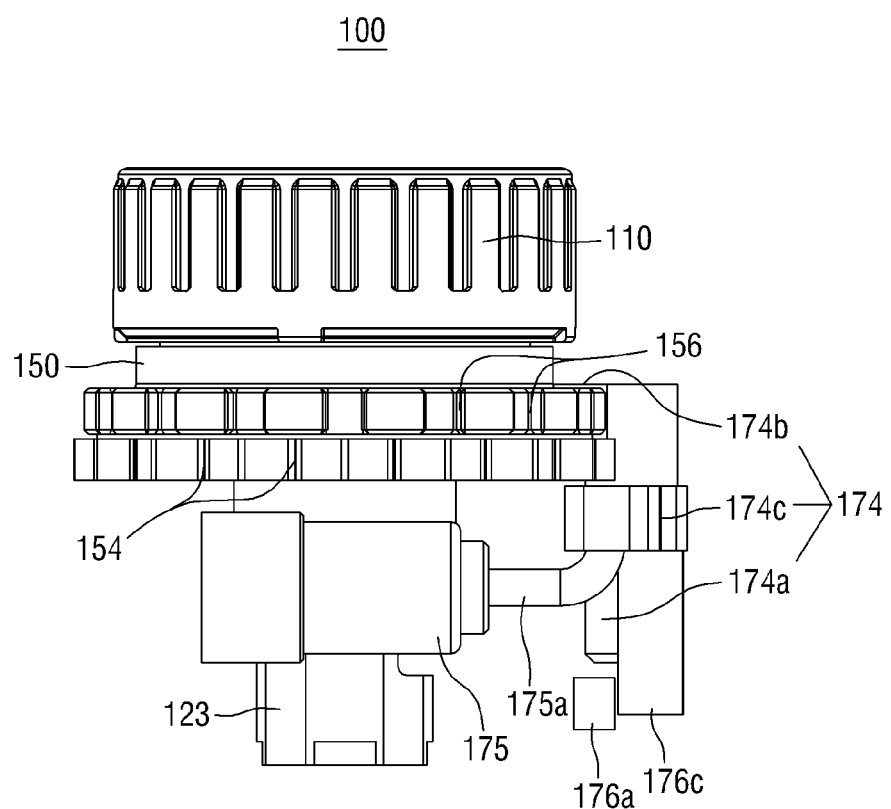
FIG. 17 is a side view illustrating the locking unit that restrains the rotation of the operation unit according to another exemplary embodiment of the present invention.
Figure 18:
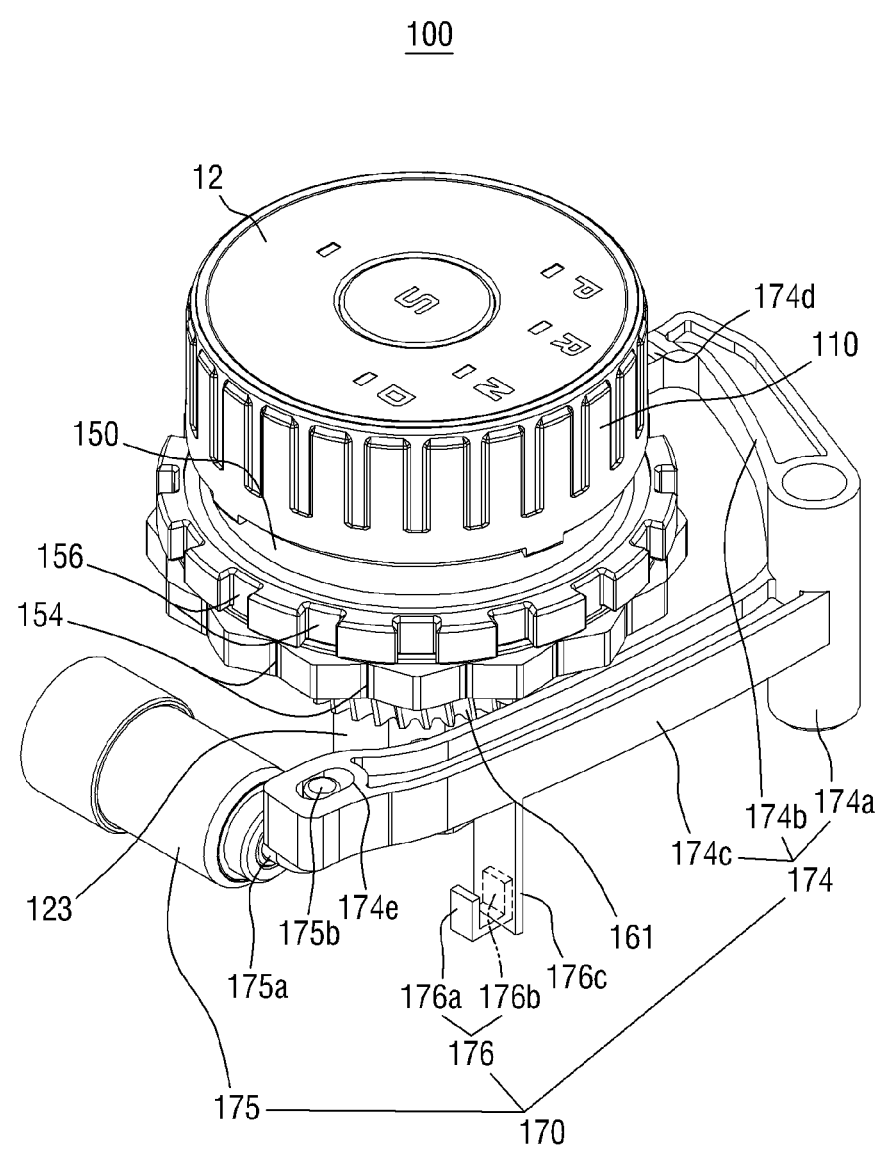
FIG. 18 is a perspective view illustrating the locking unit that releases the rotation of the turning of the operation unit according to another exemplary embodiment of the present invention.
Figure 19:
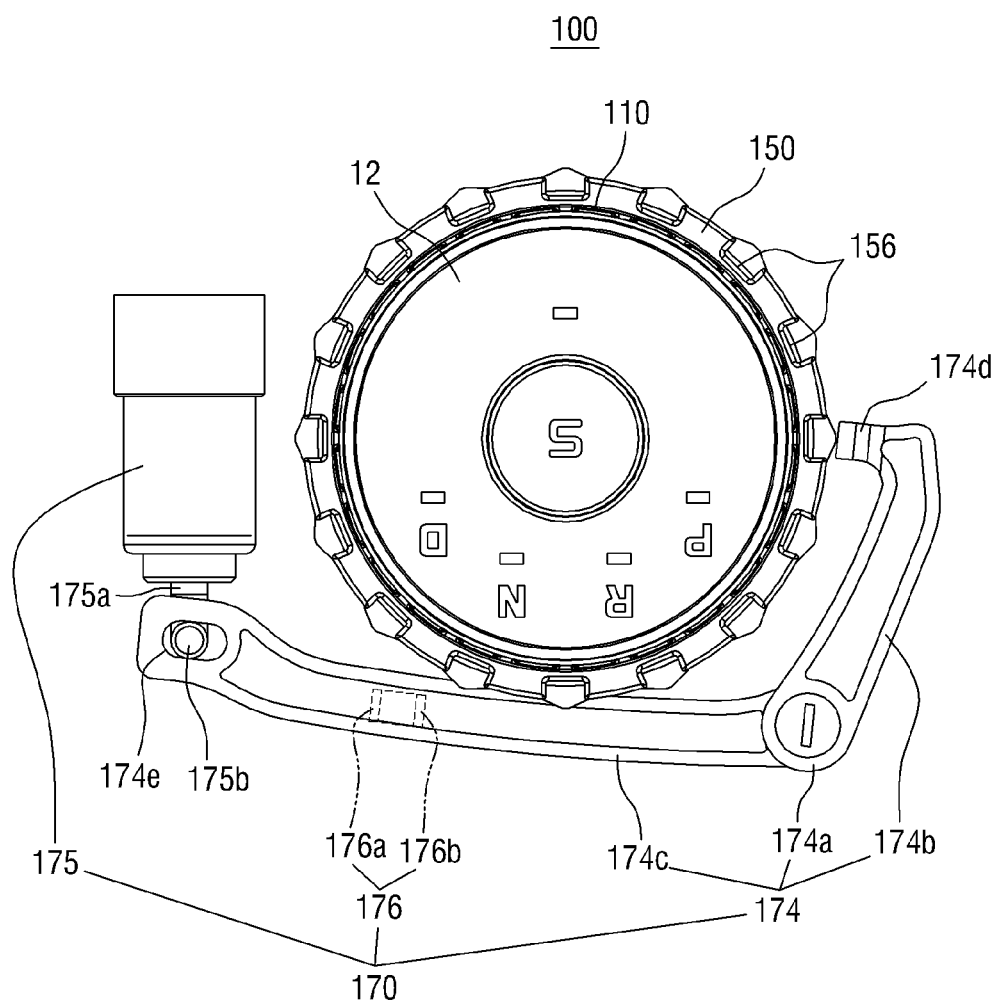
FIG. 19 is a plan view illustrating the locking unit that releases the restraint of the rotation of the operation unit according to another exemplary embodiment of the present invention.
Figure 20:
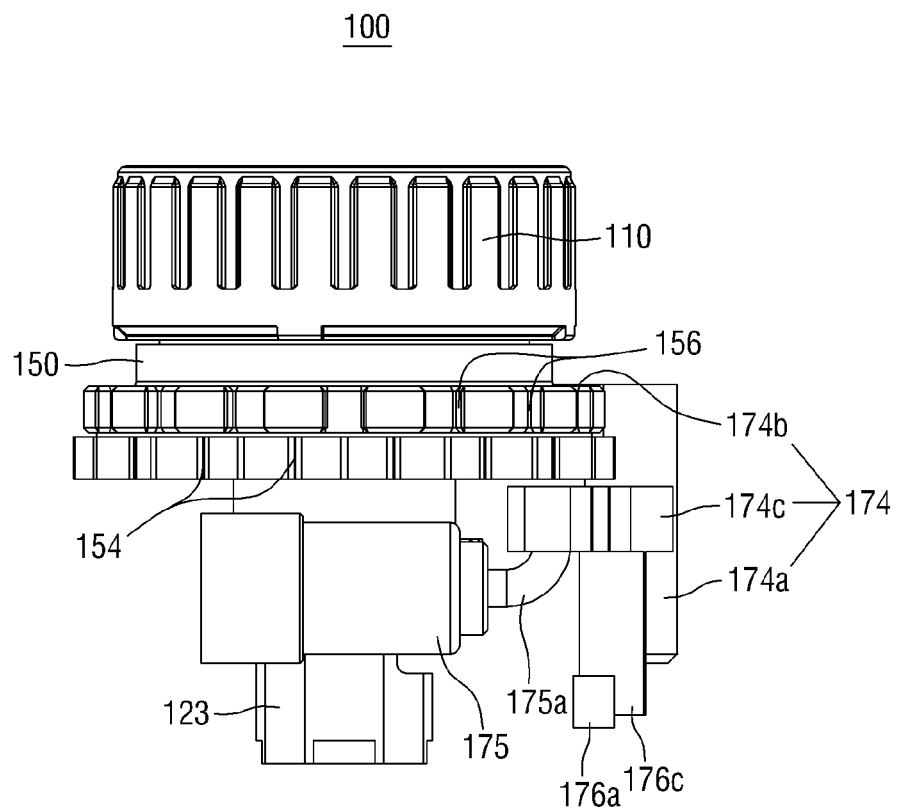
FIG. 20 is a side view illustrating the locking unit that releases the restraint of the rotation of the operation unit according to another exemplary embodiment of the present invention.

FIG. 15 is a perspective view illustrating the locking unit that restrains the rotation of an operation unit according to another exemplary embodiment of the present invention, FIG. 16 is a plan view illustrating the locking unit that restrains the rotation of the operation unit according to another exemplary embodiment of the present invention, FIG. 17 is a side view illustrating the locking unit that restrains the rotation of the operation unit according to another exemplary embodiment of the present invention, FIG. 18 is a perspective view illustrating the locking unit that releases the restraint of the rotation of the operation unit according to another exemplary embodiment of the present invention, FIG. 19 is a plan view illustrating the locking unit that releases the restraint of rotation turning of the operation unit according to another exemplary embodiment of the present invention, and FIG. 20 is a side view illustrating the locking unit that releases the restraint of the rotation of the operation unit according to another exemplary embodiment of the present invention.

Referring to FIGS. 15 through 20, a locking unit 170 according to another exemplary embodiment of the present invention may include a locking member 174, a drive unit 175 and a position detection unit 176. In another exemplary embodiment of the present invention, since other constituent elements other than the locking unit 170 are the same as those of the above-described embodiment, the detailed description thereof will be omitted, and the constituent elements having the same role as the above-described embodiment will be denoted by the same reference numerals.

In particular, the locking member 174 may include a first extension rod 174b and a second extension rod 174c that extend in different directions from each other about the rotational shaft 174a. The first extension rod 174b may be configured to restrain the rotation of the operation unit 150 or release the restraint thereof, and the second extension rod 174c may be connected to the drive unit 175. Additionally, the drive unit 175 of the locking unit 170 may have a similar structure as the drive unit 171 of the exemplary embodiment described above. Similarly to the above-described FIGS. 12 to 14, the drive unit 175 may be made of a bidirectional solenoid in which the power may be supplied when switching the position of the locking member 174 and the power supply is stopped in other situations.

The description will be given of the rotation shaft 174a of the locking member 174 disposed in parallel with the rotational axis Ax11 of the knob 110 and a moving rod 175a movably provided in the drive unit 175 moved in a direction perpendicular to the rotational shaft 174a of the locking member 174. A catching protrusion 174d may be formed at a first end of the first extension rod 174b, and the catching protrusion 174d may be caught or stopped by one of the plurality of fixing grooves 156 formed in the operation unit 150 based on the positions of the locking member 174. The second extension rod 174b may be formed with an insertion groove 174e into which a first end 175b of the moving rod 175a of the drive unit 175 may be inserted. The description will be given of the first end 175b of the moving rod 175a formed to be bent toward the insertion groove 174e of the second extension rod 174c as an example.

Additionally, the insertion groove 174e may be formed long in one direction (e.g., lengthwise in a first direction) to convert the linear movement of the moving rod 175a into the rotational movement of the locking member 174. In other words, the first end 175b of the moving rod 175a inserted into the insertion groove 174e may be configured to push or pull the second extension rod 174c, while moving along the insertion groove 174e when the moving rod 175a is linearly moved, and thus, the locking member 174 may be configured to rotate about the rotational shaft 174a.

Thus, in another exemplary embodiment of the present invention, as illustrated in FIGS. 15 to 17, when the first end 175b of the moving rod 175a is moved in a direction away from the drive unit 175, the catching protrusion 174d of the first extension rod 174b may be caught or stopped by any one of the plurality of fixing grooves 156 formed in the operation unit 150, and thus, the rotation of the operation unit 150 may be restrained. In addition, as illustrated in FIGS. 18 through 20, when the first end 175b of the moving rod 175a is moved in a direction approaching the drive unit 150, the catching protrusion 174d of the first extension rod 174b may be disengaged from the plurality of fixing grooves 156 formed on the operation unit 150, and the restraint of the turning of the operation unit 150 may be released.

Meanwhile, in another exemplary embodiment of the present invention, the locking unit 170 may further include a position detection unit 176 configured to detect the position of the locking member 174. The position detection unit 176 may include a photo-sensor in which the light-emitting element 176a and the light-receiving element 176b may be disposed to face each other to detect the transmitted light between both the elements in the same manner as the above-described embodiment.

Specifically, as illustrated in FIGS. 15 through 17, when the catching protrusion 174d of the first extension rod 174b is inserted into any one of the plurality of fixing grooves 156 formed in the operation unit 156 and the rotation of the operation unit 150 is constrained, since the extension protrusion 176c formed in the second extension rod 174c is out of a section between the light-emitting element 176a and the light-receiving element 176b and the transmitted light is detected, the position detection unit 176 may detect the state in which the rotation of the operation unit 150 is restrained.

In addition, as illustrated in FIGS. 18 through 20, when the catching protrusion 174d of the first extension rod 174b is disengaged from the plurality of fixing grooves 156 formed in the operation unit 150, since the extension protrusion 176c formed in the second extension rod 174c may be disposed between the light-emitting element 176a and the light-receiving element 176b and the transmitted light is not detected, the position detection unit 176 may detect the state in which the restraint of the rotation of the operation unit 150 is released. Although the description has been given of the position detection unit 176 configured to detect the locking member 174, i.e., the position of the extension protrusion 176c formed in the second extension rod 174c, the position of the moving rod 175a connected to the locking member 174 may also be detected in a similar manner, without being limited thereto.

As described above, in the vehicle transmission 100 according to an exemplary embodiment of the present invention, since the power may be supplied when the positions of the locking members 172 and 174 are switched by the locking unit 170 in which the bidirectional solenoid is used, the prolonged power supply may not be required to maintain the positions of the locking members 172 and 174 based on the shift stage. Thus, the power consumption may be reduced, and the service life may be increased by decreasing the heat generation of the drive units 171 and 175.

Figure 21:
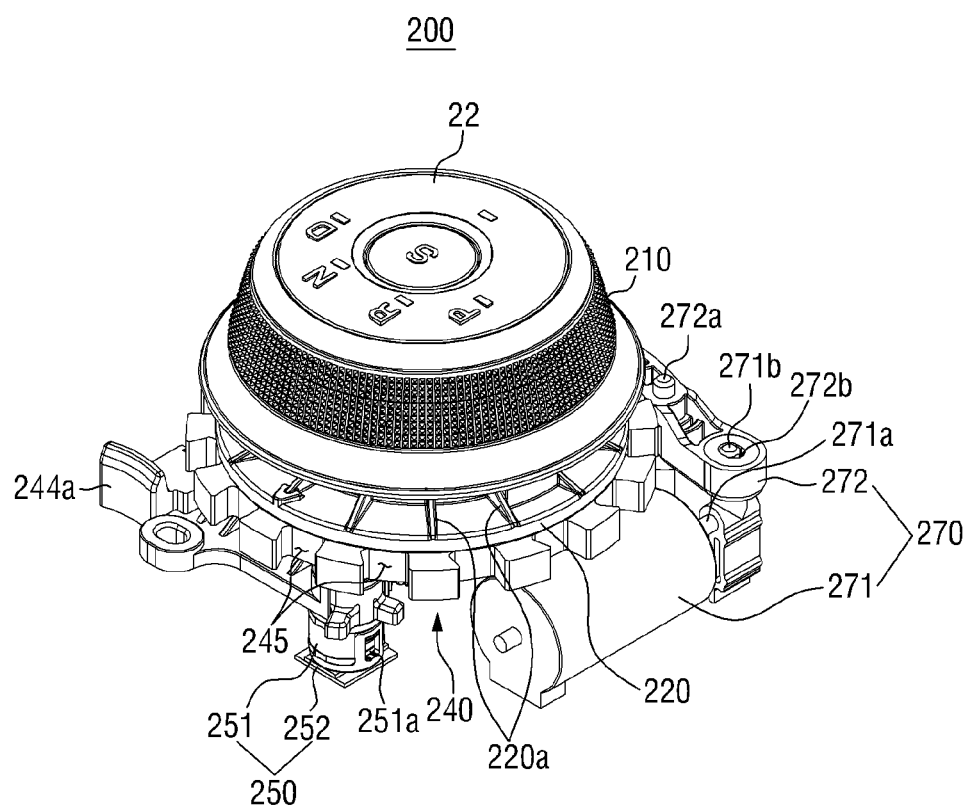
FIGS. 21 to 23 are perspective views illustrating the vehicle transmission according to another exemplary embodiment of the present invention.
Figure 22:
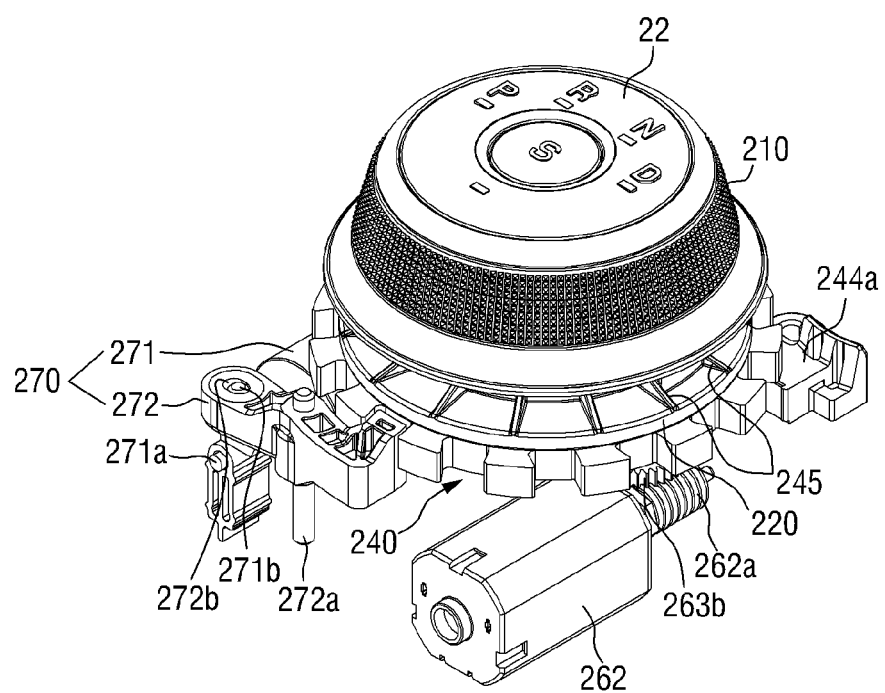
Figure 23:
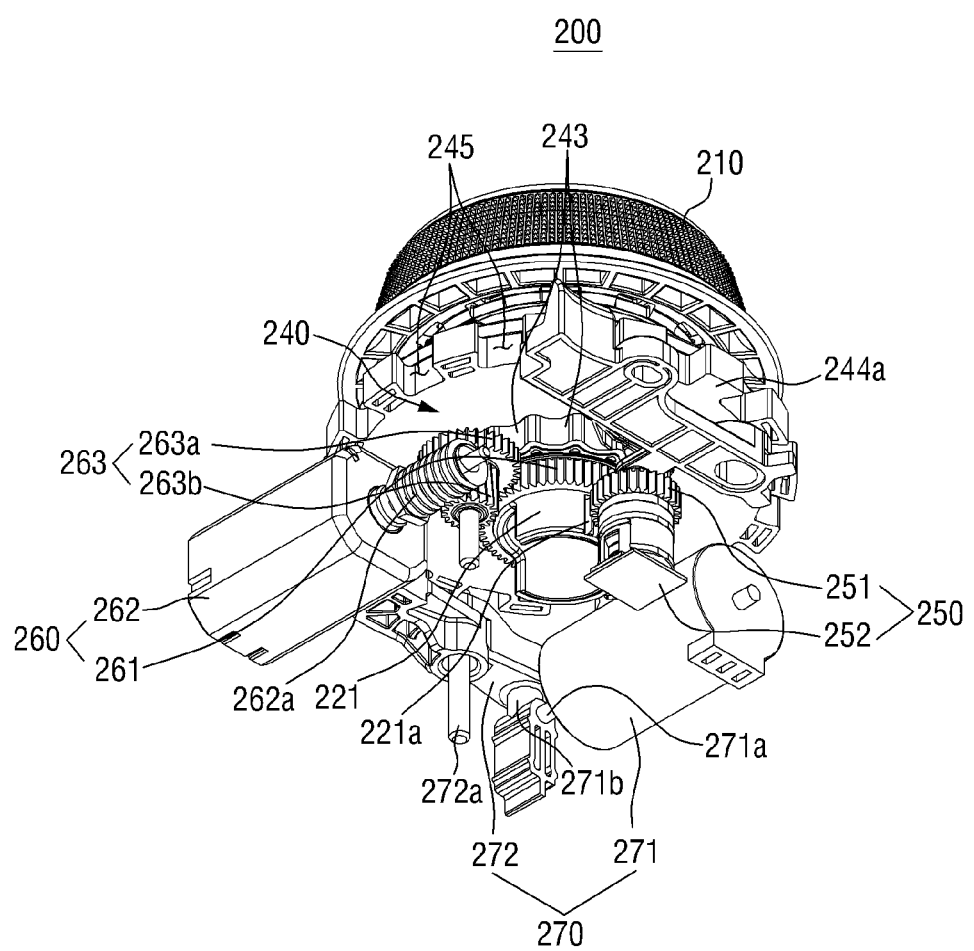
Figure 24:
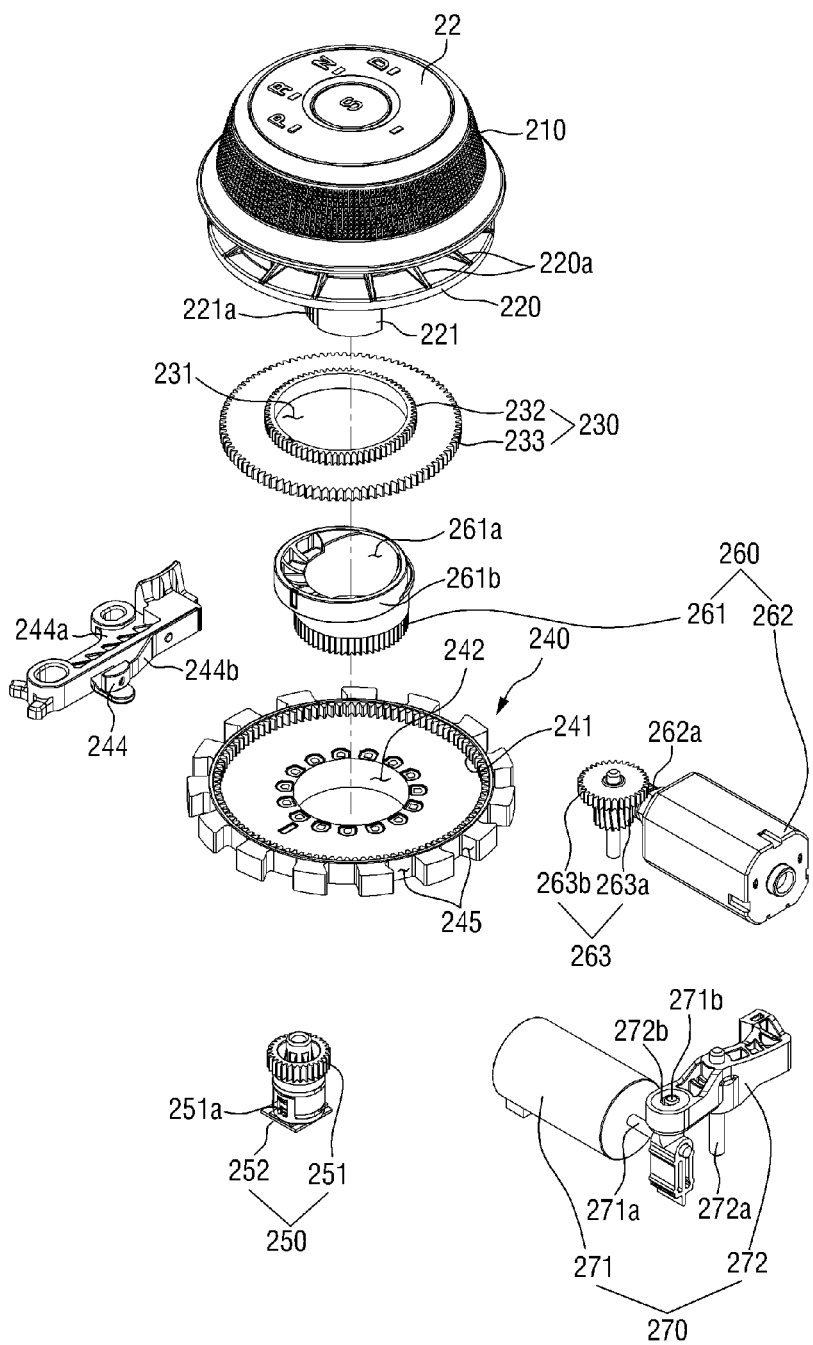
FIGS. 24 and 25 are detailed views of the vehicle transmission according to another exemplary embodiment of the present invention.
Figure 25:
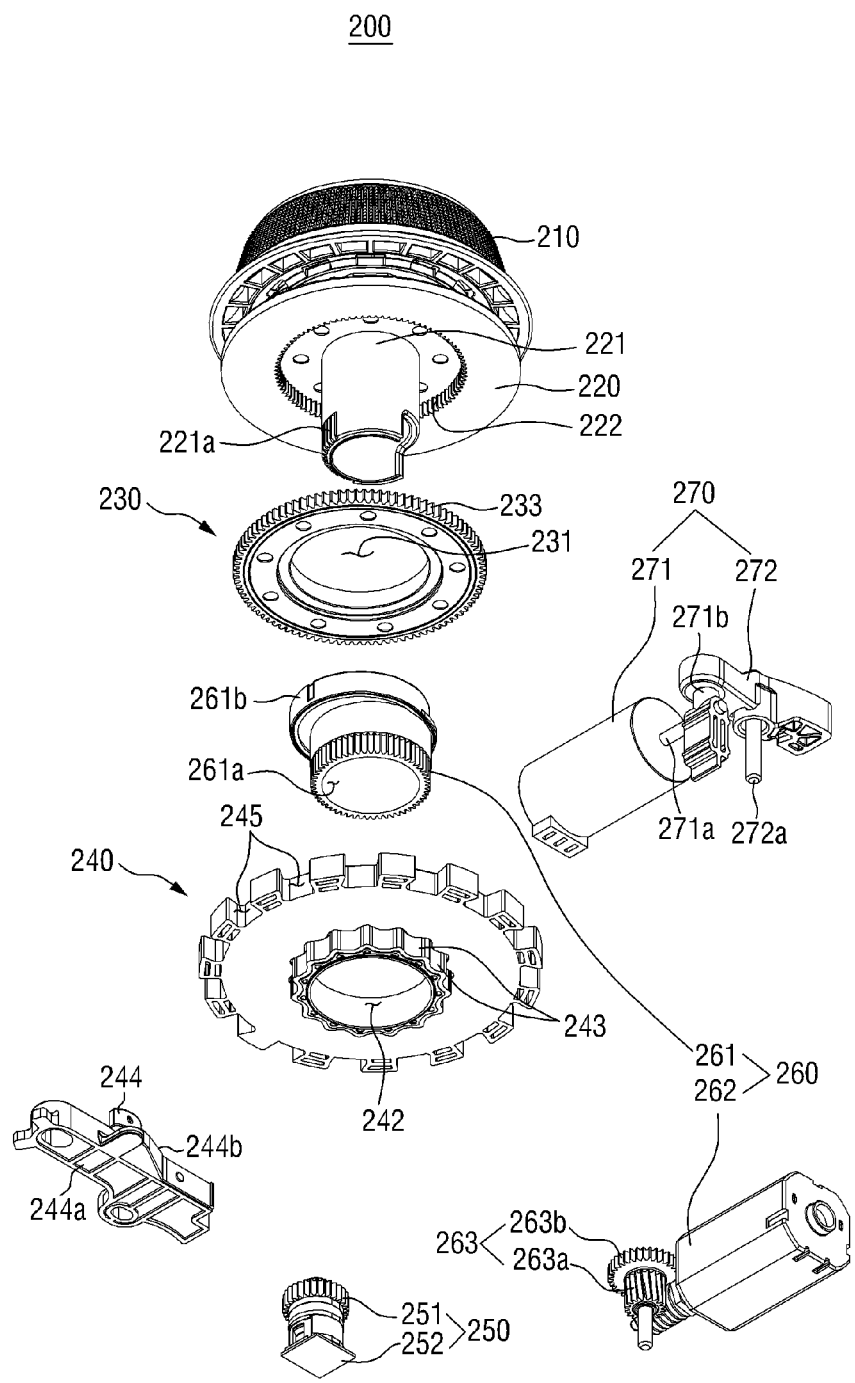
Figure 26:
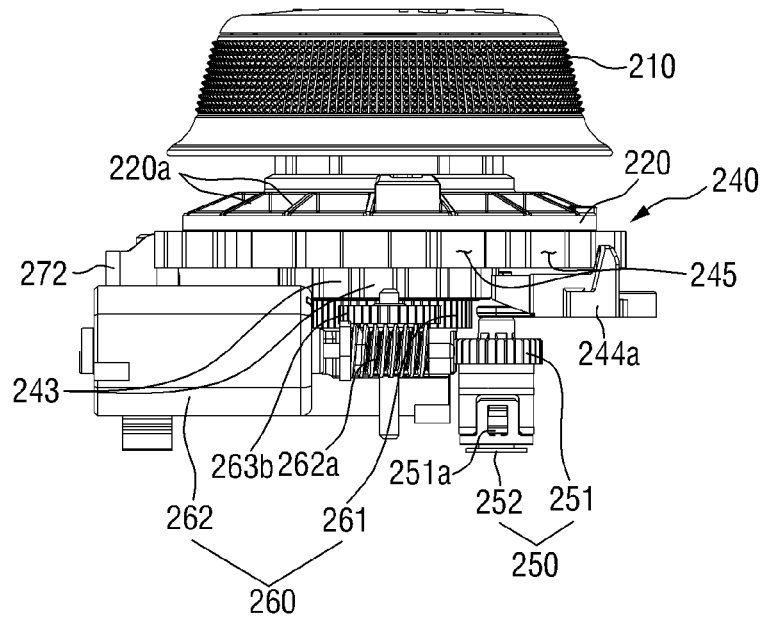
FIG. 26 is a side view illustrating the vehicle transmission according to another exemplary embodiment of the present invention.
Figure 27:
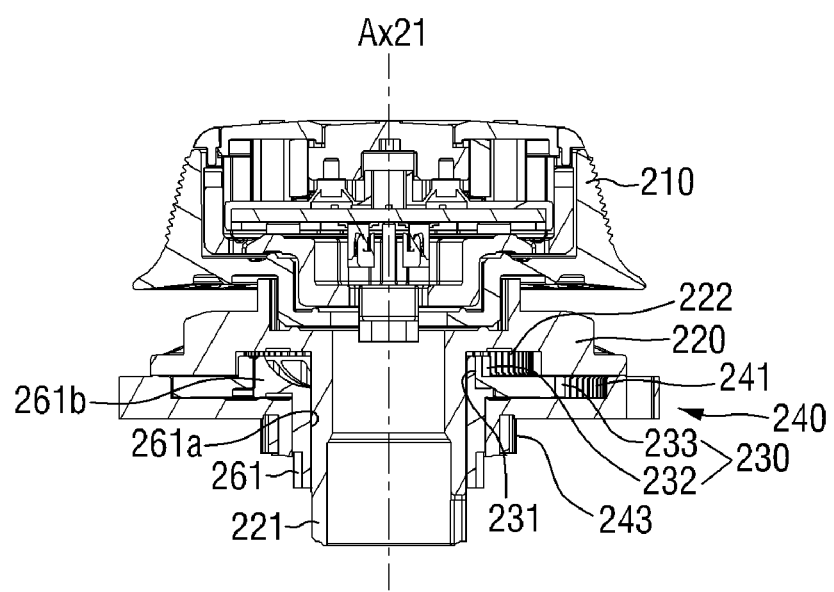
FIGS. 27 through 30 are cross-sectional views illustrating the vehicle transmission according to another exemplary embodiment of the present invention.
Figure 28:
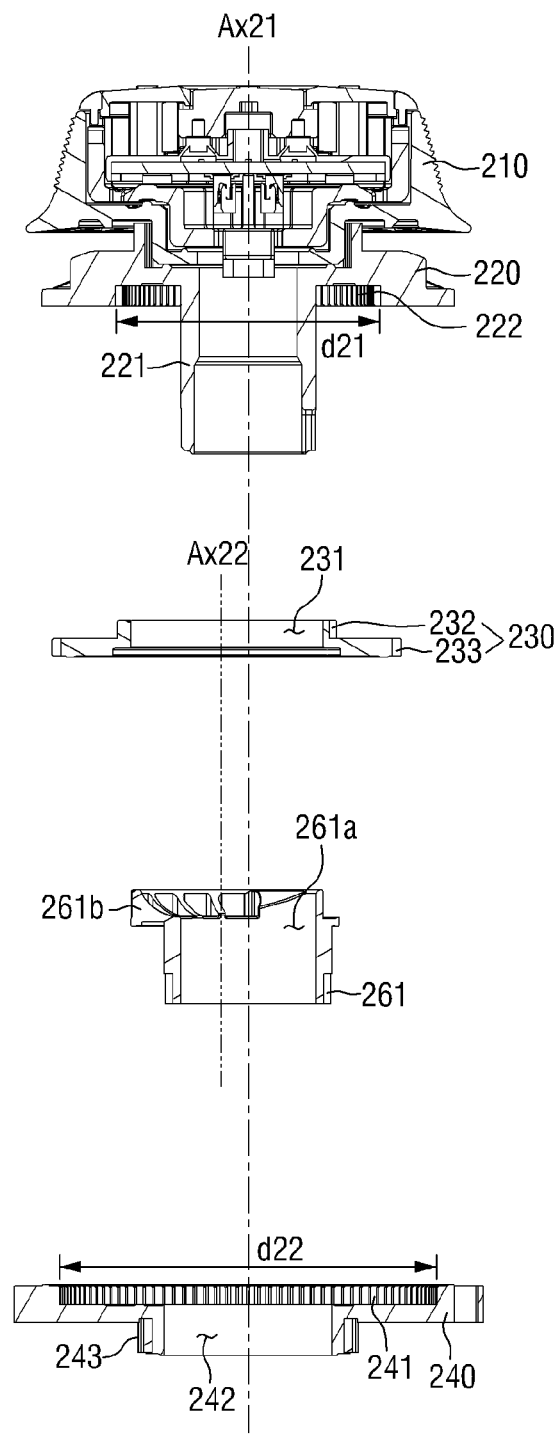

FIGS. 21 to 23 are perspective views illustrating the vehicle transmission according to another exemplary embodiment of the present invention, FIGS. 24 and 25 are detailed views of the vehicle transmission according to another exemplary embodiment of the present invention, FIG. 26 is a side view illustrating the vehicle transmission according to another exemplary embodiment of the present invention, and FIGS. 27 through 30 are cross-sectional views illustrating the vehicle transmission according to another exemplary embodiment of the present invention.

Referring to FIGS. 21 through 28, a vehicle transmission 200 according to another embodiment of the present invention may include a knob 210, a plurality of gear units 220 and 230, an operation unit 240, a detection unit 250, a restoring unit 260 and a locking unit 270. Although it is not illustrated in FIGS. 21 to 28, the remaining components other than the knob 210 may be disposed in a case (not illustrated) and may be disposed within the vehicle body.

Furthermore, the knob 210 may be configured to rotate to select the shift stage when the external force is applied by the driver in the same way in the above-described exemplary embodiments, and the knob 210 may include a display device 22 configured to display the selectable shift stage or the currently selected shift stage. In another exemplary embodiment of the present invention, although the description will be given of the display device 22 fixed and an outer surface of the knob 210 rotated to select the shift stage as an example, the knob 210 and the display device 22 may also be rotated together without being limited thereto.

The plurality of gear units 220 and 230 may be configured to transmit the rotational force of the knob 210 to the operation unit 240 or transmit the rotational force of a restoring unit 260 to be described later to the knob 210. In addition, the plurality of the gear units 220 and 230 may include a first gear unit 220 and a second gear unit 230. The knob 210 may be disposed on one side (e.g., an upper side) of the first gear unit 220, and the first gear unit 220 may be rotated with the knob 210 about the same rotational axis Ax21 as the knob 210, when the knob 210 is rotated.

The knob 210 location may also include being disposed proximate to the upper side of the first gear unit 220 as well as being disposed adjacent to the upper side of the first gear unit 220. In addition, although the description will be given of the knob 210 and the first gear unit 220 formed separately and coupled to each other, the knob 210 and the first gear unit 220 may be configured integrally with each other, without being limited thereto.

Furthermore, the outer circumference of the first gear unit 220 may have a recessed shape and may be formed to be partitioned by a plurality of partition walls 220a. In particular, it may be possible to obtain an effect in which rigidity may be reinforced, while the weight of the first gear unit 220 may be reduced. When the knob 210 is rotated, the rotational force of the knob 210 may be transferred to the first gear unit 220, the rotational force of the first gear unit 220 may be transmitted to the second gear unit 230 disposed on the lower side of the first gear unit 220, and the rotational force transmitted to the second gear unit 230 may be transmitted to the operation unit 240 disposed on the lower side of the second gear unit 230.

In another exemplary embodiment of the present invention, the description will be given of the second gear unit 230 disposed on the lower side of the first gear unit 220 and the operation unit 240 disposed on the lower side of the second gear unit 230. However, it may also be possible to include the second gear unit 230 disposed proximate to the lower side of the first gear unit 220 as well as being disposed adjacent to the lower side of the first gear unit 220, and it may also be possible to include the operation unit 240 disposed proximate to the lower side of the second gear unit 230 as well as being disposed adjacent to the lower side of the second gear unit 230.

The second gear unit 230 may be formed with a cavity 231 (e.g., an aperture, a through-hole, etc.) into which the shaft 221 of the first gear unit 220 may be inserted, and may include a plurality of external gears 232 and 233 formed integrally to have the different diameters. The description will be given of the plurality of external gears 232 and 233 as an external gears formed to have different radii from the center of the cavity 231 of the second gear unit 230 as an example.

Hereinafter, in another exemplary embodiment of the present invention, the plurality of external gears 232 and 233 will be referred to as each of a first external gear 232 and a second internal gear 233. The first external gear 232 may be disposed to have a first side mesh with the first internal gear 222 formed on a second side (e.g., the lower side) of the first gear unit 220, and the second external gear 233 may be disposed with a first side that meshes with the second internal gear 241 formed on a first side (e.g., the upper side) of the operation unit 240. Therefore, when the knob 210 rotates, the first external gear 232 disposed to mesh with the first internal gear 222 of the first gear unit 220 may be configured to rotate and the second external gear 233 may be configured to rotate simultaneously. When the second external gear 233 rotates, the operation unit 240 may be rotated by the second internal gear 241 of the operation unit 240 disposed to mesh with the second external gear 233.

Moreover, in another exemplary embodiment of the present invention, the central axis Ax22 of the first external gear 232 and the second external gear 233 may be spaced apart from the rotational axis Ax21 of the knob 210 in one direction, the diameter of the first external gear 232 may be less than the diameter d21 of the first internal gear 222 of the first gear unit 220, and the diameter of the second external gear 233 may be less than the diameter d22 of the second internal gear 241 of the operation unit 240. Accordingly, the present invention may be advantageous for miniaturization (e.g., reducing overall size), while achieving the sufficient reduction effects, by allowing the first external gear 232 and the second external gear 233 to revolve around the rotational axis Ax21 of the knob 210 and to rotate about the central axis Ax22, thereby achieving a high gear ratio without increasing the difference in diameters of the gears meshing with each other.

Figure 29:
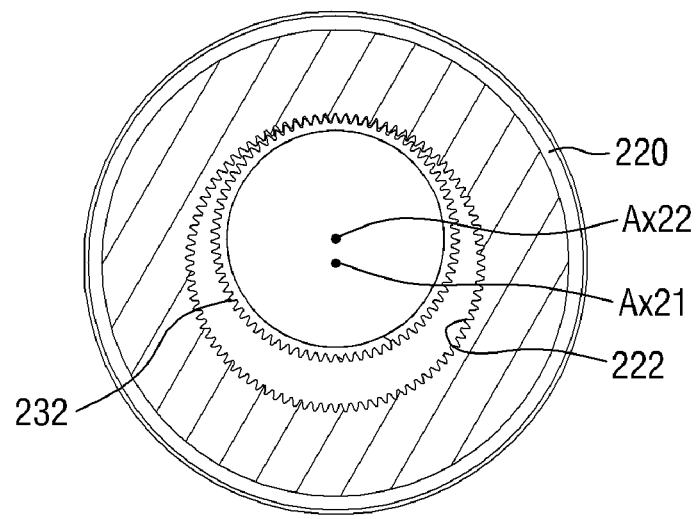
Figure 30:
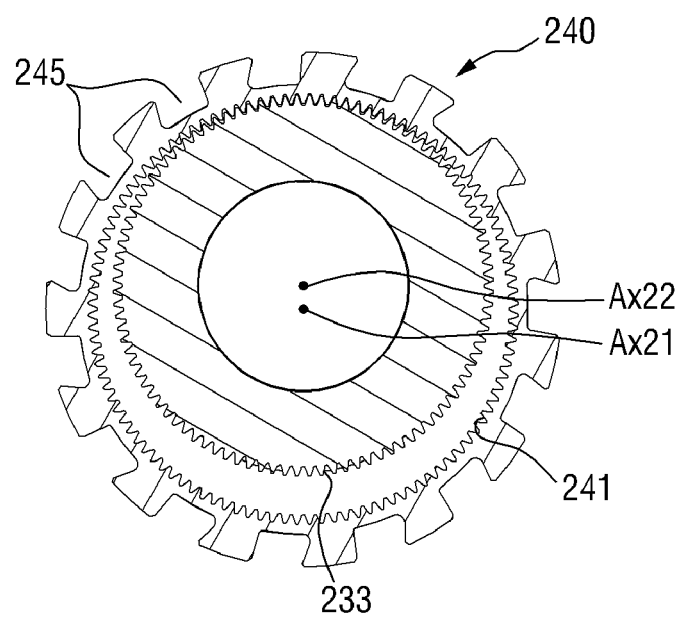

In other words, the second gear unit 230 may be disposed with a first side of the first external gear 232 meshing with the first internal gear 222 of the first gear unit 220 as illustrated in FIG. 29, a second side of the external gear 232 may be spaced apart from the first internal gear 222 of the first gear unit 220, and when a first side of the second external gear 233 meshes with the second internal gear 241 of the operation unit 240 as illustrated in FIG. 30, the second side of the second external gear 233 may be spaced apart from the second internal gear 241 of the operation unit 240. Thus, the first external gear 232 and the second external gear 233 may be configured to revolve around the rotational axis Ax21 of the knob 210 and rotate about the central center axis Ax22, to thus obtain the reduction effect.

Furthermore, a plurality of detent grooves 243 may be disposed on the second side (e.g., the lower side) of the operation unit 240 along the periphery of the cavity 242 of the operation unit 240, and the operation feeling may be generated by the catching member 244 that is caught or stopped by the plurality of detent grooves 243 when the operation unit 240 rotates. The catching member 244 may be connected to the second end of the elastic member 244b with a first end fixed to the support member 244a, and since the catching member 244 may be elastically supported by the elastic member 244b, the catching member 244 may be maintained in contact with the plurality of detent grooves 243, and the operation feeling may be generated when the operation unit 240 rotates.

Although the description will be given of the elastic member 244b formed as a leaf spring or the like in another exemplary embodiment of the present invention as an example, the elastic member 244b may have various shapes capable of elastically supporting the catching member 244, without being limited thereto. Furthermore, in another exemplary embodiment of the present invention, the plurality of detent grooves 243 may be disposed to have a smaller diameter than the operation unit 240 around the cavity 242 of the operation unit 240. Even in this case, since the catching member 244 may be maintained in contact with the plurality of detent grooves 243 by an elastic member 244b such as a leaf spring, the weight and size may be reduced.

Additionally, a plurality of fixing grooves 245 may be formed on the outer circumference of the operation unit 240, such a plurality of fixing grooves 245 may be used to restrain the rotation of the operation unit 240 or release the restraint thereof, and the detailed description thereof will be provided later. Meanwhile, a detection unit 250 configured to detect the shift stage selected by the rotation of the knob 210 may be disposed on one side of the shaft 221 of the first gear unit 220. The shaft 221 of the first gear unit 220 may be disposed through the cavity 221 of the second gear unit 220 and the cavity 242 of the operation unit 240. The detection unit 250 may include a gear 251 including a magnet 251a on one side and may be disposed to mesh with the shaft gear 221a formed on the shaft 221 of the first gear unit 220, and a sensor 252 such as a Hall sensor configured to detect a change in the magnetic force caused by the turning of the gear 251.

Although the description will be given of detecting the shift stage using a change in the magnetic force based on the position of the magnet 251a in another exemplary embodiment of the present invention as an example, it may be possible to detect the shift stage through various methods such as detection of the shift stage by detecting the number of slits passing between the light-receiving element and the light-emitting element, without being limited thereto.

The restoring unit 260 may be configured to restore the knob 210 to the preset shift stage, when the preset restoring conditions are satisfied to prevent problems when operating the vehicle in the future, even when the driver separately restores the shift stage, by restoring the knob 210 to the preset shift stage when the ignition of the vehicle is turned off or there is another operation command. In addition, the restoring unit 260 may be configured to restore the knob 210 to the parking stage when the restoring conditions from the non-parking condition to the parking condition are satisfied, or may be configured to restore the knob 210 to the previous shift stage when an erroneous operation of the knob 210 occurs, in the same manner as in the above-described embodiments.

Additionally, the restoring unit 260 may include a third gear unit 261 and a drive unit 262. The third gear unit 261 may be rotated by the drive unit 262, and may be formed with a cavity 261a into which the shaft 221 of the first gear unit 220 may be inserted. An insertion protrusion 261b may be formed on one side of the third gear unit 261. The insertion protrusion 261b may be connected to the cavity 242 of the operation unit 240 and may be inserted into the cavity 231 of the second gear unit 230. A central axis Ax22 of the insertion protrusion 261b may be spaced apart from the rotational axis Ax21 of the knob 210 in one direction, similarly to the central axis Ax22 of the second gear unit 230, i.e., the first gear 232 and the second gear 233. A worm gear 262a may be disposed in the rotational shaft of the drive unit 262, and a reduction gear 263 adapted to perform the reduction based on the reduction ratio of the input shaft gear 263a and the output shaft gear 263b may be disposed between the third gear unit 261 and the worm gear 262a to obtain a reduction effect.

In the restoring unit 260, since the center axis Ax22 of the insertion protrusion 261b of the third gear unit 261 inserted into the cavity 231 of the second gear unit 230 may be spaced apart from the rotational axis Ax21 of the knob 210, the second gear unit 230 may be configured to receive force in the outward direction based on the rotational axis Ax21 of the knob 210 during rotation of the third gear unit 261. Thus, the second gear unit 230 may be configured to revolve around the rotational axis Ax21 of the knob 210 and rotate about the central axis Ax22.

Accordingly, when the second gear unit 230 is rotated by the drive unit 262 of the restoring unit 260, the knob 210 coupled to the first gear unit 220 may be configured to rotate. However, in another exemplary embodiment of the present invention, since the second gear unit 230 revolves around the rotational axis Ax21 of the knob 210 and rotates about the central axis Ax22, the speed reduction effect may be obtained, and it may be advantageous for miniaturization as compared to using the diameter of substantial differences to obtain a high gear ratio.

Further, when the knob 210 is restored to the preset shift stage by the restoring unit 260, the ignition of the vehicle may be turned off or there is another operation command, and an occurrence of the operation feeling is not required. Thus, the locking unit 260 may be configured to restrain the rotation of the operation unit 220 and prevent an occurrence of unnecessary operation feeling to reduce the noise.

The locking unit 270 may include a drive unit 271 and a locking member 272. In particular, the drive unit 271 of the locking unit 270 may be a bidirectional solenoid as in the above-described exemplary embodiments and may include a moving rod 271a configured to move linearly. The locking member 272 may be connected to a first end of the moving rod 271a and may be rotated about the rotation shaft 272a during the movement of the moving rod 271a. Thus, when one side of the locking member 272 is inserted into any one of the plurality of fixing grooves 245, the locking member 272 may be configured to restrain the rotation of the operation unit 240, and in contrast, when one side of the locking member 272 is disengaged from the plurality of fixing grooves 245, the locking member 272 may be configured to release the restraint of the rotation of the operation unit 240.

Figure 31:
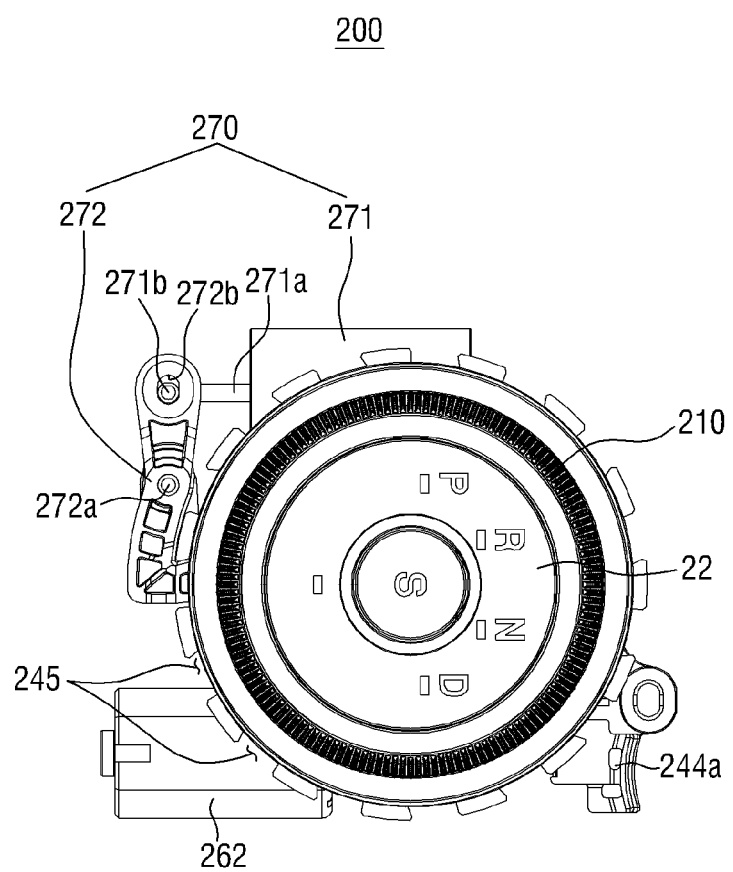
FIGS. 31 and 32 are plan views illustrating the vehicle transmission according to another exemplary embodiment of the present invention.
Figure 32:
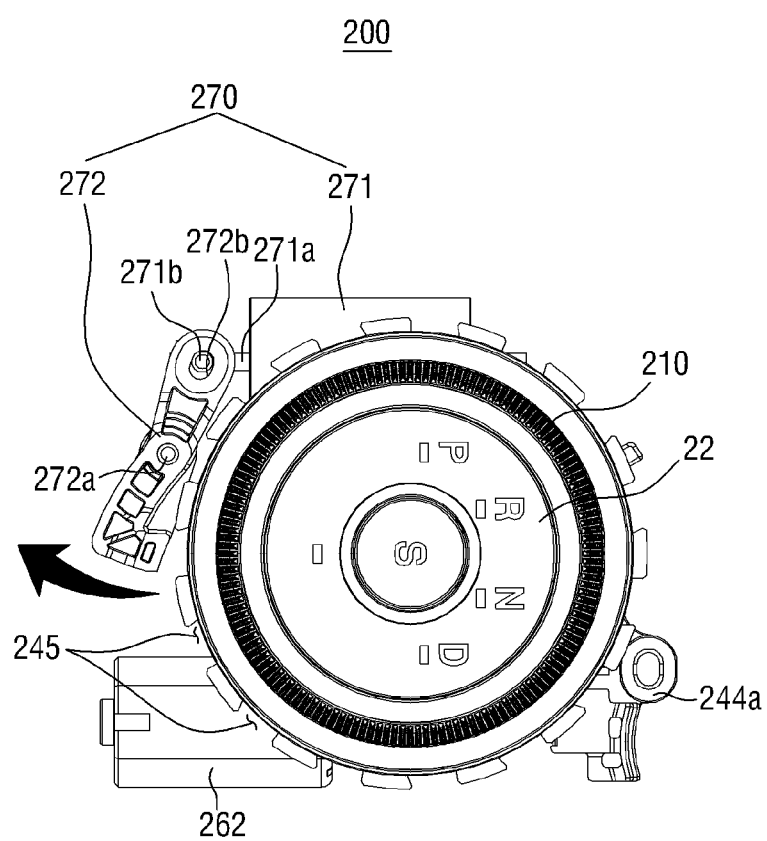

An insertion protrusion 271b inserted into the insertion groove 272b formed in the locking member 272 may be connected to a first end of the moving rod 271a. As the moving rod 271a is moved, the insertion protrusion 271b flows inside the insertion groove 272b, and the linear movement of the moving rod 271a may be converted into the rotational movement of the locking rod 272. In other words, when attempting to constrain the rotation of the operation unit 240, the locking unit 270 may be disposed with a first side of the locking member 272 inserted into one of the plurality of fixing grooves 245 as illustrated in FIG. 31. However, when releasing the restrain of the rotation of the operation unit 240, while the locking member 272 is rotated in an opposite direction of FIG. 31, the position thereof may change and one side of the locking member 272 may be disengaged from the plurality of fixing grooves 245 as in FIG. 32, thereby making it possible to release the restraint of the rotation of the operation unit 240.

Further, in another exemplary embodiment of the present invention, the description will be given of the drive unit 271 of the locking unit 270 being a bidirectional solenoid similar to above-described FIGS. 12 through 14 in which the power may be supplied during movement of the moving rod 271a, and after the movement of the moving rod 271a is completed, even when the power supply is stopped, the moving rod 271a may be maintained at the current position without being restored to the previous position.

As described above, the vehicle transmission 100 of the present invention may be reduced in size, while achieving a high gear ratio, by allowing the gear units configured to rotate about the axes different from the rotational axes Ax11 and Ax21 of the knobs 110 and 210 to rotate in the state of meshing with each other.

In the above-described embodiments, the vehicle transmissions 100 and 200 are of a dial type in which the knobs 110 and 210 may rotate about the rotational axes Ax11 and Ax21 passing through the centers of the knobs 110 and 210 in a longitudinal direction of the shafts 111 and 221. However, the vehicle transmissions 100 and 200 may also be of a joystick (e.g., lever) type.

Figure 33:
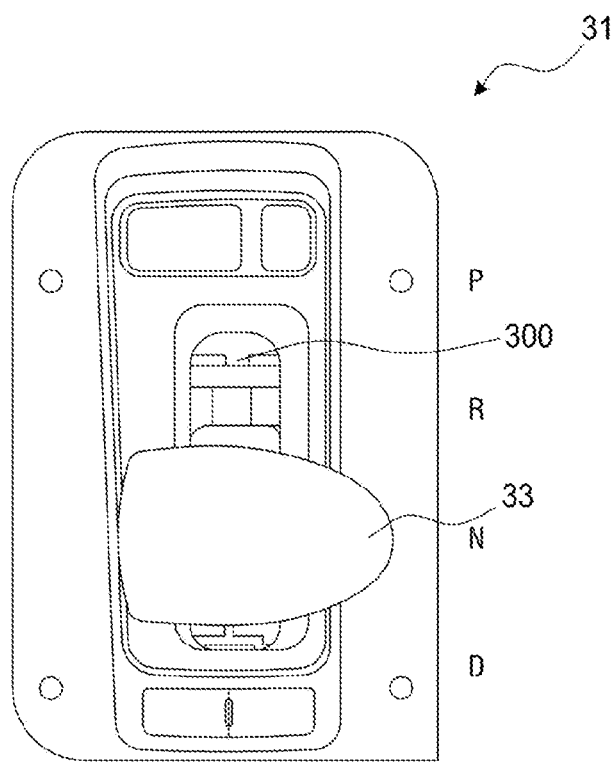
FIG. 33 is a plan view of a console of a vehicle equipped with a vehicle transmission according to another exemplary embodiment of the present invention.

FIG. 33 is a plan view of a console 31 of a vehicle equipped with a vehicle transmission 300 according to another exemplary embodiment of the present invention.

A driver may select one of a plurality of shift stages P, R, N and D by displacing a knob or a handle 33 formed at an end of a shift lever toward the front or rear direction of the vehicle. In this way, the shift lever may be displaced to have a rectilinear movement toward the front or rear direction of the vehicle when viewed from above the vehicle. The vehicle transmission 300 according to the exemplary embodiment of the present invention may not be limited to such a straight (e.g., linear) gate type, but may also be of a step gate type in which the shift lever may be moved not only forward and backward but also to the right and left in order to select a shift stage.

Figure 34:
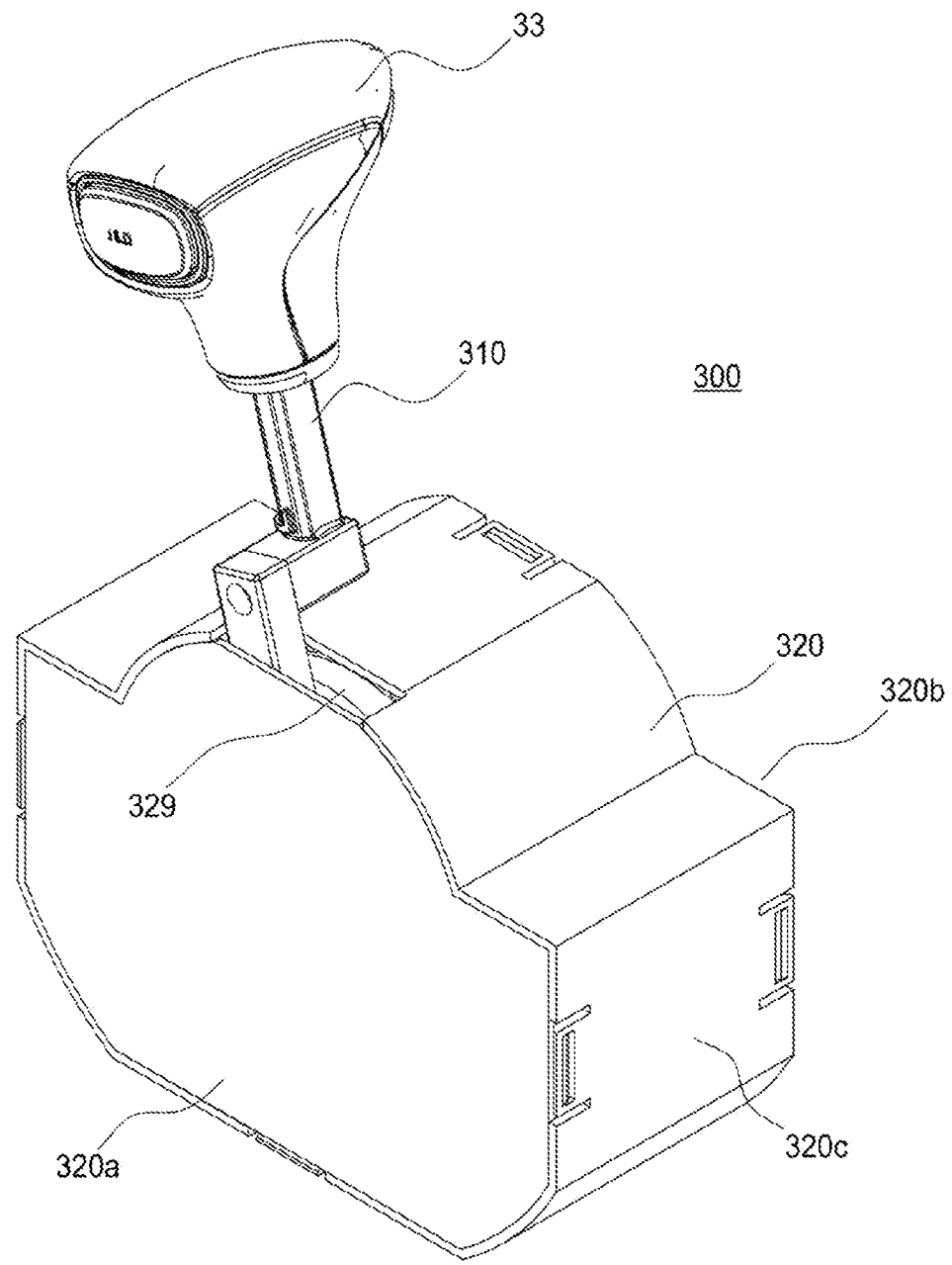
FIG. 34 is a perspective view of a vehicle transmission according to another exemplary embodiment of the present invention.

FIG. 34 is a perspective view of a vehicle transmission 300 according to another exemplary embodiment of the present invention. The vehicle transmission 300 may include a shift lever 310 which has a handle 33 formed at an end and a housing 320 which accommodates the shift lever 310 and has an opening 329 for allowing the shift lever 310 to move without interference. The housing 320 may be composed of, for example, a left cover 320a, a right cover 320b, and a middle cover 320c that may be fastened to the left and right covers 320a and 320b. In FIG. 34, the covers 320a through 320c may be snap-fitted to each other. However, the covers 320a through 320c may also be fastened together using other methods.

Figure 35A:
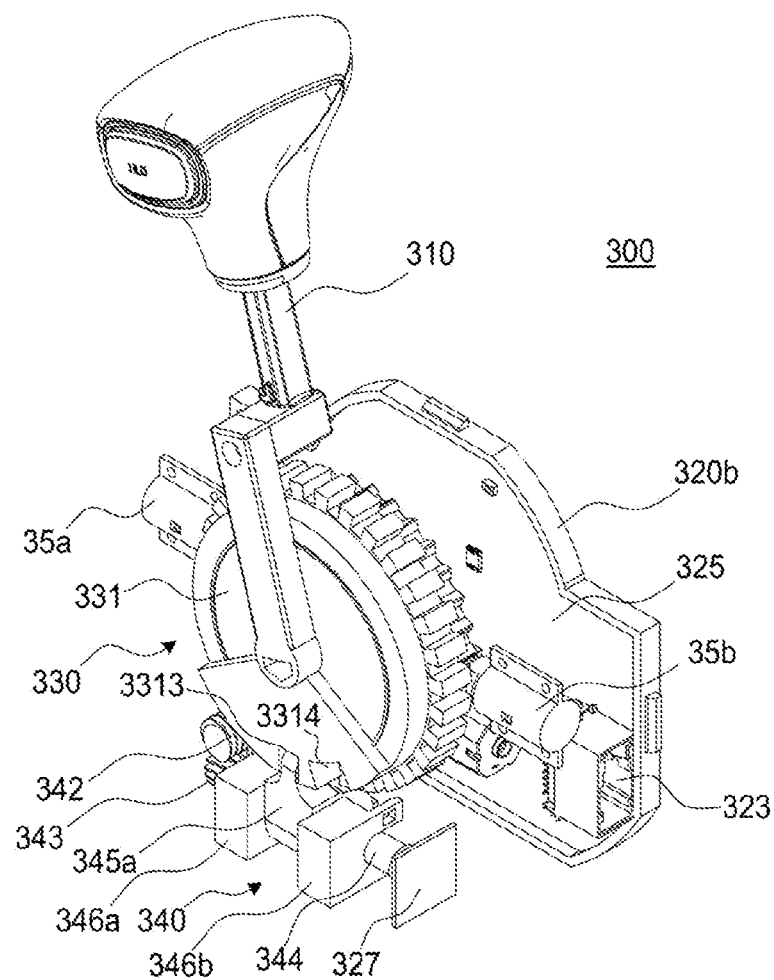
FIGS. 35A and 35B are respectively a perspective view and a left side view of the vehicle transmission of FIG. 34 with a left cover and a middle: cover removed.
Figure 35B:
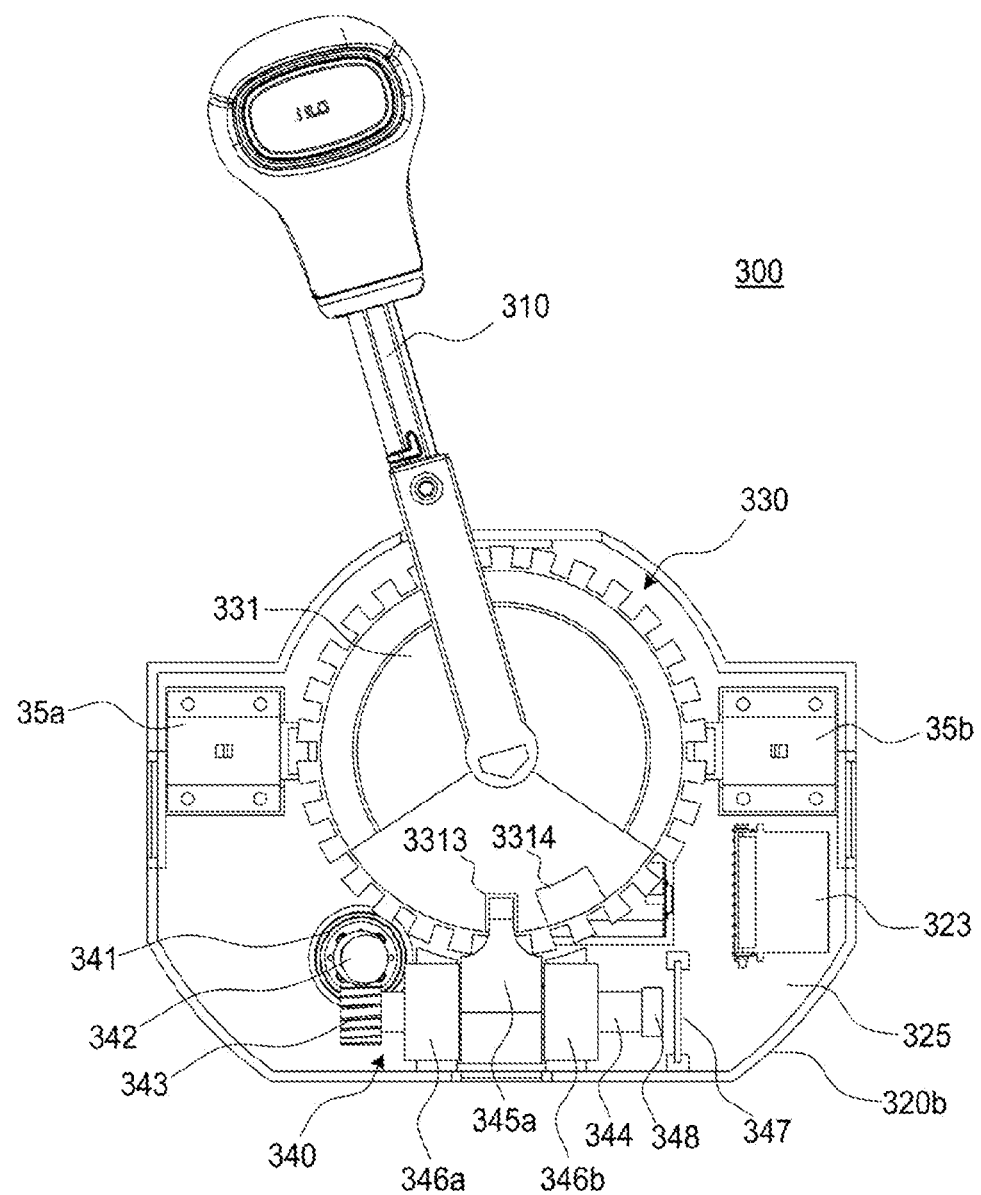

FIGS. 35A and 35B are respectively a perspective view and a left side view of the vehicle transmission 300 of FIG. 34 with the left cover 320a and the middle cover 320c removed. The vehicle transmission 300 may include the shift lever 310 which is at least partially displaced toward the front or rear of a vehicle by operation of a driver to select one of a plurality of shift stages P, R, N and D and a gear assembly 330 which transmits a rotational motion based on the operation of the shift lever 310 to a shift stage sensor (not illustrated).

In the exemplary embodiment of the present invention, shift stages selected by the operation of the shift lever 310 may include P, R, N, and D stages, and positions of the shift lever 310 may include P, R, N and D positions and a stow position at which the shift lever 310 may be housed in a predetermined receiving space.

The stow position may be a position where no switch between shift stages is made and the shift lever 310 does not protrude inside the vehicle. For example, when there is no need to select a shift stage by operating the shift lever 310 because the vehicle is turned off, the stow position may be understood as a position that reduces the space occupied by the shift lever 310 to improve space utilization within the vehicle.

In the exemplary embodiment of the present invention, the stow position will be described using a case where the position of the P stage and the position of the shift lever 310 are different from each other but the shift stage is maintained at the P stage as an example.

A movable plate 331 formed on the front surface of the gear assembly 330 may include one or more fixing grooves or notches 3313 and 3314 formed in a radial direction toward a center. In particular, a first notch 3313 may be designed to provide a shift lock when the driver places the shift lever 310 at the P stage and turns off the engine, so that the shift lever 310 may not be displaced to other shift stages. The second notch 3314 may be designed to provide a shift lock when the driver places the shift lever 310 at a shift stage (e.g., N or D) other than the P stage, so that the shift lever 310 may not be displaced to other shift stages (e.g., P and R). Since the shift lock may be released when the driver presses the brake pedal, the driving safety of the vehicle may be improved.

A shift lock mechanism 340 may be coupled to or decoupled from the notch 3313 or 3314 to provide a shift lock function. The shift lock mechanism 340 may include a locking actuator 341 which provides a rotational driving force, a pivot shaft 344 which is disposed along a predetermined direction (e.g., a front-rear direction of the vehicle) and rotated by the provided rotational driving force, and a first latching protrusion 345a which may be coupled to or decoupled from the notch 3313 or 3314 while rotating integrally with the pivot shaft 344. Further, the pivot shaft 344 may be supported on one or more support members 346a and 346b.

Specifically, the locking actuator 341 may include an electric motor, and a worm gear may be formed on an outer circumferential surface of a drive shaft 342 of the electric motor. The worm gear may be engaged with a pinion gear 343, which is formed at an end of the pivot shaft 344, in a direction orthogonal to the pinion gear 343. Therefore, a rotational driving force of the drive shaft 342 may be transmitted to the pivot shaft 344 at a reduced speed. Consequently, the first latching protrusion 345a may be coupled to or decoupled from the notch 3313 or 3314 by the rotational driving force of the electric motor. Due to the characteristics of the coupling between the worm gear 342 and the pinion gear 343, the transmission of the driving force may be unidirectional. In other words, the driving force may be transmitted from the worm gear to the pinion gear 343, but may not be transmitted from the pinion gear 343 to the worm gear. Therefore, when the power of the electric motor is cut off while the first latching protrusion 345a is coupled to the notch 3313 or 3314 by the electric motor, the first latching protrusion 345a may not be separated from the notch 3313 or 3314. Thus, stability may be ensured through self-locking.

A magnet 349 (see FIG. 36A) may be disposed inside an end 348 of the pivot shaft 344 which is opposite to the pinion gear 343. The magnet 349 may enable a rotation angle of the pivot shaft 344 to be sensed by a magnetic force sensor a Hall IC) disposed on an auxiliary circuit board 347. The specific shape and structure of the magnet 349 will be described later with reference to FIG. 41. The magnetic force sensor may sense the current position of the pivot shaft 344, that is, whether the pivot shaft 344 is in a locked state or an unlocked state. In addition to the auxiliary circuit board 347, a main circuit board 325 may be disposed on an inner surface of the right cover 320b. The main circuit board 325 may include a socket 323 into which cables for supplying power to various actuators and sensors may be inserted.

Figure 36A:
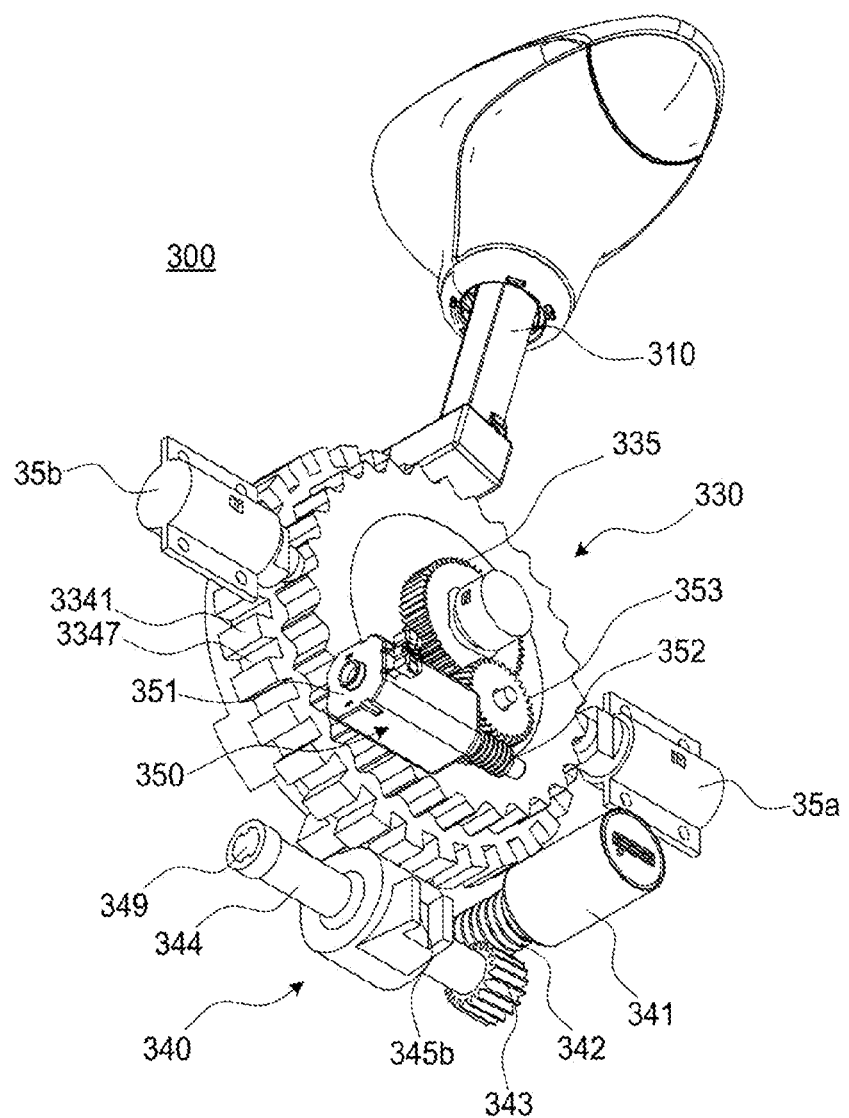
FIGS. 36A and 36B are respectively a perspective view and a right side view of the vehicle transmission of FIG. 34 with a right cover and the middle cover removed.
Figure 36B:
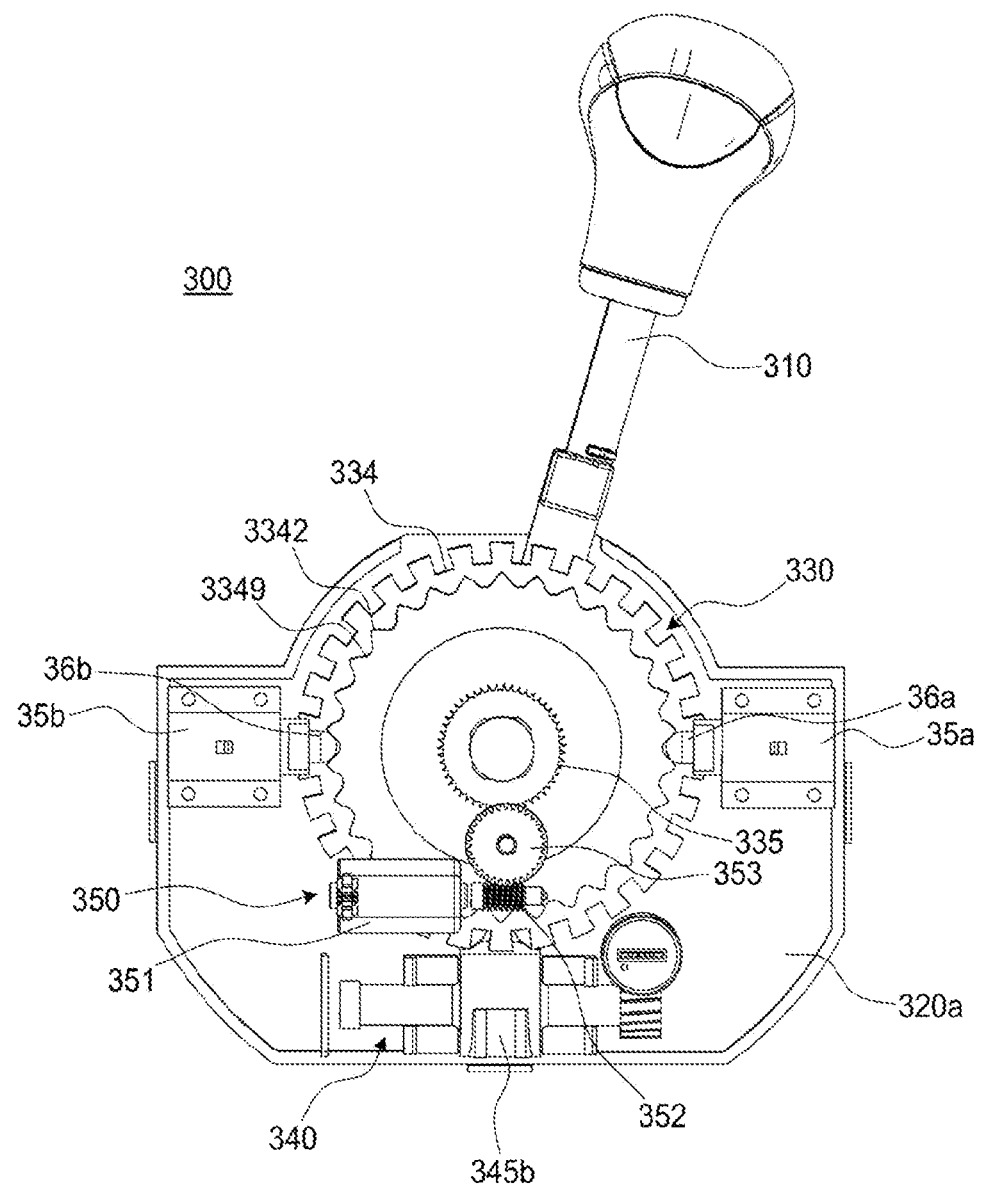

FIGS. 36A and 36B are respectively a perspective view and a right side view of the vehicle transmission 300 of FIG. 34 with the right cover 320b and the middle cover 320c removed.

As described above, the locking actuator 341 which provides a rotational driving force, the pivot shaft 344 which is rotated by the provided rotational driving force, and the first latching protrusion 345a which may be coupled to or decoupled from the notch 3313 or 3314 while rotating integrally with the pivot shaft 344 may be provided. In addition, the pivot shaft 344 may further include a second latching protrusion 345b in addition to the first latching protrusion 345a. The second latching protrusion 345b may be coupled to or decoupled from a plurality of fixing grooves 3347 formed in a circumferential direction of a locking unit 3341 of a rotation unit 334. When the second latching protrusion 345b is coupled to the fixing grooves 3347, the rotation unit 334 may be restrained from rotating. On the other hand, when the second latching protrusion 345b is decoupled from the fixing grooves 3347, the rotation unit 334 may rotate. The first latching protrusion 345a and the second latching protrusion 345b may be disposed at different angular positions on the pivot shaft 344. Therefore, by controlling the rotation of the locking actuator 341, the first latching protrusion 345a or the second latching protrusion 345b may be engaged, or both the first and second latching protrusions 345a and 345b may not be engaged.

As described above, the first latching protrusion 345a for providing a shift lock and the second latching protrusion 345b for fixing the locking unit 3341 of the rotation unit 334 during automatic return to the P stage may be disposed at different angular positions on the pivot shaft 344, and the providing of the shift lock and the fixing of the rotation unit 334 may be accomplished in a simplified and compact structure by rotating the pivot shaft 344.

The vehicle transmission 300 according to the exemplary embodiment of the present invention may include a shift stage return mechanism 350 which provides a driving force to a transmission gear 335 of the gear assembly 330 for automatic return to the P stage, in addition to the locking actuator 341 described above. The shift stage return mechanism 350 may return the shift lever 310 to a preset shift stage when the vehicle is turned off or when there is an operation command. Therefore, when a return condition is satisfied, the shift lever 310 may be automatically returned to the preset shift stage, not manually by the driver, so that problems are prevented when the vehicle is driven later. In the exemplary embodiment of the present invention, the shift stage return mechanism 350 may return the shift lever 310 to a park stage (the P stage) when a return condition from a non-park stage to the park stage (the P stage) is satisfied or may return the shift lever 310 to a previous shift stage when a mal-operation of the shift lever 310 occurs.

In the exemplary embodiment of the present invention, a case where the shift lever 310 is returned to the P stage by the shift stage return mechanism 350 will be described as an example. However, the shift lever 310 may also be returned to the stow position different from the position of the P stage while the P stage is maintained.

In addition, the shift lever 310 may be returned to any one of the P, R, N and D positions and the stow position when there is an operation command in, e.g., an autonomous vehicle.

Specifically, the shift stage return mechanism 350 may include a drive actuator 351, a drive shaft 35:2 which is disposed along the front-rear direction of the vehicle, outputs a rotational force of the drive actuator 351 and has a worm gear formed or attached on an outer circumferential surface, and a pinion gear unit 353 which is engaged with the worm gear and provides a driving force to the transmission gear 335. The pinion gear unit 353 may include a first gear 353a (see FIG. 40) which is engaged with the worm gear and a second gear 353b (see FIG. 40) which is integrally formed with the first gear 353a. The second gear 353b may have fewer teeth than the first gear 353a and the transmission gear 335. Therefore, initial deceleration may occur between the worm gear and the first gear 353a, and further deceleration may occur between the second gear 353b and the transmission gear 335. The first gear 353a may be configured as a spur gear. However, the first gear 353a may also be configured as a helical gear to prevent a reduction in the transmission efficiency of the worm gear. In this case, the worm gear may also be configured as a corresponding helical gear.

Due to the characteristics of the coupling between the worm gear 352 and the pinion gear unit 353, the transmission of the driving force may be unidirectional. In other words, the driving force may be transmitted from the worm gear 352 to the pinion gear unit 353, but may not be transmitted from the pinion gear unit 353 to the worm gear 352. Thus, when the drive actuator 351 rotates the transmission gear 335, the position of the shift lever 310 may be changed to the P stage. However, when the driver operates the shift lever 310, the transmission gear 335 may be fixed by self-locking because the transmission gear 335 cannot rotate the worm gear 352. Since the transmission gear 335 is fixed, the rotation unit 334 to be described later may be rotated according to the operation of the shift lever 310.

In the electronic vehicle transmission 300, it may be necessary to provide the driver with a feeling of operation e.g., tactile feedback). Therefore, the gear assembly 330 of the vehicle transmission 300 may include a detent unit 3342 which includes a plurality of detent grooves 3349 formed in the radial direction along an outer circumferential surface to be engageable with elastic members 35a and 35b. The detent unit 3342 may be a part of the rotation unit 334 which rotates about a rotational axis ax31 (see FIG. 37). Bullets 36a and 36h of the elastic members 35a and 35b may be coupled to the detent grooves 3349 of the detent unit 3342 while being elastically supported by coil springs or the like. To ease assembly tolerance, the detent grooves 3349 and the bullets 36a and 36h may be formed such that contact surfaces between the detent grooves 3349 and the bullets 36a and 36b have a predetermined curvature. For example, surfaces of the detent grooves 3349 which face the bullets 36a and 36b may be concavely formed to have a predetermined curvature toward the rotational axis ax31, and surfaces of the bullets 36a and 36h which face the detent grooves 3349 may be convexly formed to have a predetermined curvature toward the rotational axis ax31. Therefore, when the rotation unit 334 is rotated by the driver, the bullets 36a and 36b may be caught in the detent grooves 3349, thereby generating an operation feeling.

In addition, in the exemplary embodiment of the present invention, the detent unit 3342 may have a diameter less than a diameter of the rotation unit 334. Thus, the space required to generate a feeling of operation may be reduced, which may result in a reduction in the weight and/or size of the vehicle transmission 300.

Figure 37A:
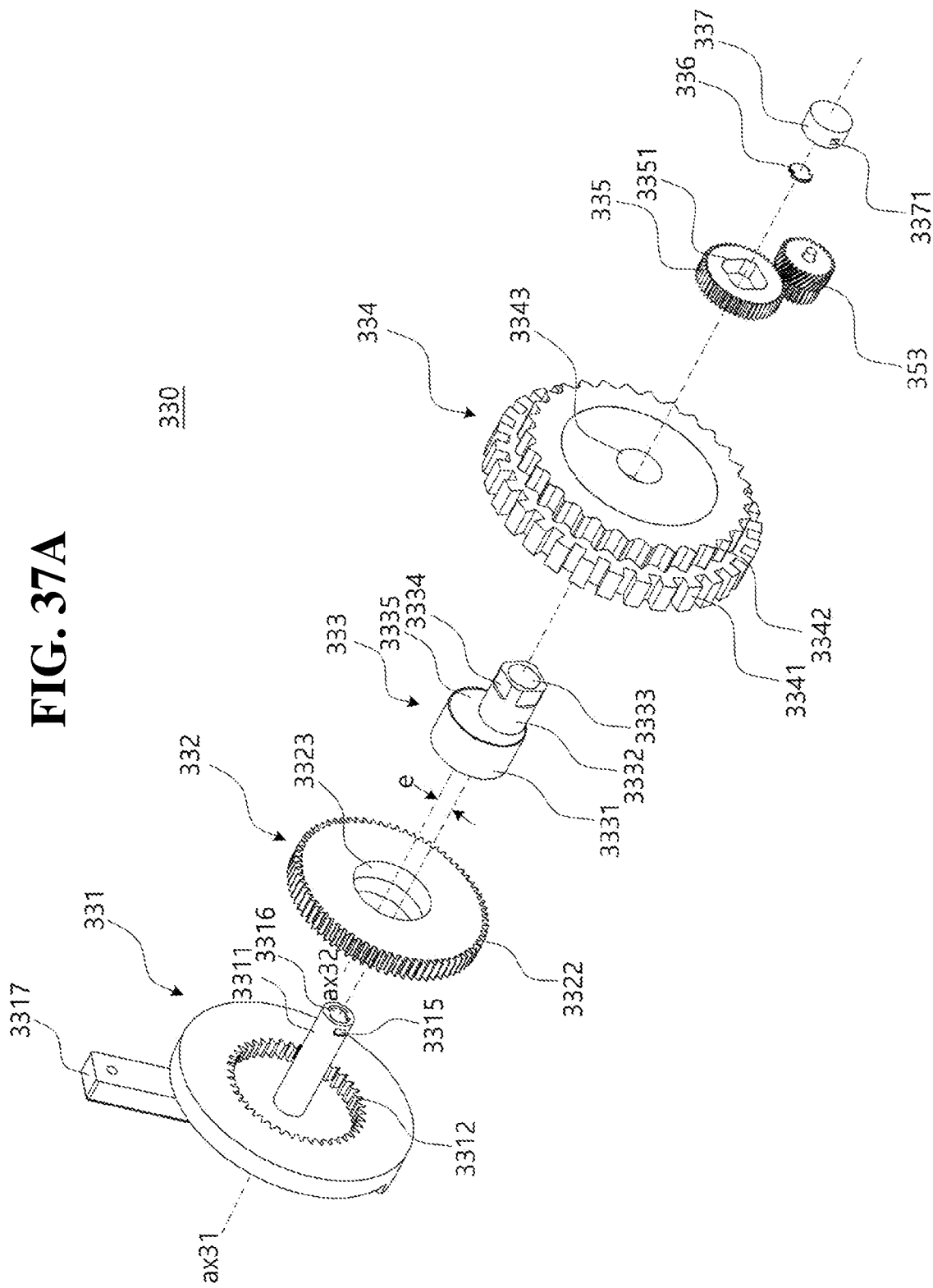
FIGS. 37A through 37C are respectively a right perspective view, a left perspective view, and a plan view of a gear assembly according to another exemplary embodiment of the present invention.
Figure 37B:
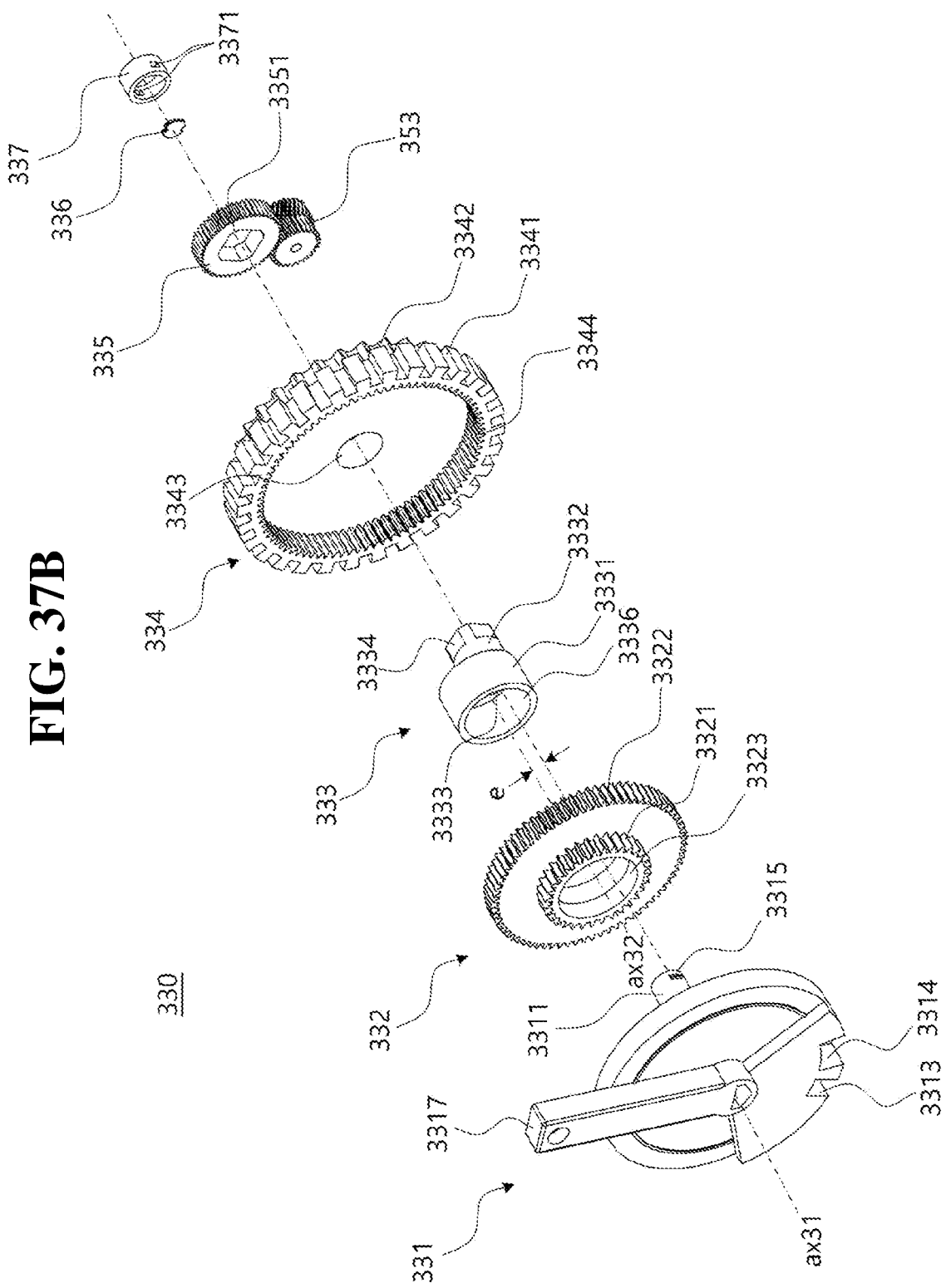
Figure 37C:
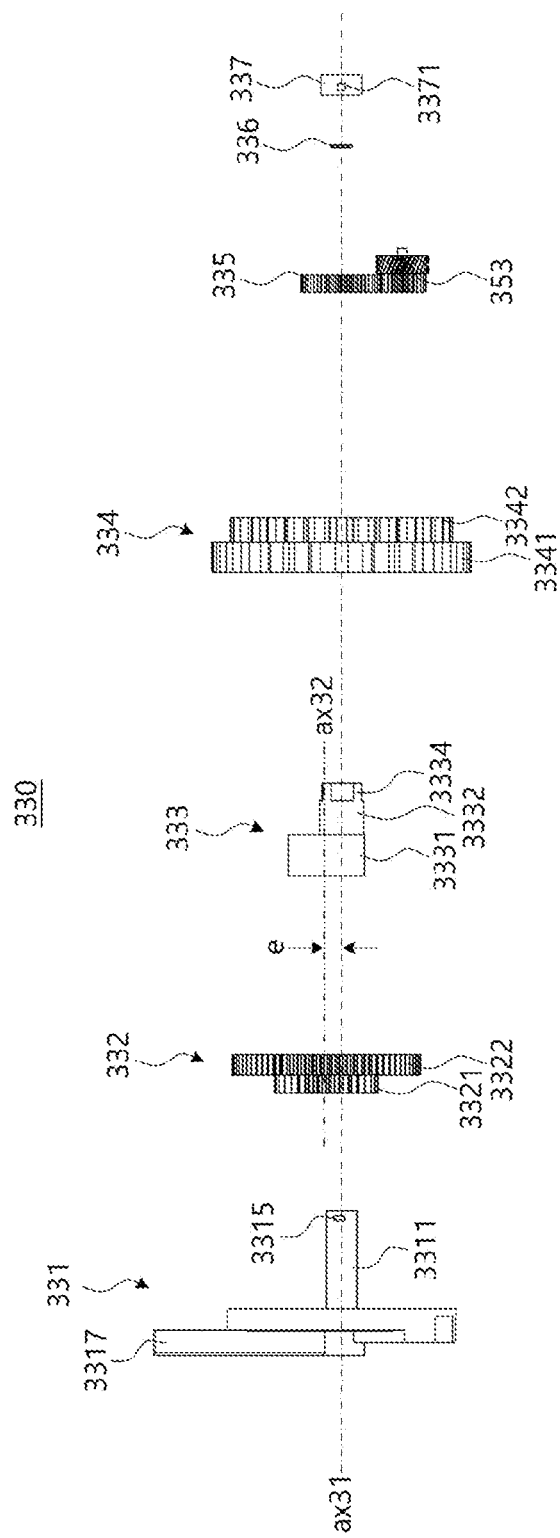

FIGS. 37A through 37C are respectively a right perspective view, a left perspective view, and a plan view of the gear assembly 330 according to another exemplary embodiment of the present invention. The gear assembly 330 may include the movable plate 331, an eccentric gear unit 332, an insertion unit 333, and the rotation unit 334 which may be configured to rotate in accordance with the displacement of the shift lever 310.

The movable plate 331 may include an input shaft 3311 and an internal gear 3312 which rotate according to the displacement of the shift lever 310. A first external gear 3321 of the eccentric gear unit 332 may be eccentrically engaged with the internal gear 3312. The term 'eccentrically engaged' may denote that a central axis ax31 of the internal gear 3312 and a central axis ax32 of the first external gear 3321 may not coincide but may be eccentric (e.g., offset) by a predetermined eccentricity e. The eccentricity e may be adjusted according to a design objective such as a reduction ratio. Therefore, the first external gear 3321 may have a smaller size and a fewer number of teeth than the internal gear 3312 and thus simultaneously perform rotation and revolution inside the internal gear 3312 (eccentric rotational motion).

The eccentric gear unit 332 coupled to the movable plate 331 may include the first external gear 3321 which is eccentrically engaged with the internal gear 3312 and a second external gear 3321 which is integrally formed with the first external gear 3321. The term 'integrally formed,' as used herein, may not necessarily denote that two components are integrally molded with each other, but may include various conditions where there is no relative movement between the two components, such as a condition where the two components are manufactured separately and then coupled or attached to each other. An aperture 3323 may be formed at a center of the eccentric gear unit 332 to pass through centers (ax32) of the first external gear 3321 and the second external gear 3322. Particularly, the first external gear 3321, the second external gear 3321 and the aperture 3323 may be disposed on the same axis ax32 and be arranged eccentrically from the central axis ax31 by the eccentricity e.

The rotation unit 334 may rotate integrally with the movable plate 331 or may not move, based on the source of a driving force (the operation of the shift lever 310 by the driver or the driving of the drive actuator 351). The rotation unit 334 may include a ring gear 3344 with which the second external gear 3322 is eccentrically engaged and the detent unit 3342 which includes the detent grooves 3349 formed along the outer circumferential surface to be engageable with the elastic members 35a and 35b to provide the driver with a feeling of operation. Here, the term 'eccentrically engaged' may denote that the central axis ax31 of the ring gear 3344 and the central axis ax32 of the second external gear 3322 may not coincide but may be eccentric by a predetermined eccentricity e. Therefore, the second external gear 3321 may have a smaller size and a fewer number of teeth than the ring gear 3344 and thus simultaneously perform rotation and revolution inside the ring gear 3344 (eccentric rotational motion).

In addition, the rotation unit 334 may further include the locking unit 3341 which is integrally formed with the detent unit 3342 and includes the fixing grooves 3347 formed along the outer circumferential surface to be engageable with the second locking protrusion 345b of the shift lock mechanism 340. When the second locking protrusion 345b is engaged with the fixing grooves 3347, the locking unit 3341 and the rotation unit 334 may be restrained from rotating. On the other hand, when the second latching protrusion 345b is disengaged from the fixing grooves 3347, the locking unit 3341 and the rotation unit 334 may rotate.

Referring to FIGS. 37A through 37C, the insertion unit 333 may include an eccentric shaft 3331 which is inserted into the aperture 3323 formed at the center of the eccentric gear unit 332, and a central shaft 3332 which is integrally formed with the eccentric shaft 3331 and is inserted into an aperture 3343 formed at a center of the rotation unit 334. A center of the eccentric shaft 3331 and a center of the central shaft 3332 may be spaced apart by the eccentricity e described above.

Figure 38A:
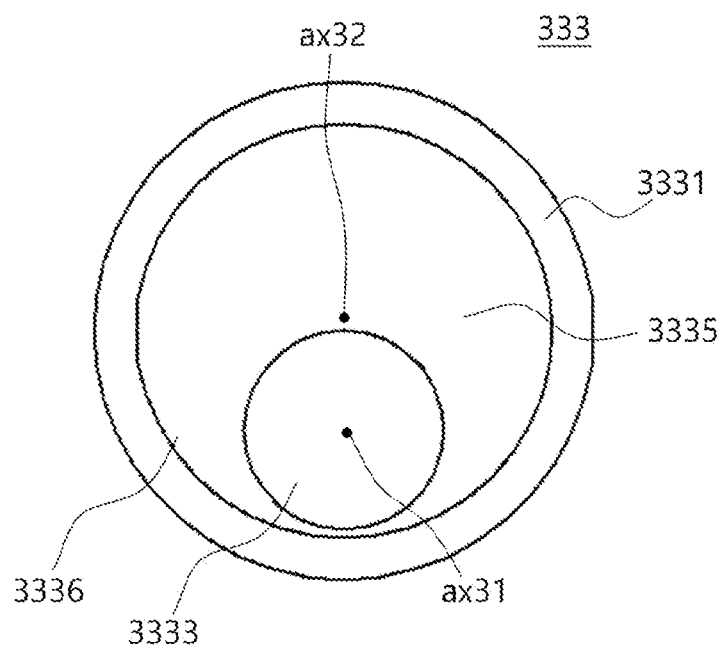
FIGS. 38A and 38B are a front view and a rear view of an insertion unit respectively.
Figure 38B:
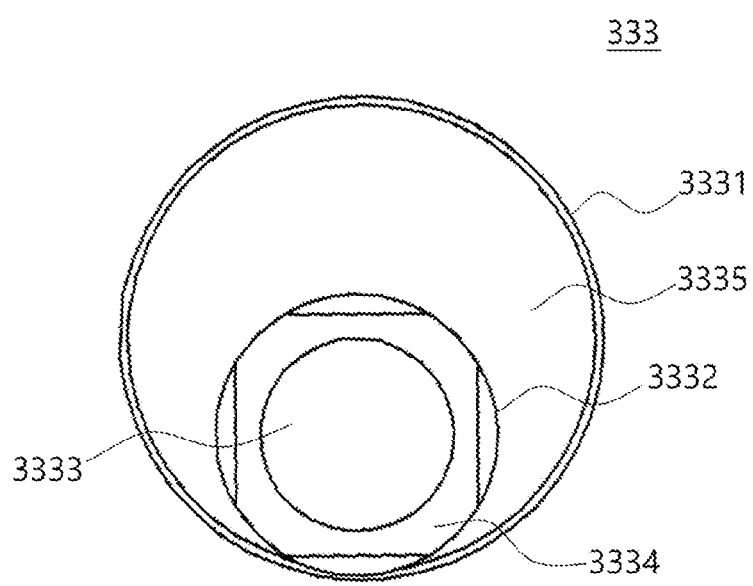

Apertures 3336 and 3333 may be formed at the centers of the eccentric shaft 3331 and the central shaft 3332, respectively. An end of the input shaft 3311 may be inserted and passed through both the aperture 3333 of the eccentric shaft 3331 and the aperture 3333 of the central shaft 3332. The configuration of the insertion unit 333 will be described in more detail with reference to FIGS. 38A and 38B. FIGS. 38A and 38B are a front view and a rear view of the insertion unit 333, respectively. The size (e.g., diameter) of the aperture 3336 formed in the eccentric shaft 3331 may be greater than or equal to the diameter of the aperture 3333 formed in the central shaft 3332. In other words, the input shaft 3311 of the movable plate 331 may at least be coaxially (ax31) inserted into the aperture 3336 formed in the eccentric shaft 3331 of the insertion unit 333. In FIG. 38A, the aperture 3336 of the eccentric shaft 3331 may be larger than the aperture 3333 of the central shaft 3332, and a rear step wall 3335 may be formed between the two apertures 3336 and 3333. However, as long as the input shaft 3311 may pass through the aperture 3336, the aperture 3336 of the eccentric shaft 3331 may also be formed to have the same size as the aperture 3333 of the central shaft 3332, and the remaining portion of the eccentric shaft 3331 may be filled.

Referring again to FIGS. 37A through 37C, the transmission gear 335, which is configured to rotate with the central shaft 3332, may be disposed on an outer circumferential surface of the central shaft 3332. The transmission gear 335 may be implemented as a gear module that is formed on the outer circumferential surface of the central shaft 3332. In the exemplary embodiment of the present invention, a polygonal surface 3334 may be formed on the outer circumferential surface of the central shaft 3332, and a polygonal groove 3351 may be formed at a center of the transmission gear 335. Therefore, the polygonal surface 3334 may be inserted into the polygonal groove 3351. Accordingly, the central shaft 3311 and the transmission gear 335 may rotate with each other. While the polygonal surface 3334 and the polygonal groove 3351 are illustrated as being approximately a quadrilateral, other shapes that prevent their relative rotational movement may be used. Moreover, splines and corresponding spline grooves may also be used.

The end of the input shaft 3311 may pass through the aperture 3333 of the central shaft 3332 be coupled to a cap member 337 which may cover (e.g., enclose) the end of the input shaft 3311, and a magnet 336 may be disposed within a space 3316 formed between the central shaft 3311 and the cap member 337. A hook 3315 may be formed on an outer circumferential surface of the end of the input shaft 3311. Thus, as the hook 3315 is coupled to a groove 3371 formed in or penetrating an inner circumferential surface of the cap member 337, the cap member 337 may be coaxially (ax31) coupled to the end of the input shaft 3311.

The gear assembly 330 described above may have a different mechanism based on the source of a driving force. First, when the movable plate 331 is rotated according to the operation of the shift lever 310 by the driver, the insertion unit 333 may not be rotated as it is fixed by self-locking of the shift stage return mechanism 350. When the insertion unit 333 is fixed, the relative movement between the movable plate 331 and the rotation unit 334 may not occur as the eccentric gear unit 332 may not rotate. Therefore, in this case, the movable plate 331 and the rotation unit 334 may rotate simultaneously at the same speed.

On the other hand, when a driving force is provided to the transmission gear 335 by the shift stage return mechanism 350 so that the shift stage may be automatically returned to the P stage, the rotation unit 334 may not rotate as the locking unit 3341 of the rotation unit 334 may be fixed by the shift lock mechanism 340. At this time, the central shaft 3332 of the insertion unit 333 may be rotated by the rotation of the transmission gear 335. Since the central shaft 3332 rotates about the central axis ax31, the eccentric shaft 3331 may make an eccentric rotational motion in which the center of the eccentric shaft 3331 draws a circle. Accordingly, the eccentric gear unit 332 having the eccentric shaft 3331 inserted into the aperture 3323 may revolve and rotate simultaneously. Specifically, the second external gear 3322 of the eccentric gear unit 332 may rotate eccentrically inside the ring gear 3344, and the first external gear 3321 of the eccentric gear unit 332 may rotate eccentrically inside the internal gear 3312 of the movable plate 331. Consequently, the movable plate 331 may rotate at a predetermined reduction ratio.

As described above, according to the embodiment of the present invention, the central axis ax32 of the eccentric gear unit 332 may be spaced apart from the rotational axis ax31 of the input shaft 3311. Therefore, a sufficient deceleration effect may be obtained when the shift lever 310 is returned to a preset shift stage by the shift stage return mechanism 350. In addition, since a high gear ratio may be achieved without increasing the difference in diameters between gear units meshing with each other, the vehicle transmission 300 may be reduced in size. Here, the shift lever 310 may be returned to the preset shift stage by the shift stage return mechanism 350 when the vehicle is turned off or when there is an operation command. In this case, a feeling of operation may not be required. Therefore, the shift lock mechanism 340 may restrain the rotation of the rotation unit 334 to prevent the generation of the unnecessary operation feeling and reduce noise.

Figure 39A:
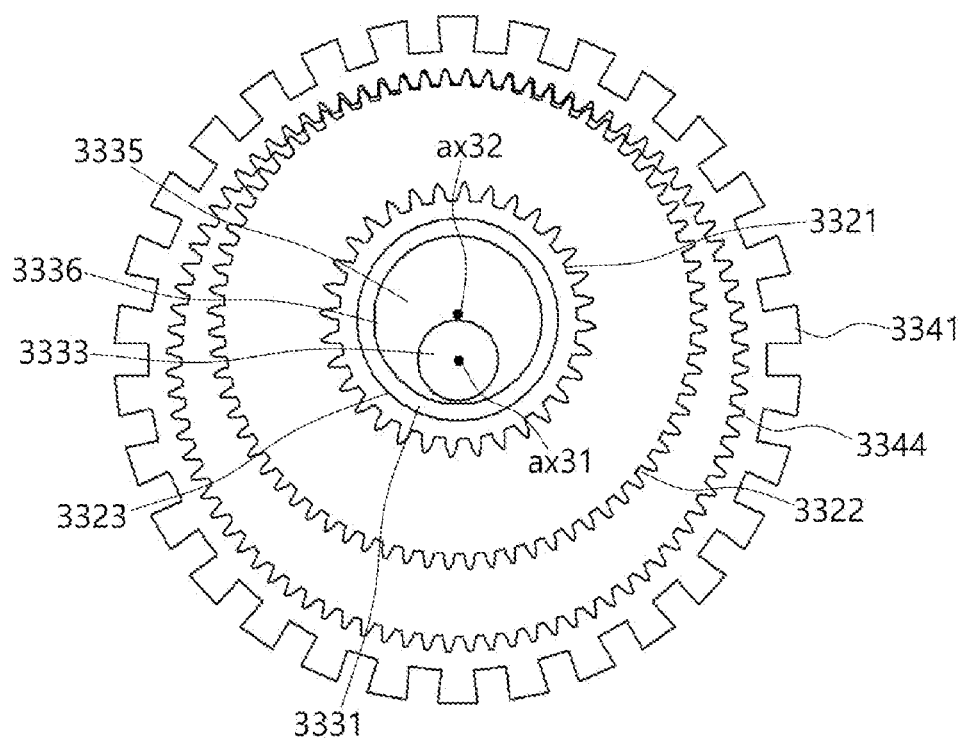
FIG. 39A is a left side view of the gear assembly without a movable plate.
Figure 39B:
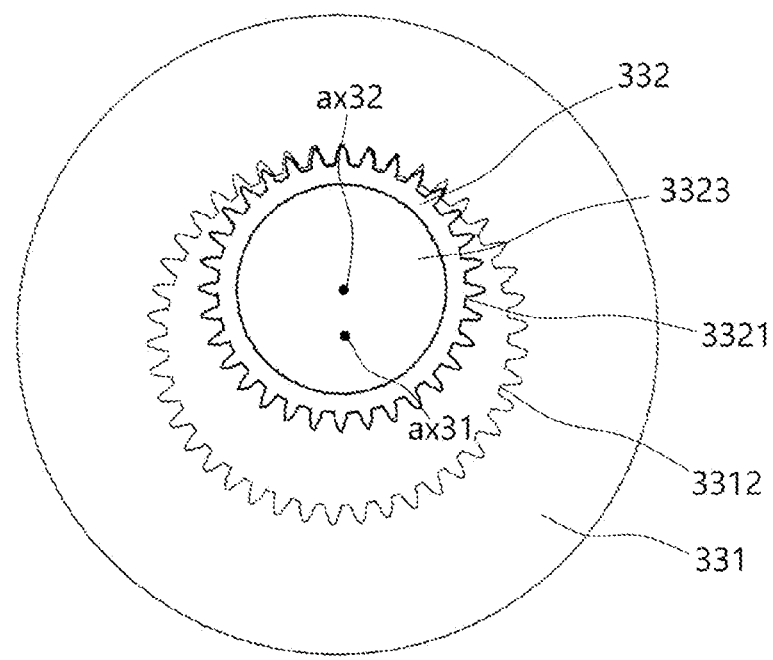
FIG. 39B is a cross-sectional view illustrating the engagement relationship between an internal gear of the movable plate and a first external gear of an eccentric gear unit.

FIG. 39A is a left side view of the gear assembly 330 without the movable plate 331. FIG. 39B is a cross-sectional view illustrating the engagement relationship between the internal gear 3312 of the movable plate 331 and the first external gear 332 of the eccentric gear unit 332. When the central shaft 3332 of the insertion unit 333 is rotated about the central axis ax31 by the shift stage return mechanism 350, the second external gear 3322 may rotate eccentrically while being engaged with the ring gear 3344 because the eccentric shaft 3331 is inserted into the aperture 3323 of the eccentric gear unit 332. Since the ring gear 3344 is fixed, only the second external gear 3322 may rotate and revolve.

As the second external gear 3322 rotates eccentrically, the first external gear 3321 that is integrally formed with the second external gear 3322 may rotate eccentrically while being engaged with the internal gear 3312 of the movable plate 331. In particular, the movable plate 331 may be decelerated at a predetermined reduction ratio to rotate in accordance with the eccentric rotation of the first external gear 3321. More specifically, the reduction ratio may be determined by a gear transmission ratio between the shift stage return mechanism 350 and the transmission gear 335, a gear transmission ratio between the second external gear 3322 of the eccentric gear unit 332 and the ring gear 3344, and a gear transmission ratio between the first external gear 3321 of the eccentric gear unit 332 and the internal gear 3312. For example, the reduction ratio may be increased as a teeth ratio between the second external gear 3322 and the ring gear 3344 becomes similar to a teeth ratio between the first external gear 3321 and the internal gear 3312. When the two teeth ratios are identical, the eccentric gear unit 332 may rotate eccentrically between the internal gear 3312 and the ring gear 3344 even without relative movement between the movable plate 331 and the rotating unit 334. Thus, the reduction ratio is theoretically zero (in other words, the movable plate 331 on an output side may not rotate). For this reason, the teeth ratio between the second external gear 3322 and the ring gear 3344 may be set to be slightly less than the teeth ratio between the first external gear 3321 and the internal gear 3312. If the number of teeth of the second external gear 3322, the number of teeth of the ring gear 3344, the number of teeth of the first external gear 3321, and the number of teeth of the internal gear 3312 are m1, m2, m3 and m4, respectively, the teeth ratio between the second external gear 3322 and the ring gear 3344 may be defined as m2/m1, and the teeth ratio between the first external gear 3321 and the internal gear 3312 may be defined as m4/m3.

Figure 40:
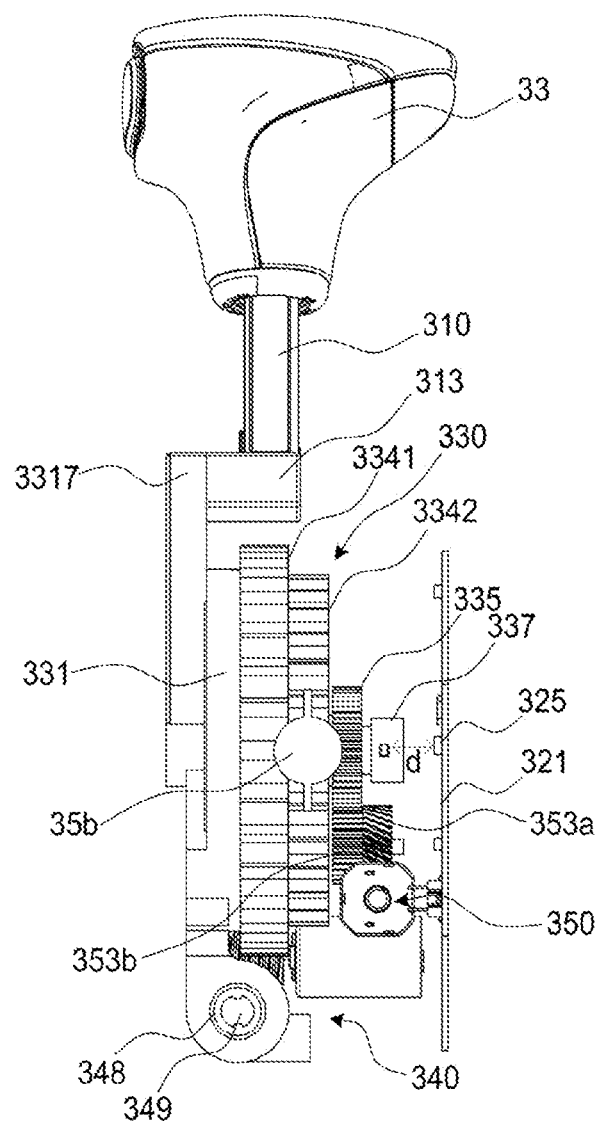
FIG. 40 is a rear view of the vehicle transmission of FIG. 34 with all covers removed.

FIG. 40 is a rear view of the vehicle transmission 300 of FIG. 34 with all covers 320a, 320b and 320c removed.

As described above, the magnet 336 may be disposed between the cap member 337 and the input shaft 3311 of the gear assembly 330. A magnetic force sensor 325 may be disposed on a circuit board 321 spaced apart from the magnet 336 in a direction coaxial (ax31) with the input shaft 3311. The magnetic force sensor 325 may be, for example, a Hall IC and may detect a shift stage selected by the driver by sensing the rotation angle of the magnet 336.

Figure 41:
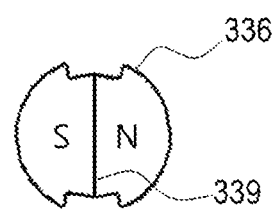
FIG. 41 is a plan view of a magnet according to another exemplary embodiment of the present invention.

FIG. 41 is a plan view of the magnet 336 according to another exemplary embodiment of the present invention. As illustrated in the drawing, the magnet 336 may have two poles S and N vertically symmetrical in a plane. In other words, the two poles S and N may be vertically symmetrical with respect to a boundary line 339 between the two poles S and N.

The magnetic force sensor 325 may be disposed to face the magnet 336 at a position spaced apart from the magnet 336 by a distance d on the same axis as the plane. Since a magnetic flux may be formed in a direction crossing the boundary line 339 between the poles S and N of the magnet, the magnetic force sensor 325 may identify the orientation of the magnet 336 by sensing the direction of the magnetic flux. The orientation of the magnet 336 may indicate an angle by which the input shaft 3311 has been rotated. Therefore, it may determine the amount of operation of the shift lever 310 by the driver, that is, the current gear stage based on the orientation of the magnet 336. An output of the magnetic force sensor 325 may be provided to a controller disposed on the main circuit board 321, and the controller may determine the current gear stage.

As described above, even without a gear for sensing the amount of rotation and accessory members, it may sense the magnet 336 disposed in a rotating shaft (the input shaft 3311) using the magnetic force sensor 325 coaxially disposed adjacent to the magnet 336 to face the magnet 336 as illustrated in FIG. 40. Therefore, the number of parts may be reduced, and the structure may be miniaturized (e.g., smaller in overall size).

This rotation angle sensing method may also be used to sense the amount of rotation of the pivot shaft 344 of the shift lock mechanism 340 described above with reference to FIG. 36A.

In the exemplary embodiment of FIG. 40, an extension rod 3317 extending in the radial direction from a center of the input shaft 3311 may be disposed on the outside opposite to the input shaft 3311 and be integrally formed with the movable plate 331. In addition, the shift lever 310 may be coupled to an end of the extension rod 3317. In particular, the shift lever 310 may include a step portion 313 that enables the shift lever 310 to be coupled to the end of the extension rod 3317 while forming a step toward the inside (a right side) parallel to the input shaft 3311. The step portion 313 and the extension rod 3317 may be fixed to each other by a screw or a pin. As the shift lever 310 and the handle 33 may be positioned at left and right centers of the vehicle transmission 300, a more compact structure in a width direction may be achieved.

Further, in the present invention, both the shift lock state and the automatic return to the P stage may be achieved by rotating the pivot shaft 344 of the shift lock mechanism 340 as described above with reference to at least FIGS. 35A and 36A. Thus, the size and weight of the vehicle transmission 300 may be reduced.

Figure 42A:
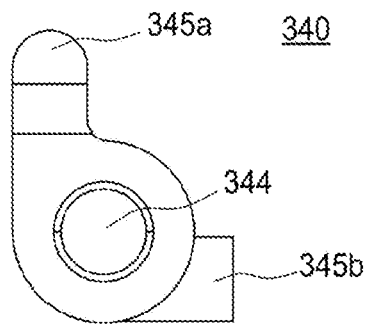
FIG. 42A illustrates the posture of a shift lock mechanism in a shift lock state.
Figure 42B:
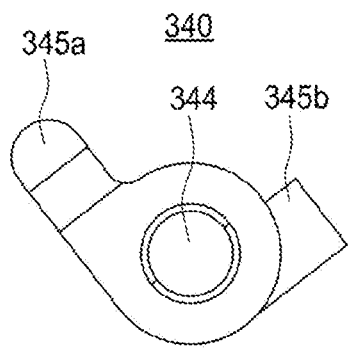
FIG. 42B illustrates the posture of the shift lock mechanism in an unlock state.
Figure 42C:
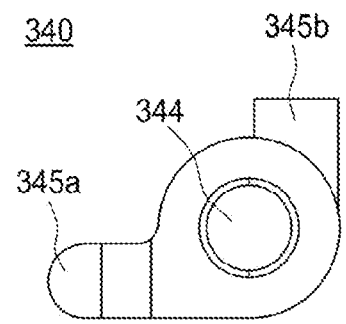
FIG. 42C illustrates the posture of the shift lock mechanism in an automatic return to park (RTP) state.

FIGS. 42A through 42C are rear views of the shift lock mechanism 340 without the locking actuator 341, illustrating the operation of the shift lock mechanism 340 in more detail. Specifically, FIG. 42A illustrates a shift lock state, FIG. 42B illustrates an unlock state, and FIG. 42C illustrates the posture of the shift lock mechanism 340 in an automatic return to park (RIP) state.

In the shift lock state illustrated in FIG. 42A, the first latching protrusion 345a may be oriented in a vertical direction, and the second latching protrusion 345h may be oriented in a horizontal direction. Since the first latching protrusion 345a is in the shift lock state by being coupled to the fixing notch 3313 or 3314 as illustrated in FIGS. 35A and 35B, no shift between shift stages may be made when the driver attempts to operate the shift lever 310. This shift lock may be designed to prevent an unintended shift from a current shift stage (any one of P, R, N and D) to another shift stage. To release the shift lock and operate the shift lever 310, the driver may press the brake pedal.

When the driver presses the brake pedal, the locking actuator 341 may be driven to rotate the pivot shaft 344 counterclockwise by about 45 degrees as illustrated in FIG. 42B. At this time, the shift lock state turns into the unlock state in which both the first locking protrusion 345a and the second locking protrusion 345b are not activated.

Figure 43:
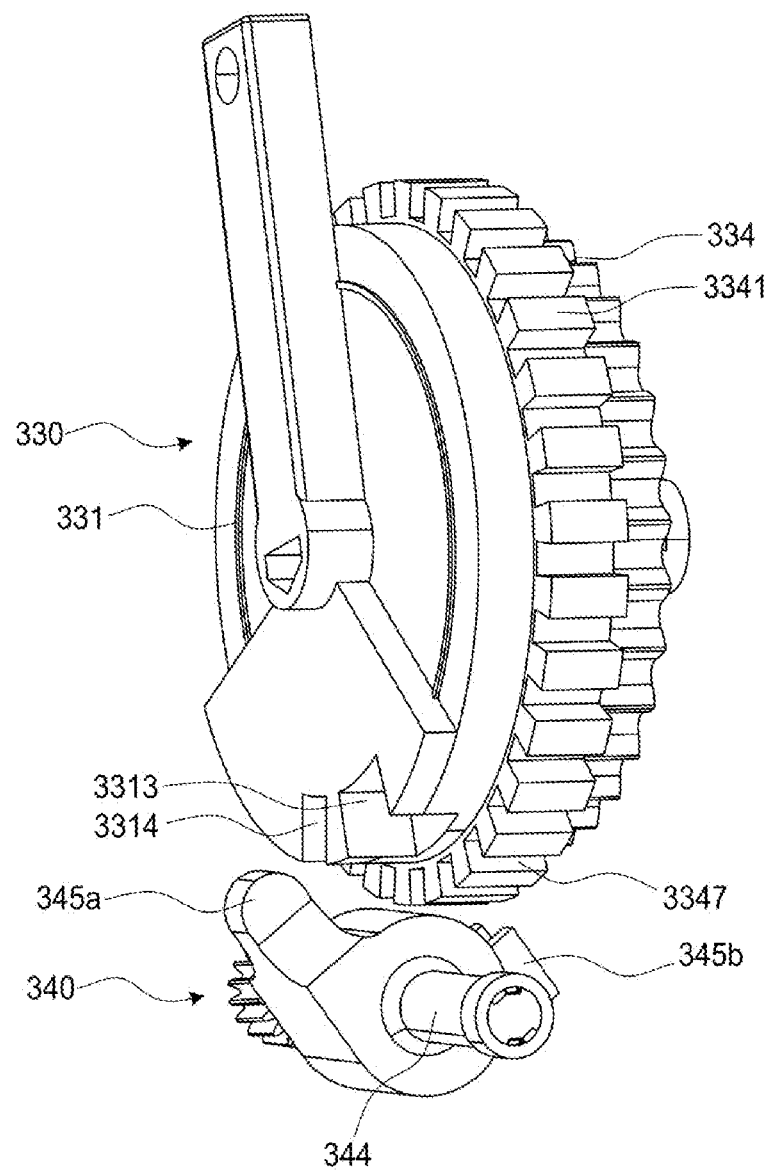
FIG. 43 is a perspective view illustrating the positional relationship between the gear assembly and the shift lock mechanism in the unlock state.

FIG. 43 is a perspective view illustrating the positional relationship between the gear assembly 330 and the shift lock mechanism 340 in the unlock state. Referring to FIG. 43, in the unlock state, not only is the first latching protrusion 345a separated from the fixing notch 3313 or 3314 of the movable, plate 331, but also the second latching protrusion 345b is separated from the fixing grooves 3347 of the locking unit 3341. When the driver operates the shift lever 310, the movable plate 331 and the rotation unit 334 may rotate with each other to change a shift stage. When the driver releases the brake pedal after the shift stage is changed, the unlock state may be returned to the shift lock state illustrated in FIG. 42A at the current shift stage (the shift lock state at the current shift stage).

In the automatic RTP state after the vehicle is turned off, the first latching protrusion 345a may be oriented in the horizontal direction, and the second latching protrusion 345b may be oriented in the vertical direction, as illustrated in FIG. 42C. The automatic RTP state may be obtained as the pivot shaft 344 is rotated counterclockwise from the position of the locking unit 340 of FIG. 42A by about 90 degrees by the driving of the locking actuator 341. After the automatic return to the P stage, the pivot shaft 344 may be rotated clockwise by about 90 degrees to couple the first latching protrusion 345a to the fixing notch 3313. As a result, the automatic RTP state may be returned to the shift lock state (the shift lock state at the P stage).

Figure 44:
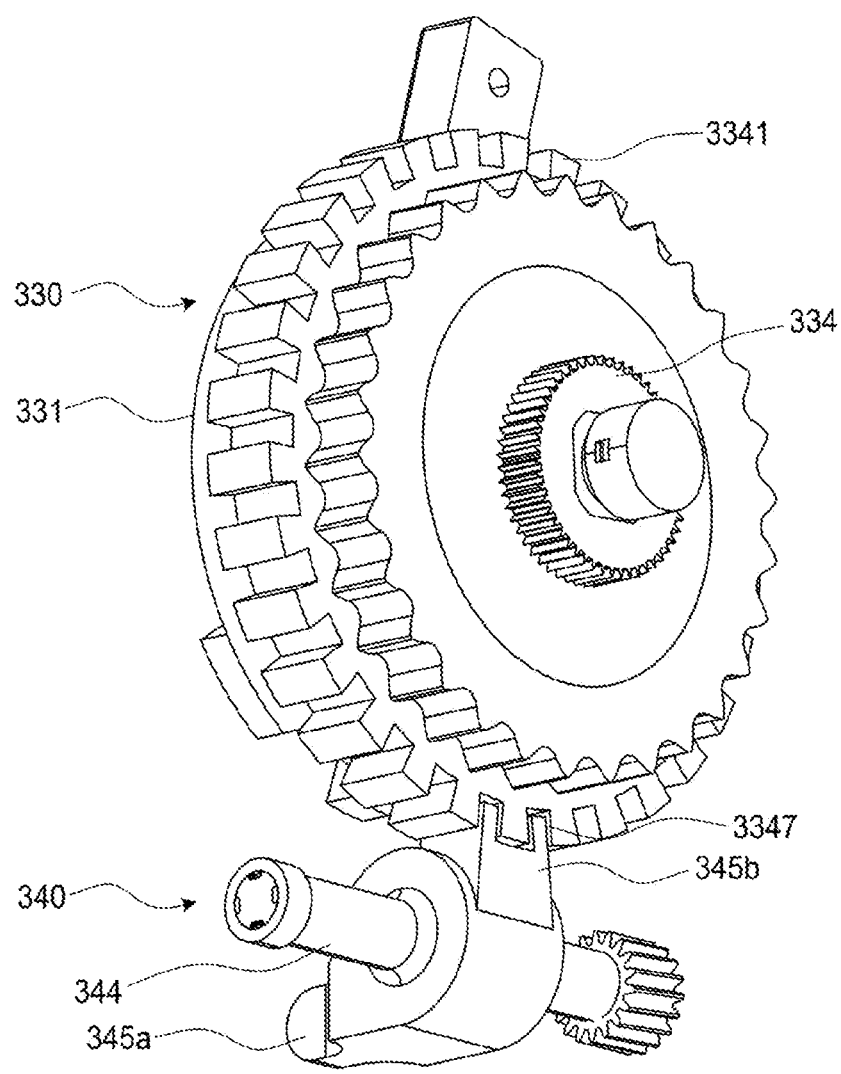
FIG. 44 is perspective view illustrating the coupling relationship between the gear assembly and the shift lock mechanism in the automatic RTP state.

FIG. 44 is a perspective view illustrating the coupling relationship between the gear assembly 330 and the shift lock mechanism 340 in the automatic RTP state. Referring to FIG. 44, the first latching protrusion 345a may be separated from the fixing notch 3313 or 3314, whereas the second latching protrusion 345b may be coupled to the fixing grooves 3347 of the locking unit 3341. Thus, the second latching protrusion 345b may not rotate. In this case, as described above, the driver may not operate the shift lever 310, and the transmission gear 335 may be rotated by the operation of the shift stage return mechanism 350 to return the shift lever 310 to the P stage.

The exemplary embodiment in which the extension rod 3317 extending in the radial direction is provided on a side of the movable plate 313 and the shift lever 310 is coupled to an end of the extension rod 3317 has been described above. However, another exemplary embodiment in which a shift lever 3110 (see FIG. 45) is directly coupled to an extension rod 371 (see FIG. 45) extending axially from a movable plate 313 may also be implemented.

Figure 45:
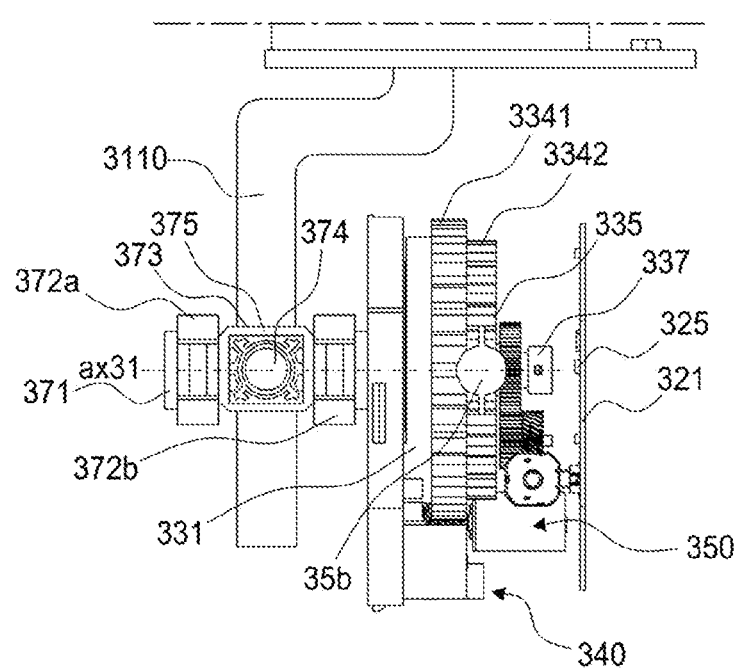
FIG. 45 is a rear view of a vehicle transmission according to another exemplary embodiment of the present invention.

FIG. 45 is a rear view of a vehicle transmission according to another exemplary embodiment of the present invention. Here, all components of the vehicle transmission may be substantively the same as those of FIG. 40 except for the connection structure of a shift lever 3110. In FIG. 45, a movable plate 331 may include an extension rod 371 extending toward the outside (a left side) opposite to an input shaft 3311 along the direction of an axis ax31 of the input shaft 3311. The shift lever 3110 may be inserted into and coupled to a vertical through hole 373 of the extension rod 371 in a direction orthogonal to the extension rod 371. The shift lever 3110 and the extension rod 371 may be fixed to each other by a screw or a pin 374. For more secure fastening, an intermediate fastening member 375 may be inserted into the extension rod 371 in an axial direction of the extension rod 371, and the shift lever 3110 may be vertically passed through the intermediate fastening member 375 and the extension rod 371. In addition, fixing members such as nuts 372a and 372b may be further provided to fix the intermediate fastening member 375 in position on the extension rod 371.

Although the shift lever 3110 of FIG. 45 is of an integrated type, unlike the shift lever 310 of FIG. 40, a step may be formed toward the inside (a right side) parallel to the input shaft 3311 as in FIG. 40. As described above, the step may allow a more compact structure in the horizontal direction, thus contributing to enhancement of space utilization within the vehicle.

While the above exemplary embodiments have: been described as separate embodiments, the components of the exemplary embodiments may be used in combination with each other as long as the structural interference may not occur between the embodiments.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

The invention claimed is:
1. A vehicle transmission comprising:
   a shift lever which is configured to be at least partially displaced toward a front or a rear direction of a vehicle by an operation of a driver to select one of a plurality of shift stages;
   a movable plate which includes an input shaft rotated according to the displacement of the shift lever and an internal gear;
   an eccentric gear unit which has a first external gear eccentrically engaged with the internal gear and a second external gear rotating with the first external gear;
   a rotation unit having a ring gear with which the second external gear is eccentrically engaged; and
   an insertion unit which includes an eccentric shaft inserted into a first aperture formed at a center of the eccentric gear unit and a central shaft formed integrally with the eccentric shaft and inserted into a second aperture formed at a center of the rotation unit.

2. The vehicle transmission of claim 1, wherein, when the movable plate is rotated according to the operation of the driver and the insertion unit is fixed, the movable plate and the rotation unit are configured to rotate together at the same speed.

3. The vehicle transmission of claim 1, wherein a third aperture is formed at a center of the central shaft, and an end of the input shaft is inserted and passed through the third aperture of the central shaft.

4. The vehicle transmission of claim 3, wherein the insertion unit further comprises a transmission gear which is configured to rotate with the central shaft.

5. The vehicle transmission of claim 4, wherein a spline groove is formed at a center of the transmission gear, and the spline groove is coupled to a spline surface formed on an outer circumferential surface of the central shaft to enable the central shaft and the transmission gear rotate simultaneously.

6. The vehicle transmission of claim 4, further comprising a shift stage return mechanism which is configured to provide a driving force to the transmission gear so that the selected shift stage is automatically returned to a park (P) stage.

7. The vehicle transmission of claim 6, wherein the shift stage return mechanism comprises:
   a drive shaft which is disposed orthogonal to the input shaft and configured to provide a rotational driving force;
   a worm gear which is formed or attached on an outer circumferential surface of the drive shaft; and a pinion gear unit which is engaged with the worm gear and configured to provide a driving force to the transmission gear.

8. The vehicle transmission of claim 7, wherein the pinion gear unit comprises a first gear which is engaged with the worm gear and a second gear which is formed integrally with the first gear, wherein the second gear has a fewer number of teeth than the first gear and the transmission gear.

9. The vehicle transmission of claim 7, wherein, when the movable plate and the rotation unit rotate simultaneously, the insertion unit is configured to be fixed by a self-locking of the shift stage return mechanism.

10. The vehicle transmission of claim 6, wherein, when the shift stage return mechanism is configured to provide the driving force to the transmission gear so that the selected shift stage is automatically returned to the P stage, the rotation unit is configured to be fixed by a shift lock while the movable plate rotates at a reduction ratio.

11. The vehicle transmission of claim 10, wherein the reduction ratio is determined by a gear transmission ratio between the shift stage return mechanism and the transmission gear, a gear transmission ratio between the second external gear of the eccentric gear unit and the ring gear, and a gear transmission ratio between the first external gear of the eccentric gear unit and the internal gear.

12. The vehicle transmission of claim 3, wherein the end of the input shaft passes through the center of the central shaft to be coupled to a cap member covering the end of the input shaft, and a magnet is disposed between the central shaft and the cap member.

13. The vehicle transmission of claim 12, wherein a hook formed on an outer circumferential surface of the end of the input shaft is coupled to a groove formed in an inner circumferential surface of the cap member to coaxially fasten the cap member to the end of the input shaft.

14. The vehicle transmission of claim 12, further comprising a Hall sensor which is disposed on a circuit board to be spaced apart from the magnet in a direction coaxial with the input shaft, wherein a rotation angle of the magnet is sensed by the Hall sensor to detect the selected shift stage.

15. The vehicle transmission of claim 1, wherein the rotation unit comprises a detent unit which has a plurality of detent grooves formed along an outer circumferential surface configured to be engaged with elastic members to provide the driver a feeling of operation.

16. The vehicle transmission of claim 15, wherein the rotation unit further comprises a locking unit which is formed integrally with the detent unit and has a plurality of fixing grooves formed along an outer circumferential surface configured to be engaged with a shift lock mechanism,
wherein the shift lock mechanism comprises:
a locking actuator which is configured to provide a rotational driving force;
a pivot shaft which is disposed orthogonal to the input shaft and is configured to be rotated by the provided rotational driving force;
a first latching protrusion which is configured to be coupled to or decoupled from the notches while rotating simultaneously with the pivot shaft; and
a second latching protrusion which is configured to rotate simultaneously with the pivot shaft, is spaced apart from the first latching protrusion on the pivot shaft by a predetermined angle, and is configured to be coupled to or decoupled from the fixing grooves, and
wherein the locking actuator comprises:
a drive shaft which is disposed parallel to the input shaft and configured to provide the rotational driving force; and
a worm gear which is formed or attached on an outer circumferential surface of the drive shaft and is engaged with a pinion gear formed or attached on a side of the pivot shaft.

17. The vehicle transmission of claim 1, wherein the movable plate further comprises an extension rod which extends toward a side opposite to the input shaft along an axial direction of the input shaft, and the shift lever is inserted in a direction orthogonal to a longitudinal direction of the extension rod to be coupled to the extension rod.

18. The vehicle transmission of claim 17, wherein the shift lever is disposed parallel to the movable plate, and a step is formed parallel to the input shaft.

19. The vehicle transmission of claim 1, wherein the movable plate further comprises an extension rod which is disposed on a side opposite to the input shaft and extends in a radial direction from a center of the input shaft, wherein the shift lever is coupled to an end of the extension rod.

20. The vehicle transmission of claim 19, wherein the shift lever is disposed parallel to the movable plate and is coupled to the end of the extension rod while forming a step parallel to the input shaft.

* * * * *